United States Patent
Fouquay et al.

(10) Patent No.: US 12,516,147 B2
(45) Date of Patent: Jan. 6, 2026

(54) ALDIMINES AND USES THEREOF

(71) Applicant: BOSTIK SA, Colombes (FR)

(72) Inventors: Stéphane Fouquay, Venette (FR); Federico Sanz, Venette (FR)

(73) Assignee: BOSTIK SA, Colombes (FR)

( * ) Notice: Subject to any disclaimer, the term of this patent is extended or adjusted under 35 U.S.C. 154(b) by 841 days.

(21) Appl. No.: 17/785,095

(22) PCT Filed: Dec. 15, 2020

(86) PCT No.: PCT/EP2020/086216
§ 371 (c)(1),
(2) Date: Jun. 14, 2022

(87) PCT Pub. No.: WO2021/122594
PCT Pub. Date: Jun. 24, 2021

(65) Prior Publication Data
US 2023/0038642 A1 Feb. 9, 2023

(30) Foreign Application Priority Data
Dec. 19, 2019 (EP) ..................................... 19306694

(51) Int. Cl.
| | |
|---|---|
| C08G 18/48 | (2006.01) |
| C08G 18/12 | (2006.01) |
| C08G 18/24 | (2006.01) |
| C08G 18/30 | (2006.01) |
| C08G 18/72 | (2006.01) |
| C08G 18/75 | (2006.01) |
| C08G 18/76 | (2006.01) |
| C09D 175/08 | (2006.01) |
| C09J 175/08 | (2006.01) |

(52) U.S. Cl.
CPC ......... C08G 18/4812 (2013.01); C08G 18/12 (2013.01); C08G 18/246 (2013.01); C08G 18/307 (2013.01); C08G 18/4825 (2013.01); C08G 18/4829 (2013.01); C08G 18/724 (2013.01); C08G 18/755 (2013.01); C08G 18/7621 (2013.01); C08G 18/7642 (2013.01); C09D 175/08 (2013.01); C09J 175/08 (2013.01)

(58) Field of Classification Search
CPC ......... C08K 5/00; C08K 5/29; C07C 251/00; C07C 251/02; C07C 251/08; C08G 18/4812; C08G 18/12; C08G 18/246; C08G 18/307; C08G 18/4825; C08G 18/4829; C08G 18/724; C08G 18/755; C08G 18/7621; C08G 18/7642; C09D 175/08; C09J 175/08
See application file for complete search history.

(56) References Cited

U.S. PATENT DOCUMENTS

| | | |
|---|---|---|
| 5,087,661 A | 2/1992 | Aoki et al. |
| 8,088,244 B2 | 1/2012 | Burckhardt |
| 2006/0149025 A1 | 7/2006 | Burckhardt |
| 2009/0176944 A1* | 7/2009 | Burckhardt ........... C07C 251/08 548/951 |

FOREIGN PATENT DOCUMENTS

WO 2004013088 A1 2/2004

OTHER PUBLICATIONS

ISA/EP; International Search Report and Written Opinion for International Patent Application No. PCT/EP2020/086216 dated Mar. 10, 2021, 11 pages.

* cited by examiner

*Primary Examiner* — Randy P Gulakowski
*Assistant Examiner* — Virginia L Stonehocker
(74) *Attorney, Agent, or Firm* — Rimon P.C.; Allyn B. Elliott

(57) ABSTRACT

The present invention relates to compounds having one of the following formulae (I) and (II):

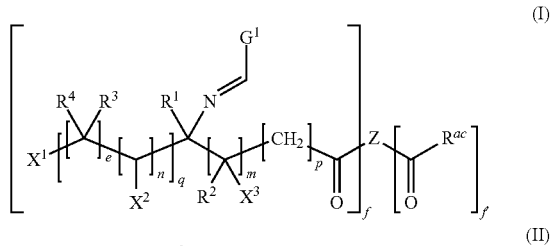

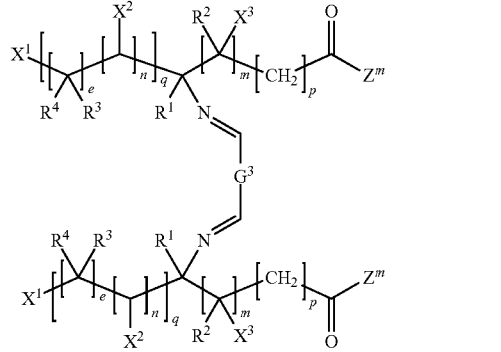

and also to the uses thereof.

16 Claims, No Drawings

ALDIMINES AND USES THEREOF

CROSS-REFERENCE TO RELATED APPLICATIONS

This application is a U.S. National Stage application of International Patent Application No. PCT/EP2020/086216, filed on Dec. 15, 2020, which claims the benefit of European Patent Application No. 19306694.1, filed on Dec. 19, 2019

FIELD OF THE INVENTION

The present invention relates to a new family of (poly) aldimines, and to the compositions comprising same.

The present invention also relates to the use of these (poly)aldimines in adhesive compositions, sealants or coatings.

TECHNICAL BACKGROUND (Poly)aldimines are condensation products of primary amines and aldehydes, and are a well-known class of compounds. On contact with water, (poly)aldimines can hydrolyze to the corresponding amines and aldehydes. Due to their properties, aldimines can also be used as a protected form of amines.

Aldimines are especially useful in adhesive compositions based on moisture-crosslinkable polyurethanes, especially in sealants and also in adhesive compositions based on epoxides. Their use as a moisture-activatable, latent curing agent in polyurethane-based systems advantageously makes it possible to avoid the formation of bubbles, insofar as crosslinking with aldimines (blocked amines) does not lead to the release of $CO_2$ (unlike direct crosslinking of isocyanate groups with moisture).

There exists a need for new (poly)aldimines.

DESCRIPTION OF THE INVENTION

A—Aldimines of formula (I) or (II)

The present invention relates to a compound having one of the following formulae (I) and (II):

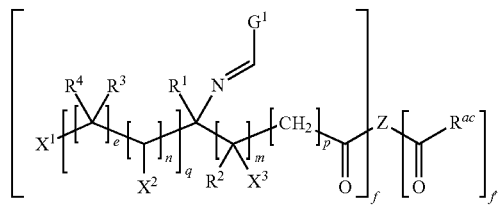

(I)

in which:
  $X^1$ represents $F^1$ or $-N=C(H)-G^1$ or -Ph-XH, or —XH, with X representing O or S or Se and Ph representing a phenyl group;
  $X^2$ represents $F^2$ or $-N=C(H)-G^1$ or -Ph-XH, or —XH, with X representing O or S or Se and Ph representing a phenyl group;
  $X^3$ represents $F^3$ or $-N=C(H)-G^1$ or -Ph-XH, or —XH, with X representing O or S or Se and Ph representing a phenyl group;
  provided that at most just one radical from among the radicals $X^1$, $X^2$ and $X^3$ represents $-N=C(H)-G^1$;
  provided that at most just one radical from among the radicals $X^1$, $X^2$ and $X^3$ represents —XH or -Ph-XH;
  provided that when $X^1=-N=C(H)-G^1$, then q=1;
  provided that when $X^1=-N=C(H)-G^1$ or -Ph-XH or —XH, then $X^2=F^2$ and $X^3=F^3$
  provided that when $X^2=-N=C(H)-G^1$ or -Ph-XH or —XH, then $X^1=F^1$ and $X^3=F^3$
  provided that when $X^3=-N=C(H)-G^1$ or -Ph-XH or —XH, then $X^2=F^2$ and $X^1=F^1$;
  $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
  $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
  $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
  $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 4 to 12 carbon atoms;
  n is an integer ranging from 0 to 28;
  p is an integer ranging from 0 to 10;
  m represents 0 or 1;
  q represents 0 or 1;
  e is an integer ranging from 1 to 3;
  f is an integer or non-integer ranging from 1 to 3, f preferably being an integer equal to 1, 2 or 3;
  f' is an integer or non-integer ranging from 0 to 2, f' preferably being an integer equal to 0, 1 or 2;
  the sum f+f' represents an integer ranging from 1 to 3;
  Z represents a monovalent organic radical $Z^m$, divalent organic radical $Z^d$ or trivalent organic radical $Z^t$, having a molar mass or a number-average molecular mass (Mn) ranging from 16 to 22 000 g/mol, preferably from 16 to 12 000 g/mol, more preferably from 16 to 8000 g/mol, even more preferentially from 16 to 4000 g/mol;
  $R^{ac}$ represents a hydrogen atom or a monovalent hydrocarbon radical comprising from 1 to carbon atoms, it being possible for said radical to optionally comprise one or more heteroatoms;
  $G^1$ represents a monovalent hydrocarbon radical of molar mass or of number-average molecular mass (Mn) ranging from 15 to 4000 g/mol, preferably from 60 to 2000 g/mol, preferentially from 60 to 1000 g/mol, and even more preferentially from 60 to 500 g/mol, it being possible for said radical to optionally comprise one or more heteroatoms, provided that $G^1$ does not represent a substituted or unsubstituted aryl radical;

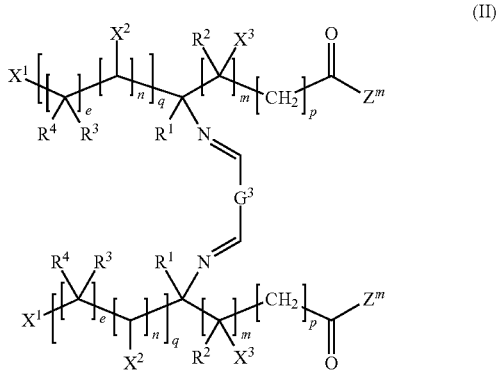
(II)

in which:
- $X^1$ represents $F^1$ or -Ph-XH, or —XH;
- $X^2$ represents $F^2$ or -Ph-XH, or —XH;
- $X^3$ represents $F^3$ or -Ph-XH, or —XH;
- $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$,
- $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$,
- $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$,
- X, $R^1$, $R^2$, $R^3$, $R^4$, n, q, m, p, e and $Z^m$ being as defined for formula (I) above;
- $G^3$ represents a monovalent hydrocarbon radical of molar mass or of number-average molecular mass (Mn) ranging from 14 to 4000 g/mol, preferably from 42 to 2000 g/mol, preferentially from 42 to 1000 g/mol, and even more preferentially from 42 to 500 g/mol, it being possible for said radical to optionally comprise one or more heteroatoms, provided that $G^3$ does not represent a substituted or unsubstituted arylene radical;
- provided that at most just one radical from among the radicals $X^1$, $X^2$ and $X^3$ represents —XH or -Ph-XH;
- provided that when $X^1$=-Ph-XH or —XH, then $X^2$=$F^2$ and $X^3$=$F^3$;
- provided that when $X^2$=-Ph-XH or —XH, then $X^1$=$F^1$ and $X^3$=$F^3$;
- provided that when $X^3$=-Ph-XH or —XH, then $X^2$=$F^2$ and $X^1$=$F^1$.

In the present application, the condition according to which "at most just one radical from among the radicals $X^1$, $X^2$ and $X^3$ represents —N=C(H)-$G^1$" means that either none of the radicals $X^1$, $X^2$ and $X^3$ represents —N=C(H)-$G^1$, or just one radical from among the radicals $X^1$, $X^2$ and $X^3$ represents —N=C(H)-$G^1$.

In the present application, the condition according to which "at most just one radical from among the radicals $X^1$, $X^2$ and $X^3$ represents —XH or -Ph-XH" means that either none of the radicals $X^1$, $X^2$ and $X^3$ represents —XH or -Ph-XH, or just one radical from among the radicals $X^1$, $X^2$ and $X^3$ represents —XH or -Ph-XH.

In the context of the invention, "-Ph-XH" is understood to mean a phenyl group substituted by an —XH group, with X representing O or S or Se. The —XH group is advantageously in para position.

In the context of the invention, "arylalkyl" is understood to mean an alkyl group substituted by an aryl group, the arylalkyl group comprising from 7 to 20 carbon atoms. As arylalkyl group, mention may be made, for example, of benzyl.

In the context of the invention, "(hetero)aryl" is understood to mean a heteroaryl group or an aryl group, said (hetero)aryl group comprising from 4 to 12 carbon atoms.

In the context of the invention, "aryl" is understood to mean a monocyclic or bicyclic aromatic radical comprising from 6 to 12 carbon atoms. Mention may be made, for example, of phenyl.

In the context of the invention, "heteroaryl" is understood to mean a monocyclic or bicyclic aromatic radical comprising at least one heteroatom such as for example O, S or N, and from 4 to 12 carbon atoms. Mention may be made, for example, of the furanyl, thiophenyl, pyrrolyl, pyridinyl, indolyl or imidazolyl radicals.

In the context of the invention, "(hetero)cycloalkyl" is understood to mean a heterocycloalkyl group or a cycloalkyl group.

In the context of the invention, "cycloalkyl" is understood to mean a saturated, monocyclic or polycyclic, preferably monocyclic or bicyclic, system comprising from 3 to 12 carbon atoms, the rings possibly being bridged or fused in pairs, such as the cyclopropyl, cyclopentyl, cyclohexyl or else norbornyl groups.

In the context of the invention, "heterocycloalkyl" is understood to mean a saturated, monocyclic or polycyclic, preferably monocyclic or bicyclic, system comprising from 3 to 12 carbon atoms and at least one heteroatom such as for example O or N, the rings possibly being bridged or fused in pairs.

In the present application, the alkyl, arylalkyl, (hetero)aryl, (hetero)cycloalkyl radicals may be optionally substituted.

In the context of the invention, the expression "hydrocarbon radical which may contain one or more heteroatoms" means that the radical may contain a heteroatom either in the form of a function such as for example a carbonyl —C(=O) function, an amide —C(=O)—NH$_2$— or ester —C(=O)—O—/—O—C(=O)— function, or else —O—C(=O)—

NH—, —OR or —N(R')(R") function, or else in the form of a heteroatom such as for example —O—, —S— or —NH—.

In the context of the invention, an "alkyl which may optionally comprise one or more heteroatoms" is an alkyl group which may optionally comprise a heteroatom chosen from —O—, S or —NH—.

In formula (I) above, when f'=0 and f=1, then Z is a monovalent radical $Z'$.

In formula (I) above, when f'=0 and f=2, then Z is a divalent radical $Z^d$.

In formula (I) above, when f'=0 and f=3, then Z is a trivalent radical $Z^t$.

In formula (I) above, when f'=1 and f=1, then Z is a divalent radical $Z^d$.

In formula (I) above, when f'=2 and f=1, then Z is a trivalent radical $Z^t$.

In formula (I) above, when f+f'=1, then Z is a monovalent radical $Z^m$.

In formula (I) above, when f+f'=2, then Z is a divalent radical $Z^d$.

In formula (I) above, when f+f'=3, then Z is a trivalent radical $Z^t$.

According to one embodiment, Z represents a monovalent organic radical $Z^m$, divalent organic radical $Z^d$ or trivalent organic radical $Z^t$, having a molar mass or a number-average molecular mass (Mn) ranging from 16 to 2000 g/mol, preferentially from 16 to 1000 g/mol, and even more preferentially from 30 to 500 g/mol.

According to one embodiment, in any one of formulae (I) or (II), $Z^m$ represents a radical chosen from —$OR^5$, —$NH_2$, —NH—R' or —N(R')(R"), in which:

$R^5$ represents a linear or branched alkyl group comprising from 1 to 1000 carbon atoms which may optionally comprise one or more heteroatoms, a (hetero)cycloalkyl group comprising from to 20 carbon atoms, an arylalkyl group comprising from 7 to 20 carbon atoms, or a (hetero)aryl group comprising from 4 to 12 carbon atoms;

R' represents a linear or branched alkyl group comprising from 1 to 300 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms;

R" represents a linear or branched alkyl group comprising from 1 to 300 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms.

Preferably, in any one of formulae (I) or (II), $Z^m$ represents a radical chosen from —$OR^5$, —$NH_2$, —NH—R' or —N(R')(R"), in which:

$R^5$ represents a linear or branched alkyl group comprising from 1 to 60 carbon atoms which may optionally comprise one or more heteroatoms, a (hetero)cycloalkyl group comprising from 3 to 20 carbon atoms, an arylalkyl group comprising from 7 to 20 carbon atoms, or a (hetero)aryl group comprising from 4 to 12 carbon atoms;

R' represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms;

R" represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms.

The radical -$G^1$ may represent a radical —$C(R^6)(R^7)(R^8)$ or a radical -$G^2$ with:

$R^6$ and $R^7$ each representing, independently of one another, a monovalent hydrocarbon radical comprising from 1 to 12 carbon atoms, said radical being optionally substituted by an —OH group;

or $R^6$ and $R^7$ together form an aliphatic ring comprising from 4 to 12 carbon atoms, said ring being optionally substituted;

$R^8$ represents a monovalent hydrocarbon radical comprising from 1 to 60 carbon atoms, said radical optionally comprising a heteroatom;

$G^2$ represents an optionally substituted heteroaryl radical, or a radical —C(O)—$R^{12}$ with $R^{12}$ representing an alkoxy radical, an alkenyl radical, or an arylalkenyl radical comprising at least carbon atoms, said radical $G^2$ having a molar mass or a number-average molecular mass (Mn) ranging from to 4000 g/mol, preferably ranging from 60 to 2000 g/mol, preferentially ranging from 60 to 1000 g/mol and even more preferentially ranging from 60 to 500 g/mol.

The radical -$G^3$ may represent:

a linear or branched, cyclic or non-cyclic, saturated or unsaturated alkylene radical, or a radical -$G^5$-($G^6$-$G^5$)-, of molar mass or of number-average molecular mass (Mn) ranging from 14 to 4000 g/mol, preferably ranging from 60 to 2000 g/mol, preferentially ranging from 60 to 1000 g/mol and even more preferentially ranging from 60 to 500 g/mol, in which:

$G^5$ represents an optionally substituted hetero(arylene) radical;

$G^6$ represents an oxygen atom, a sulfur atom or a radical chosen from one of the following radicals: —O—$R^{27}$—O—, —$CH_2$—O—$R^{28}$—O—$CH_2$—, —$CH_2$—O—C(=O)—$R^{29}$—C(=O)—O—$CH_2$—, —$CH_2$—O—C(=O)—NH—$R^{30}$—NH—C(=O)—O—$CH_2$—, —O—C(=O)—NH—$R^{31}$—NH—C(=O)—O—, —O—C(=O)—$R^{32}$—C(=O)—O—, and with $R^{27}$, $R^{28}$, $R^{29}$, $R^{30}$, $R^{31}$ and $R^{32}$ each representing, independently of one another, a hydrocarbon radical optionally comprising at least one heteroatom;

r represents 0 or 1;

provided that when r=0, then $G^5$ represents an optionally substituted heteroarylene;

a radical —$CH(R^{25})(R^{26})$-[$G^4$-$CH(R^{25})(R^{26})$]$_w$—, of molar mass or of number-average molecular mass (Mn) ranging from 42 to 4000 g/mol, preferably ranging from 42 to 2000 g/mol, preferentially ranging from 42 to 1000 g/mol and even more preferentially ranging from 42 to 500 g/mol, in which:

$R^{25}$ and $R^{26}$ each represent, independently of one another, a monovalent hydrocarbon radical comprising from 1 to 12 carbon atoms, said radical being optionally substituted by an —OH group;

or $R^{25}$ and $R^{26}$ together form an aliphatic ring comprising from 4 to 12 carbon atoms, said ring being optionally substituted;

$G^4$ represents a carbon-carbon bond or a divalent hydrocarbon radical, said radical optionally comprising at least one heteroatom;

w represents an integer equal to 0 or 1.

Preferred modes for $G^1$, $R^6$, $R^7$, $R^8$ and $G^2$ are especially those described hereinbelow for the compounds of formula (IV).

Preferred modes for $G^3$ are especially those described hereinbelow for the compounds of formula (VIII).

Preferably, the compounds of formulae (I) and (II) are those for which:

n represents 0, 1, 2, 3, 4, 9 or 28;

m represents 0 or 1;

p represents 0 or 1 or 9 or 10;

q represents 0 or 1;

$F^1$ represents a radical chosen from a hydrogen atom, a (hetero)aryl group comprising from to 12 carbon atoms, a —COOZ group (formula (I) with Z being as defined above in formula (I), or, respectively, a —COOZ''' group with Z''' being as defined in formula (II)), a —C(O)NH$_2$ group, an —SMe group, or a guanidyl group of formula —NH—C(=NH)—NH$_2$, $F^2$ represents a radical chosen from a hydrogen atom or a linear or branched alkyl group comprising from 1 to 10 carbon atoms, $F^3$ represents a radical chosen from a hydrogen atom or a linear or branched alkyl group comprising from 1 to 10 carbon atoms;

$R^1$, $R^2$, $R^3$ and $R^4$ each represent, independently of one another, a hydrogen atom, or a linear or branched alkyl group comprising from 1 to 10 carbon atoms, even more preferentially from to 5 carbon atoms, or an arylalkyl group comprising from 7 to 20 carbon atoms, or an aryl group comprising from 6 to 12 carbon atoms.

Even more preferably, the compounds of formulae (I) and (II) are those for which:

n represents 0, 1, 2, 3 or 4;

m represents 0 or 1;

p represents 0 or 1;

q represents 0 or 1;

$F^1$ represents a radical chosen from a hydrogen atom, a heteroaryl group comprising from 4 to 12 carbon atoms, a —COOZ group (Z being as defined above in formula (I)), a —C(O)NH$_2$ group, an —SMe group, or a guanidyl group of formula —NH—C(=NH)—NH$_2$, $F^2$ represents a radical chosen from a hydrogen atom or a linear or branched alkyl group comprising from 1 to 5 carbon atoms, $F^3$ represents a radical chosen from a hydrogen atom;

$R^1$, $R^2$, $R^3$ and $R^4$ each represent, independently of one another, a hydrogen atom, or a linear or branched alkyl group comprising from 1 to 5 carbon atoms, or a benzyl group, or a phenyl group.

Preferably, in the compounds of formula (I):

f represents 1 or 2; and f' represents 0 (zero).

The compounds of formula (I) may have one of the following formulae (I-A), (I-B), (I-C) or (I-D):

(I-A)

in which:

$R^1$, $R^2$, $R^3$, $R^4$, n, m, p, q, e, f, f', Z, $G^1$ and $R^{ac}$ are as defined above in formula (I), $X^1$ represents $F^1$ as defined above or -Ph-XH or —XH with X representing O or S or Se and Ph representing a phenyl group;

$X^2$ represents $F^2$ as defined above or -Ph-XH or —XH with X representing O or S or Se and Ph representing a phenyl group;

$X^3$ represents $F^3$ as defined above or -Ph-XH or —XH with X representing O or S or Se and Ph representing a phenyl group;

provided that at most one of the radicals $X^1$, $X^2$ or $X^3$ represents a radical -Ph-XH or —XH with X representing O or S or Se and Ph representing a phenyl radical;

(I-B)

in which $F^2$, $F^3$, $R^1$, $R^2$, $R^3$, $R^4$, n, m, p, e, f, f', Z, $G^1$ and $R^{ac}$ are as defined above for formula (I);

(I-C)

in which $F^1$, $F^3$, $R^1$, $R^2$, $R^3$, $R^4$, $F^2$, m, p, q, e, f, f', $G^1$, Z and $R^{ac}$ are as defined above for formula (I);

(I-D)

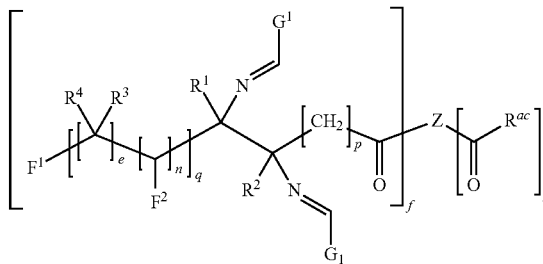

in which $F^1$, $F^2$, $R^1$, $R^2$, $R^3$, $R^4$, $F^2$, n, m, p, q, e, f, f', $G^1$, Z and $R^{ac}$ are as defined above for formula (I).

Even more preferably, the compounds of formula (I) are compounds of abovementioned formula (I-A).

Aldimines of formula (O-A) Preferably, the compounds of formula (I-A) are those in which:
- n represents 0, 1, 2, 3 or 4;
- m represents 0 or 1;
- p represents 0 or 1;
- q represents 0 or 1;
- e is an integer ranging from 1 to 3;
- $F^1$ represents a radical chosen from a hydrogen atom, a (hetero)aryl group comprising from to 12 carbon atoms, a —COOZ group, a —C(O)NH$_2$ group, an —SMe group, or a guanidyl group of formula —NH—C(=NH)—NH$_2$,
- $F^2$ represents a radical chosen from a hydrogen atom or a linear or branched alkyl group comprising from 1 to 10 carbon atoms,
- $F^3$ represents a radical chosen from a hydrogen atom;
- $R^1$, $R^2$, $R^3$ and $R^4$ each represent, independently of one another, a hydrogen atom, or a linear or branched alkyl group comprising from 1 to 10 carbon atoms, even more preferentially from to 5 carbon atoms, or a benzyl group, or a phenyl group.

The compounds of formula (I-A) may have one of the following formulae (I-A-1), (I-A-2) or (I-A-3):

(I-A-1)

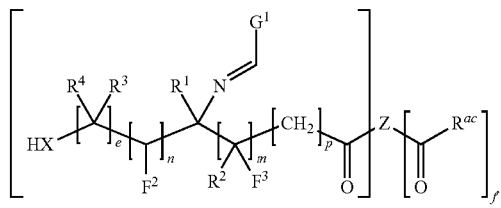

in which X, $R^1$, $R^2$, $R^3$, $R^4$, n, m, p, e, f, f', Z, $F^2$, $F^3$, $G^1$ and $R^{ac}$ are as defined above in formula (I-A);

(I-A-2)

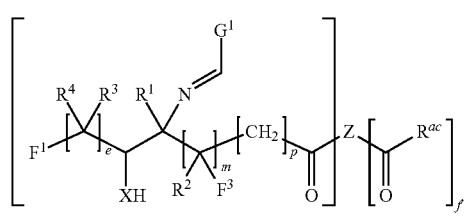

in which $R^1$, $R^2$, $R^3$, $R^4$, m, p, e, f, f', Z, X, $G^1$, $F^1$, $F^3$, $G^1$ and $R^{ac}$ are as defined above in formula (I-A), (I-A-3)

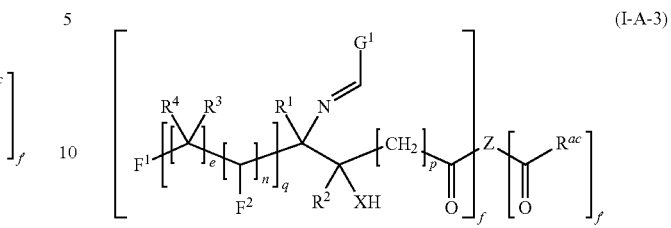

in which $R^1$, $R^2$, $R^3$, $R^4$, n, p, q, e, f, f', Z, X, $G^1$, $F^1$, $F^2$, $R^{ac}$ are as defined above in formula (I-A).

Preferably, in the compounds of formula (I-A), (I-A-1), (I-A-2) and (I-A-3):
- f represents 1 or 2, and
- f' represents 0 (zero).

Aldimines of formula (I-B)

Preferably, the compounds of formula (I-B) are those in which:
- n represents 0, 3 or 4;
- m represents 0;
- p represents 0;
- e is an integer ranging from 1 to 3;
- $F^2$ represents a hydrogen atom;
- $F^3$ represents a radical chosen from a hydrogen atom or a linear or branched alkyl group comprising from 1 to 10 carbon atoms;
- $R^1$, $R^2$, $R^3$ and $R^4$ each represent, independently of one another, a hydrogen atom or a linear or branched alkyl group comprising from 1 to 10 carbon atoms, even more preferentially from to 5 carbon atoms.

The compounds of formula (I-B) may have one of the following formulae (I-B-1), (I-B-2) or (I-B-3):

(I-B-1)

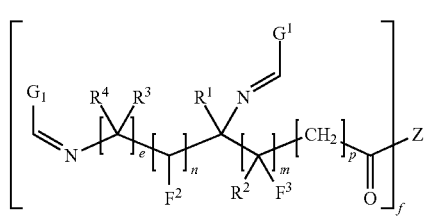

in which $F^2$, $F^3$, $R^1$, $R^2$, $R^3$, $R^4$, n, m, p, e, f, $G^1$ and Z are as defined above in formula (I-B), (I-B-2)

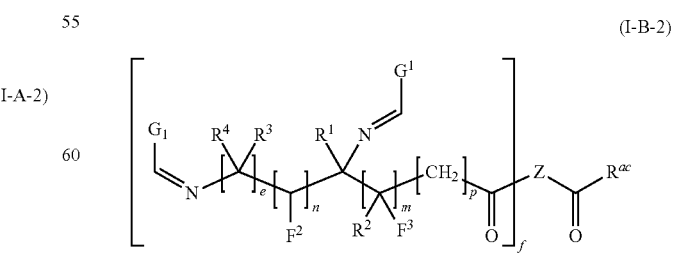

in which $F^2$, $F^3$, $R^1$, $R^2$, $R^3$, $R^4$, n, m, p, e, f, $G^1$, Z and $R^{ac}$ are as defined above in formula (I-B), (I-B-3)

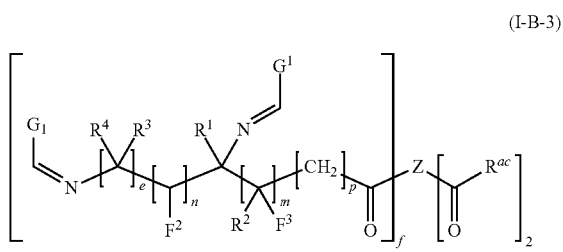

in which $F^2$, $F^3$, $R^1$, $R^2$, $R^3$, $R^4$, n, m, p, e, f, $G^1$, Z and $R^{ac}$ are as defined above in formula (I-B).

Aldimines of formula (I-C)

Preferably, the compounds of formula (I-C) are those in which:

m represents 0;

p represents 0;

e is an integer ranging from 1 to 3;

$F^1$ represents a radical chosen from a hydrogen atom or a linear or branched alkyl group comprising from 1 to 10 carbon atoms, $F^3$ represents a radical chosen from a hydrogen atom or a linear or branched alkyl group comprising from 1 to 10 carbon atoms;

$R^1$, $R^2$, $R^3$ and $R^4$ each represent, independently of one another, a hydrogen atom or a linear or branched alkyl group comprising from 1 to 10 carbon atoms, even more preferentially from to 5 carbon atoms.

The compounds of formula (I-C) may have one of the following formulae (I-C-1), (I-C-2) or (I-C-3):

(I-C-1)

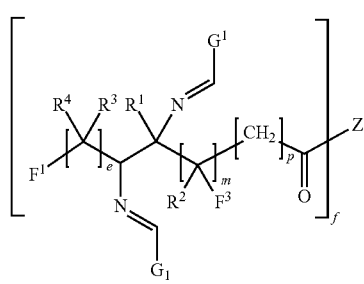

in which $F^1$, $F^3$, $R^1$, $R^2$, $R^3$, $R^4$, $F^2$, m, p, q, e, f, $G^1$ and Z are as defined above in formula (I-C), (I-C-2)

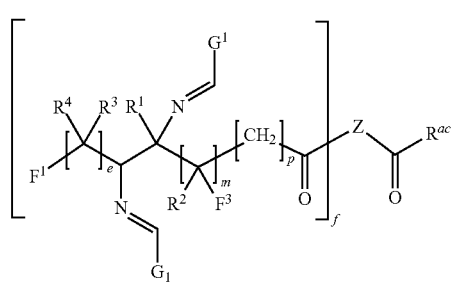

in which $F^1$, $F^3$, $R^1$, $R^2$, $R^3$, $R^4$, $F^2$, m, p, q, e, f, $G^1$, Z and $R^{ac}$ are as defined above in formula (I-C), (I-C-3)

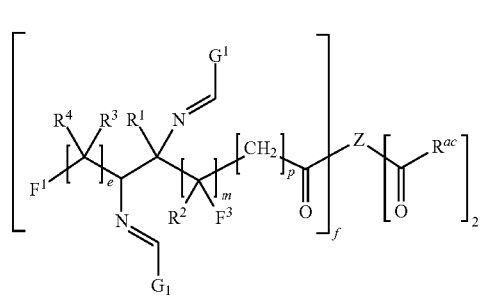

in which $F^1$, $F^3$, $R^1$, $R^2$, $R^3$, $R^4$, $F^2$, m, p, q, e, f, $G^1$, Z and $R^{ac}$ are as defined above in formula (I-C).

Aldimines of formula (I-D)

Preferably, the compounds of formula (I-D) are those in which:

n represents 0 or 3;

p represents 0;

q represents 0 or 1;

e is an integer ranging from 1 to 3;

$F^1$ represents a radical chosen from a hydrogen atom or a linear or branched alkyl group comprising from 1 to 10 carbon atoms, $F^3$ represents a radical chosen from a hydrogen atom or a linear or branched alkyl group comprising from 1 to 10 carbon atoms;

$R^1$, $R^2$, $R^3$ and $R^4$ each represent, independently of one another, a hydrogen atom or a linear or branched alkyl group comprising from 1 to 10 carbon atoms, even more preferentially from to 5 carbon atoms.

The compounds of formula (I-D) may have one of the following formulae (I-D-1), (I-D-2) or (I-D-3):

(I-D-1)

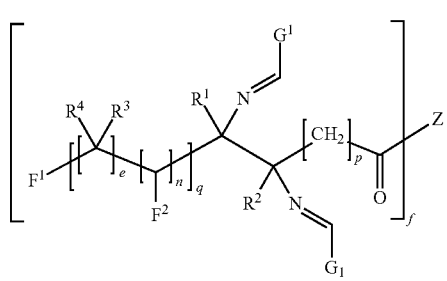

in which $F^1$, $F^2$, $R^1$, $R^2$, $R^3$, $R^4$, $F^2$, n, m, p, q, e, f, $G^1$ and Z are as defined above in formula (I-D);

(I-D-2)

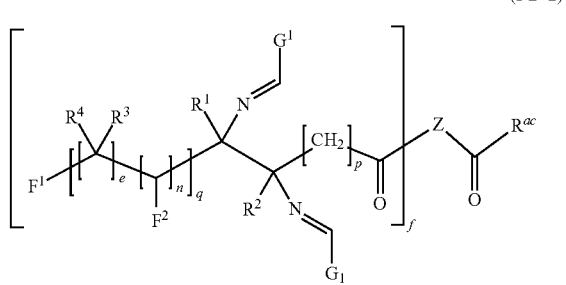

in which $F^1$, $F^2$, $R^1$, $R^2$, $R^3$, $R^4$, $F^2$, n, m, p, q, e, f, $G^1$, Z and $R^{ac}$ are as defined above in formula (I-D),

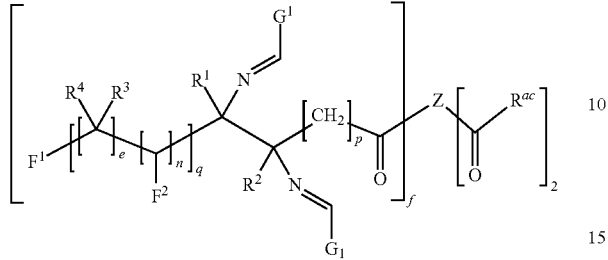

(I-D-3)

in which $F^1$, $F^2$, $R^1$, $R^2$, $R^3$, $R^4$, $F^2$, n, m, p, q, e, f, $G^1$, Z and $R^{ac}$ are as defined above in formula (I-D).

B. Aldimine precursors of formulae (III) and (III')

B.1. Aldimine Precursors of Formula (IIII)

The compounds of abovementioned formula (I) can be obtained by reaction between:

a compound of formula (III) below:

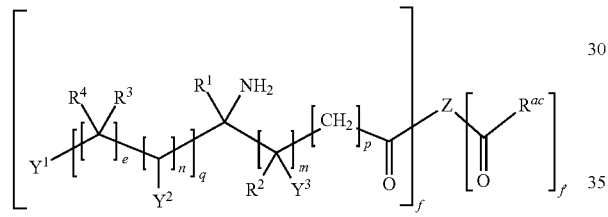

(III)

in which:
- $Y^1$ represents $F^1$ or —$NH_2$ or -Ph-XH or —XH with X representing O or S or Se and Ph representing a phenyl group;
- $Y^2$ represents $F^2$ or —$NH_2$ or -Ph-XH or —XH with X representing O or S or Se and Ph representing a phenyl group;
- $Y^3$ represents $F^3$ or —$NH_2$ or -Ph-XH or —XH with X representing O or S or Se and Ph representing a phenyl group;
- provided that at most just one radical from among the radicals $Y^1$, $Y^2$ and $Y^3$ represents —$NH_2$, provided that at most just one radical from among the radicals $Y^1$, $Y^2$ and $Y^3$ represents -Ph-XH or —XH;
- provided that when $Y^1$=—$NH_2$, then q=1;
- provided that when $Y^1$=—$NH_2$ or —XH or -Ph-XH, then $Y^2$=$F^2$ and $Y^3$=$F^3$;
- provided that when $Y^2$=—$NH_2$ or —XH or -Ph-XH, then $Y^1$=$F^1$ and $Y_3$=$F^3$;
- provided that when $Y^3$=—$NH_2$ or —XH or -Ph-XH, then $Y^2$=$F^2$ and $Y^1$=$F^1$;
- $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 4 to 12 carbon atoms;
- n is an integer ranging from 0 to 28;
- p is an integer ranging from 0 to 10;
- m represents 0 or 1;
- q represents 0 or 1;
- e is an integer ranging from 1 to 3;
- f is an integer or non-integer ranging from 1 to 3, f preferably being an integer equal to 1, 2 or 3;
- f' is an integer or non-integer ranging from 0 to 2, f' preferably being an integer equal to 0, 1 or 2;
- the sum f+f' represents an integer ranging from 1 to 3;
- Z represents a monovalent organic radical $Z^m$, divalent organic radical $Z^d$ or trivalent organic radical $Z^t$, having a number-average molecular mass (Mn) ranging from 16 to 22 000 g/mol;
- $R^1$ represents a hydrogen atom or a monovalent hydrocarbon radical comprising from 1 to carbon atoms, it being possible for said radical to optionally comprise one or more heteroatoms;

and a compound of formula (IV) below:

(IV)

in which $G^1$ is as defined above in formula (I).

In the present application, the condition according to which "at most just one radical from among the radicals $Y^1$, $Y^2$ and $Y^3$ represents —$NH_2$" means that either none of the radicals $Y^1$, $Y^2$ and $Y^3$ represents —$NH_2$, or just one radical from among the radicals $Y^1$, $Y^2$ and $Y^3$ represents —$NH_2$.

In formula (III) above, when f'=0 and f=1, then Z is a monovalent radical $Z^m$.

In formula (III) above, when f'=0 and f=2, then Z is a divalent radical $Z^d$.

In formula (III) above, when f'=0 and f=3, then Z is a trivalent radical $Z^t$.

In formula (III) above, when f'=1 and f=1, then Z is a divalent radical $Z^d$.

In formula (III) above, when f'=2 and f=1, then Z is a trivalent radical $Z^t$.

In formula (III) above, when f+f'=1, then Z is a monovalent radical $Z^m$.

In formula (III) above, when f+f'=2, then Z is a divalent radical $Z^d$.

In formula (III) above, when f+f'=3, then Z is a trivalent radical $Z^t$.

The reaction between a compound of abovementioned formula (III) and a compound of abovementioned formula (IV) can be carried out according to a procedure similar to that used (example 15) in U.S. Pat. No. 5,087,661, that is to say by azeotropic entrainment of the water formed at approximately 90° C. in the presence of toluene as reaction solvent.

The compound of formula (IV) can be used in a stoichiometric amount or in excess relative to the compound of formula (III) depending on whether it is more or less easy to remove the unreacted aldehyde of formula (IV) under reduced pressure (around 1 mmHg) at 150° C. at the same time as the toluene.

The compounds of formula (III) may have one of the following formulae (III-A), (III-B), (III-C) or (III-D):

(III-A)

in which:
$R^1$, $R^2$, $R^3$, $R^4$, n, m, p, q, e, f, f', Z and $R^{ac}$ are as defined above, $Y^1$ represents $F^1$ as defined above in formula (III) or -Ph-XH or —XH with X representing O or S or Se and Ph representing a phenyl group;

$Y^2$ represents $F^2$ as defined above in formula (III) or -Ph-XH or —XH with X representing O or S or Se and Ph representing a phenyl group;

$Y^3$ represents $F^3$ as defined above in formula (III) or -Ph-XH or —XH with X representing O or S or Se and Ph representing a phenyl group;

provided that at most one of the radicals $Y^1$, $Y^2$ or $Y^3$ represents a radical -Ph-XH or —XH with X representing O or S or Se and Ph representing a phenyl radical;

(III-B)

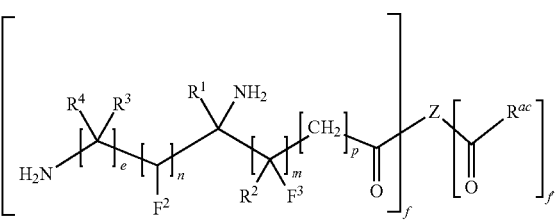

in which $R^1$, $R^2$, $R^3$, $R^4$, $F^2$, $F^3$, n, m, p, e, f, f', Z and $R^{ac}$ are as defined above in formula (III), (III-C)

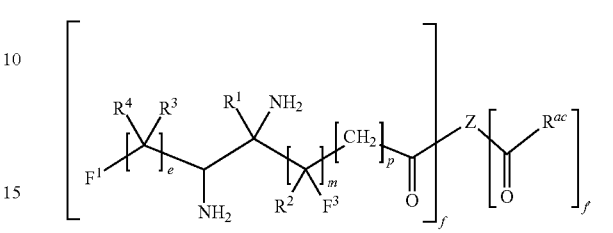

in which $R^1$, $R^2$, $R^3$, $R^4$, $F^1$, $F^3$, m, p, e, f, f', Z and $R^{ac}$ are as defined above in formula (III), (III-D)

in which $R^1$, $R^2$, $R^3$, $R^4$, $F^1$, $F^2$, n, q, p, e, f, f', Z and $R^{ac}$ are as defined above in formula (III).

Even more preferably, the compounds of formula (III) are compounds of abovementioned formula (III-A).

Compounds of formula (III-A)

Preferably, the compounds of formula (III-A) are those in which:

m represents 0 or 1;

p represents 0 or 1;

n represents 0, 1, 2, 3 or 4;

q represents 0 or 1;

e is an integer ranging from 1 to 3;

$F^1$ represents a radical chosen from a hydrogen atom, a (hetero)aryl group comprising from to 12 carbon atoms, a —COOZ group, a —C(O)NH$_2$ group, an —SMe group, or a guanidyl group of formula —NH—C(=NH)—NH$_2$, $F^2$ represents a radical chosen from a hydrogen atom or a linear or branched alkyl group comprising from 1 to 10 carbon atoms, $F^3$ represents a hydrogen atom;

$R^1$, $R^2$, $R^3$ and $R^4$ each represent, independently of one another, a hydrogen atom, or a linear or branched alkyl group comprising from 1 to 10 carbon atoms, even more preferentially from to 5 carbon atoms, or a benzyl group, or a phenyl group.

The compounds of formula (IIII-A) may have one of the following formulae (III-A-1), (III-A-2) or (III-A-3):

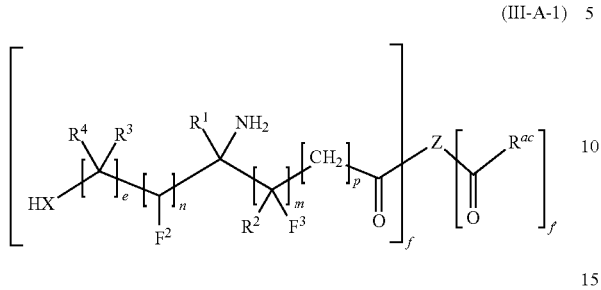

(III-A-1)

in which X, R¹, R², R³, R⁴, X, F², F³, n, m, p, e, f, f', Z and $R^{ac}$ are as defined above in formula (III-A);

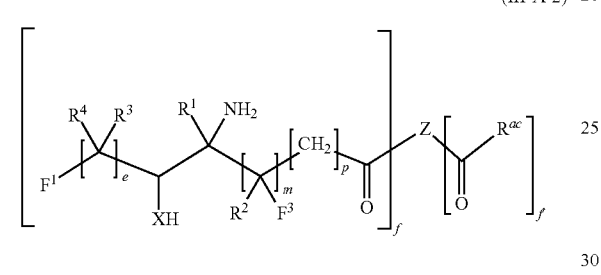

(III-A-2)

in which X, R¹, R², R³, R⁴, X, F¹, F³, m, p, e, f, f', Z and $R^{ac}$ are as defined above in formula (III-A),

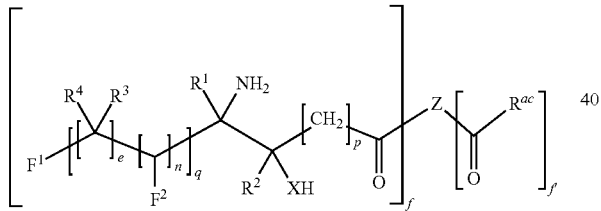

(III-A-3)

in which X, R¹, R², R³, R⁴, X, F¹, F², n, p, q, e, f, f', Z and $R^{ac}$ are as defined above in formula (III-A).

Preferably, in the compounds of formulae (III-A), (III-A-1), (III-A-2) and (III-A-3):
f represents 1 or 2, and
f' represents 0 (zero).

Compounds of formula (III-B)
Preferably, the compounds of formula (III-B) are those in which:
n represents 0, 3 or 4;
m represents 0;
p represents 0;
e is an integer ranging from 1 to 3;
F² represents a hydrogen atom;
F³ represents a radical chosen from a hydrogen atom or a linear or branched alkyl group comprising from 1 to 10 carbon atoms;
R¹, R², R³ and R⁴ each represent, independently of one another, a hydrogen atom or a linear or branched alkyl group comprising from 1 to 10 carbon atoms, even more preferentially from to 5 carbon atoms.

Compounds of formula (III-C)
Preferably, the compounds of formula (III-C) are those in which:
m represents 0;
p represents 0;
e is an integer ranging from 1 to 3;
F¹ represents a radical chosen from a hydrogen atom or a linear or branched alkyl group comprising from 1 to 10 carbon atoms,
F³ represents a radical chosen from a hydrogen atom or a linear or branched alkyl group comprising from 1 to 10 carbon atoms;
R¹, R², R³ and R⁴ each represent, independently of one another, a hydrogen atom or a linear or branched alkyl group comprising from 1 to 10 carbon atoms, even more preferentially from to 5 carbon atoms.

Compounds of formula (III-D)
Preferably, the compounds of formula (III-D) are those in which:
n represents 0 or 3;
p represents 0;
q represents 0 or 1;
e is an integer ranging from 1 to 3;
F¹ represents a radical chosen from a hydrogen atom or a linear or branched alkyl group comprising from 1 to 10 carbon atoms,
F³ represents a radical chosen from a hydrogen atom or a linear or branched alkyl group comprising from 1 to 10 carbon atoms;
R¹, R², R¹ and R⁴ each represent, independently of one another, a hydrogen atom or a linear or branched alkyl group comprising from 1 to 10 carbon atoms, even more preferentially from to 5 carbon atoms.

Compounds of formula (IV)
The compounds of formula (IV) may have one of the following formulae (IV-A) or (IV-B):

(IV-A)

in which:
R⁶ and R⁷ each represent, independently of one another, a monovalent hydrocarbon radical comprising from 1 to 12 carbon atoms, said radical being optionally substituted by an —OH group;
or R⁶ and R⁷ together form an aliphatic ring comprising from 4 to 12 carbon atoms, said ring being optionally substituted;
R⁶ represents a monovalent hydrocarbon radical comprising from 1 to 60 carbon atoms, said radical optionally comprising a heteroatom;

(IV-B)

in which G² represents an optionally substituted heteroaryl radical, or a radical —C(O)—R¹² with R¹² representing an alkoxy radical, an alkenyl radical, or an arylalkenyl radical comprising at least 6 carbon atoms, said radical $G^2$ having a molar mass or a number-average molecular mass (Mn) ranging from to 4000 g/mol, preferably ranging from 60 to 2000 g/mol, preferentially ranging from 60 to 1000 g/mol and even more preferentially ranging from 60 to 500 g/mol.

According to one embodiment, $G^2$ represents a heteroaryl radical substituted by at least one radical chosen from —$OR^{19}$, —O—C(=O)—$NHR^{23}$, —O—C(=O)$R^{24}$, —$CH_2$—$OR^{20}$, —$CH_2$—O—C(=O)—$R^{21}$, —$COOR^a$, —C(=O)—$NR^{16}R^{17}$ and —$CH_2$—O—C(=O)—$NHR^{22}$, with $R^{19}$, $R^{20}$, $R^{21}$, $R^{22}$, $R^{23}$ and $R^{24}$ representing, independently of one another, a linear or branched, cyclic or non-cyclic, saturated or unsaturated alkyl group, a hydrogen atom, or an aryl group; $R^a$ representing a linear or branched alkyl radical or a (hetero)aryl radical, or an arylalkyl radical; $R^{16}$ and $R^{17}$ each representing, independently of one another, a hydrogen, a linear or branched alkyl radical, a cycloalkyl radical, or an arylalkyl radical, or $R^{16}$ and $R^{17}$ together form an aliphatic ring comprising from 4 to 12 carbon atoms, said ring being optionally substituted and optionally comprising one or more heteroatoms.

Preferably, the compounds of formula (IV-A) are those for which:

$R^6$ and $R^7$ each represent, independently of one another, a linear or branched alkyl radical comprising from 1 to 12 carbon atoms, said radical being optionally substituted by an —OH group; and/or $R^8$ represents one of the following radicals:

a radical —$CH_2$—W in which W represents an optionally substituted aryl group or an optionally substituted heterocycloalkyl, or a radical —CH($R^9$)—O—$R^{10}$ in which $R^9$ represents a hydrogen, a linear or branched alkyl radical, a cycloalkyl radical, an arylalkyl radical, or an alkoxycarbonyl radical comprising from 1 to 12 carbon atoms; and $R^{10}$ represents a hydrogen or a hydrocarbon radical comprising from 1 to 30 carbon atoms, said radical optionally comprising one or more oxygen atoms; or a radical —CH($R^9$)—O—C(O)—$R^{11}$ in which $R^9$ represents a hydrogen, a linear or branched alkyl radical, a cycloalkyl radical, an arylalkyl radical, or an alkoxycarbonyl radical comprising from 1 to 12 carbon atoms; and $R^{1'}$ represents a hydrogen or a linear or branched alkyl radical comprising from 1 to 30 carbon atoms, said alkyl radical optionally comprising cyclic portions and optionally at least one heteroatom; or a radical —CH($R^{15}$)—$NR^{16}R^{17}$ in which $R^{15}$ represents a hydrogen, a linear or branched alkyl radical, a cycloalkyl radical, an arylalkyl radical, or an alkoxycarbonyl radical comprising from 1 to 12 carbon atoms; and $R^{16}$ and $R^{17}$ represent, independently of one another, a hydrogen, a linear or branched alkyl radical, a cycloalkyl radical or an arylalkyl radical;

or $R^{16}$ and $R^{17}$ together form an aliphatic ring comprising from 4 to 12 carbon atoms, said ring being optionally substituted and optionally comprising one or more heteroatoms; or a radical —CH($R^9$)—O—C(O)—$NHR^{18}$ in which $R^9$ represents a hydrogen, a linear or branched alkyl radical, a cycloalkyl radical, an arylalkyl radical, or an alkoxycarbonyl radical comprising from 1 to 12 carbon atoms; and $R^{18}$ represents a hydrogen or a linear or branched alkyl radical comprising from 1 to 30 carbon atoms; or a radical —C(=O)—O—$R^a$ with $R^a$ representing a linear or branched alkyl radical or a (hetero)aryl radical, or an arylalkyl radical; or a radical —C(=O)—N($R^{16}$)($R^{11}$) with $R^{16}$ and $R^{17}$ each representing, independently of one another, a hydrogen, a linear or branched alkyl radical, a cycloalkyl radical, or an arylalkyl radical or $R^{16}$ and $R^{17}$ together form an aliphatic ring comprising from to 12 carbon atoms, said ring being optionally substituted and optionally comprising one or more heteroatoms.

Preferably, the compounds of formula (IV-B) are those for which $G^2$ represents a (hetero)aryl radical comprising from 5 to 12 carbon atoms, preferably substituted by at least two alkyl groups or by at least one —$CH_2OH$ group or by at least one —OH group.

The compounds of formula (IV-A) preferably have one of the following formulae (IV-A-1), (IV-A-2), (IV-A-3), (IV-A-4) or (IV-A-5):

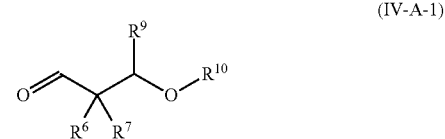

(IV-A-1)

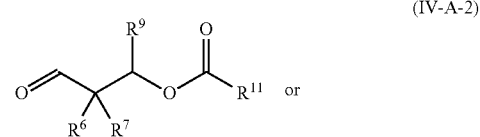

(IV-A-2)

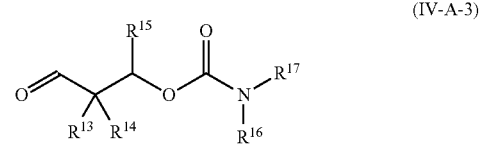

(IV-A-3)

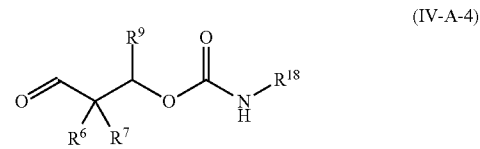

(IV-A-4)

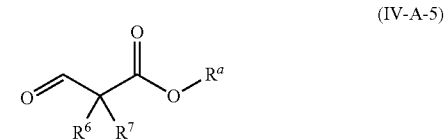

(IV-A-5)

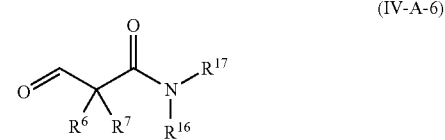

(IV-A-6)

in which:

$R^6$ and $R^7$ each represent, independently of one another, a monovalent hydrocarbon radical comprising from 1 to 12 carbon atoms, said radical being optionally substituted by an —OH group;

or $R^6$ and $R^7$ together form an aliphatic ring comprising from 4 to 12 carbon atoms, said ring being optionally substituted;

$R^9$ represents a hydrogen, a linear or branched alkyl radical, a cycloalkyl radical, an arylalkyl radical or an alkoxycarbonyl radical comprising from 1 to 12 carbon atoms;

$R^{10}$ represents a hydrogen or a hydrocarbon radical comprising from 1 to 30 carbon atoms, said radical optionally comprising one or more oxygen atoms;

$R^{11}$ represents a hydrogen, or a linear or branched alkyl radical comprising from 1 to 30 carbon atoms, said alkyl radical optionally comprising cyclic portions and optionally at least one heteroatom;

$R^{13}$ and $R^{14}$ each represent, independently of one another, a monovalent hydrocarbon radical comprising from 1 to 12 carbon atoms, said radical being optionally substituted by an —OH group;

or $R^{14}$ and $R^{13}$ together form an aliphatic ring comprising from 4 to 12 carbon atoms, said ring being optionally substituted;

$R^{15}$ represents a hydrogen, a linear or branched alkyl radical, a cycloalkyl radical, an arylalkyl radical or an alkoxycarbonyl radical comprising from 1 to 12 carbon atoms;

$R^{16}$ and $R^{17}$ each represent, independently of one another, a hydrogen, a linear or branched alkyl radical, a cycloalkyl radical, or an arylalkyl radical;

or $R^{16}$ and $R^{17}$ together form an aliphatic ring comprising from 4 to 12 carbon atoms, said ring being optionally substituted and optionally comprising one or more heteroatoms;

$R^{18}$ represents a hydrogen or a linear or branched alkyl radical comprising from 1 to 30 carbon atoms;

$R^a$ representing a linear or branched alkyl radical or a (hetero)aryl radical, or an arylalkyl radical.

Among the aldehydes of formula (IV-A), mention may for example be made of pivalaldehyde (=2,2-dimethylpropanal), 2,2-dimethylbutanal, 2,2-diethylbutanal, 1-methylcyclopentanecarboxaldehyde, 1-methylcyclohexanecarboxaldehyde; ethers derived from 2-hydroxy-2-methylpropanal and alcohols such as propanol, isopropanol, butanol and 2-ethylhexanol; esters derived from 2-formyl-2-methylpropionic acid or 3-formyl-3-methylbutyric acid and alcohols such as propanol, isopropanol, butanol and 2-ethylhexanol; esters derived from 2-hydroxy-2-methylpropanal and carboxylic acids such as butyric acid, isobutyric acid, and 2-ethylhexanoic acid; and also ethers and esters derived from 3-hydroxypropanal that is 2,2-disubstituted, hydroxybutanals or higher homologous aldehydes, such as for example 2,2-dimethyl-3-hydroxypropanal as described below.

The aldehydes of formula (IV-A-1) represent in particular aliphatic, cycloaliphatic or arylaliphatic ethers obtained from 3-hydroxyaldehydes that are 2,2-disubstituted and alcohols, such as for example with fatty alcohols, or phenols of formula $R^{10}$—OH.

The 2,2-disubstituted 3-hydroxyaldehydes may be obtained via a cross reaction between primary or secondary aliphatic aldehydes, such as for example formaldehyde, and secondary aliphatic, cycloaliphatic or arylaliphatic aldehydes, such as for example isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde. Among the examples of 2,2-disubstituted 3-hydroxyaldehydes, mention may be made of 2,2-dimethyl-3-hydroxypropanal, 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl)cyclopentanecarboxaldehyde, 1-(hydroxymethyl)cyclohexanecarboxaldehyde, 1-(hydroxymethyl)cyclohex-3-enecarboxaldehyde, 2-(hydroxymethyl)-2-methyl-3-phenylpropanal, 3-hydroxy-2-methyl-2-phenylpropanal and 3-hydroxy-2,2-diphenylpropanal.

Particularly preferred aldehydes of formula (IV-A-1) are 2,2-dimethyl-3-phenoxypropanal, 3-cyclohexyloxy-2,2-dimethylpropanal, 2,2-dimethyl-3-(2-ethylhexyloxy)propanal, 2,2-dimethyl-3-lauroxypropanal, 2,2-dimethyl-3-stearoxypropanal, 3-hydroxy-2,2-dimethylpropanal and 3-hydroxy-2-(hydroxymethyl)-2-methylpropionaldehyde.

According to one embodiment, the compounds of formula (IV-A-1) are those for which:

$R^6$ and $R^7$ each represent, independently of one another, a linear or branched alkyl radical comprising from 1 to 12 carbon atoms, said radical being optionally substituted by an —OH group;

$R^9$ represents a hydrogen;

$R^{10}$ represents a hydrogen.

The aldehydes of formula (IV-A-2) represent in particular esters of 2,2-disubstituted 3-hydroxyaldehydes, such as for example 2,2-dimethyl-3-hydroxypropanal, 2-(hydroxymethyl)-2-methylbutanal, 2-(hydroxymethyl)-2-ethylbutanal, 2-(hydroxymethyl)-2-methylpentanal, 2-(hydroxymethyl)-2-ethylhexanal, 1-(hydroxymethyl)cyclopentanecarboxaldehyde, 1-(hydroxymethyl)cyclohexanecarboxaldehyde, 1-(hydroxymethyl)cyclohex-3-enecarboxaldehyde, 2-(hydroxymethyl)-2-methyl-3-phenylpropanal, 3-hydroxy-2-methyl-2-phenylpropanal and 3-hydroxy-2,2-diphenylpropanal, with carboxylic acids.

The carboxylic acids that can be used for this reaction are, for example, saturated aliphatic carboxylic acids such as formic acid, acetic acid, propionic acid, butyric acid, isobutyric acid, valeric acid, caproic acid, 2-ethylcaproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid and arachidic acid; unsaturated aliphatic carboxylic acids such as palmitoleic acid, oleic acid and erucic acid; polyunsaturated aliphatic carboxylic acids such as linoleic acid, linolenic acid, eleostearic acid and arachidonic acid; cycloaliphatic carboxylic acids such as cyclohexanecarboxylic acids; arylaliphatic acids such as phenylacetic acid; aromatic carboxylic acids such as benzoic acid, naphthoic acid, toluic acid and anisic acid; isomers of these acids; mixtures of fatty acids resulting from the saponification of natural fats and oils such as rapeseed oil, sunflower oil, linseed oil, olive oil, coconut oil, palm kernel oil, and palm oil; and also dicarboxylic acid monoalkyl and monoaryl esters, obtained by simple esterification of dicarboxylic acids such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives based on polyethylene glycol, with alcohols such as methanol, ethanol, propanol, butanol, higher homologs and isomers of these alcohols.

Among the aldehydes of formula (IV-A-2), mention may for example be made of 2,2-dimethyloxopropyl acetate, or 2,2-dimethyl-3-oxopropyl dodecanoate.

According to one embodiment, the compounds of formula (IV-A-2) are those for which:

$R^6$ and $R^7$ each represent, independently of one another, a linear or branched alkyl radical comprising from 1 to 12 carbon atoms, said radical being optionally substituted by an —OH group;

$R^9$ represents a hydrogen;

$R^{11}$ represents a hydrogen or a linear or branched alkyl radical comprising from 1 to 30 carbon atoms, preferentially from 1 to 11 carbon atoms.

According to one embodiment, the compounds of formula (IV-A-3) are those for which:

$R^{13}$ and $R^{14}$ each represent, independently of one another, a linear or branched alkyl radical comprising from 1 to 12 carbon atoms;

$R^{15}$ represents a hydrogen;

$R^{16}$ and $R^{17}$ together form an aliphatic ring comprising from 4 to 12 carbon atoms, said ring comprising a heteroatom.

Among the aldehydes of formula (IV-A-3), mention may for example be made of 2,2-dimethyl-3-(morpholin-4-yl) propanal (CAS number: 23588-51-4).

Among the aldehydes of formula (IV-A-5), mention may for example be made of the following compounds:

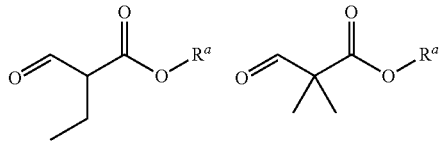

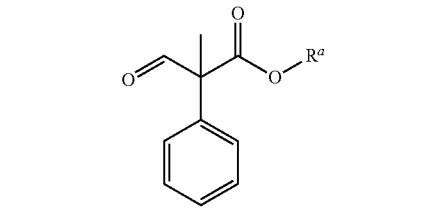

with $R^a$ being as defined above.

Among the aldehydes of formula (IV-B), mention may for example be made of the aldehydes of the following formulae (IV-B-1), (IV-B-2), (IV-B-3), (IV-B-4), (IV-B-5), (IV-B-6), (IV-B-7) or (IV-B-8):

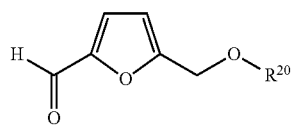
(IV-B-1)

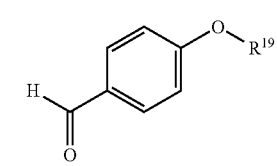
(IV-B-2)

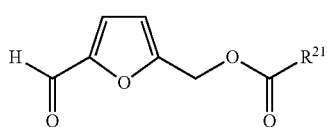
(IV-B-3)

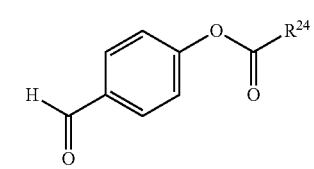
(IV-B-4)

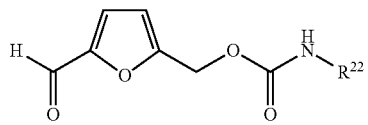
(IV-B-5)

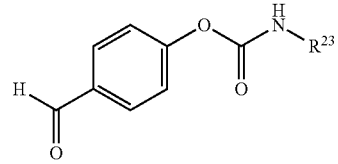
(IV-B-6)

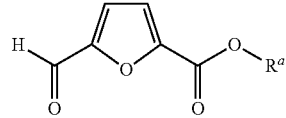
(IV-B-7)

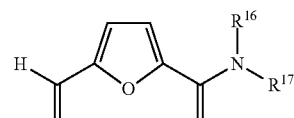
(IV-B-8)

in which $R^a$, $R^{16}$, $R^{17}$, $R^{19}$, $R^{20}$, $R^{21}$, $R^{22}$, $R^{23}$, and $R^{24}$ are as defined above.

Among the aldehydes of formula (IV-B), mention may for example be made of 2- and 3- and 4-formylpyridine, 2-furfuraldehyde, 2-thiophenecarbaldehyde, quinoline-2-carbaldehyde and the 3-, 4-, 5-, 6-, 7- and 8-position isomers thereof; and also glyoxal, glyoxylic acid esters such as glyoxylic acid methyl ester, cinnamaldehyde, and substituted cinnamaldehydes; and dimethylcyclohex-3-ene-1-carbaldehyde.

According to one embodiment, the aldehydes of formula (IV) are chosen from the group consisting of 2,2-dimethyl-3-phenoxypropanal, 2,2-dimethyl-3-cyclohexyloxypropanal, 2,2-dimethyl-3-(2-ethylhexyloxy)propanal, 2,2-dimethyl-3-lauryloxypropanal, 2,2-dimethyl-3-stearyloxypropanal, 2,2-dimethyl-3-(morpholin-4-yl) propanal, 2,2-dimethyl-3-oxopropyl acetate, 2,2-dimethyl-3-oxopropyl dodecanoate, 2,2-dimethyl-3-(m-phenyl) propanal, 2,2-dimethyl-3-(m-tolyl)propanal or majantal, dimethylcyclohex-3-ene-1-carbaldehyde, 3-hydroxy-2-(hydroxymethyl)-2-methylpropionaldehyde, and mixtures thereof.

Compounds of formula (III)

The compounds of formula (III) can be obtained via a process comprising the following steps:

i) step of reaction between:
a compound of formula (V) below, or one of its derivatives:

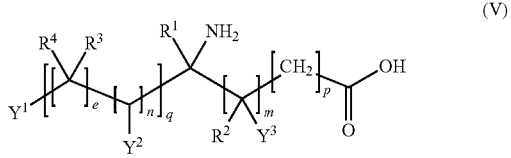
(V)

in which:
$Y^1$ represents $F^1$ or —$NH_2$ or -Ph-XH or —XH with X representing O or S or Se and Ph representing a phenyl group;

$Y^2$ represents $F^2$ or —$NH_2$ or -Ph-XH or —XH with X representing O or S or Se and Ph representing a phenyl group;

$Y^3$ represents $F^3$ or —$NH_2$ or -Ph-XH or —XH with X representing 0 or S or Se and Ph representing a phenyl group;

provided that at most just one radical from among the radicals $Y^1$, $Y^2$ and $Y^3$ represents —$NH_2$, provided that at most just one radical from among the radicals $Y^1$, $Y^2$ and $Y^3$ represents -Ph-XH or —XH;

provided that when $Y^1$=—$NH_2$, then q=1;

provided that when $Y^1$=—$NH_2$ or -Ph-XH or —XH, then $Y^2$=$F^2$ and $Y^3$=$F^3$;

provided that when $Y^2$=—$NH_2$ or -Ph-XH or —XH, then $Y^1$=$F^1$ and $Y_3$=$F^3$;

provided that when $Y^3$=—$NH_2$ or -Ph-XH or —XH, then $Y^1$=$F^1$ and $Y^2$=$F^2$;

$F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)$NH_2$ group, an —SMe group, or a guanidyl group of formula —NH—C(=NH)—$NH_2$, $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 5 to 12 carbon atoms;

n is an integer ranging from 0 to 28;
m represents 0 or 1;
p is an integer ranging from 0 to 10;
q represents 0 or 1;
e is an integer ranging from 1 to 3;
and a compound of formula (VI) below:

$$Z'(X^1H)_X \qquad (VI)$$

in which:
Z' represents a hydrogen atom or a monovalent organic radical $Z'^m$, divalent organic radical $Z'^d$ or trivalent organic radical $Z'^t$, having a molar mass or a number-average molecular mass (Mn) ranging from 1 to 20 000 g/mol;

$X^1$ represents 0 or NR' with R' representing a hydrogen atom or a linear or branched alkyl group comprising from 1 to 20 carbon atoms which may optionally comprise one or more heteroatoms, an arylalkyl group comprising from 1 to 20 carbon atoms, a (hetero)aryl group comprising from 4 to 12 carbon atoms, or a (hetero)cycloalkyl group comprising from 3 to 20 carbon atoms;

x represents an integer or non-integer ranging from 1 to 3;

and optionally a compound of formula (VII) below, when the compound of abovementioned formula (VI) is such that x=2 or 3:

$$R^{ac}-C(=O)-OH \qquad (VII)$$

in which $R^{ac}$ represents a hydrogen or a linear or branched, saturated or unsaturated, monovalent hydrocarbon radical comprising from 1 to 60 carbon atoms, preferentially from to 20 carbon atoms, it being possible for said radical to optionally comprise one or more heteroatoms;

ii) an optional deprotection step when step i) is carried out in the presence of a derivative of a compound of formula (V).

A derivative of a compound of abovementioned formula (V) is understood to mean a compound of formula (V) in which the —$NH_2$ group is protected by a protecting group P, forming an —NHP group. Step i) is in particular carried out with such a derivative of a compound of formula (V) when it takes place in the presence of a compound of formula (VI) and/or (VII). A derivative of a compound of formula (V) may for example be a compound of formula (V) in which the —$NH_2$ group(s) is/are protected in —NH-Boc form (Boc being tert-butyloxycarbonyl), in —NH-CBz form (CBz being N-benzyloxycarbonyl) or in —NH-Fmoc form (Fmoc being 9-fluorenylmethyloxycarbonyl).

A derivative of a compound of formula (V) may for example be prepared by reaction of a compound of formula (V) with di-tert-butyl dicarbonate to protect the —$NH_2$ group(s) in —NHBoc form in order to obtain N-Boc amino acids of the following formula:

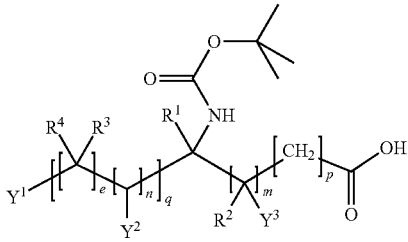

A derivative of a compound of formula (V) may for example be prepared by reaction of a compound of formula (V) with tert-butyldimethylsilyl chloride in dimethylformamide in the presence of imidazole to protect the —XH and -Ph-XH group(s) in —X-TBDMS form.

According to one embodiment, step i) is carried out in the presence of a compound of formula (VII) when the aim is to prepare a compound of formula (III) in which f' is other than 0. The reaction may take place at low temperature, that is to say at a temperature of less than or equal to 25° C.

Preferably, step i) is carried out with at least one compound of formula (V), and in the absence of compound of formula (VII).

Step i) may take place in molar amounts such that the —$X^1H$/—C(=O)OH molar ratio can range from 10:1 to 1:1.

When Z'(XH)x represents Z'(OH)x, the synthesis of the amino esters during step i) may be carried out in an organic solvent, for example chosen from ethers (for example ethyl ether or tetrahydrofuran), chlorinated solvents (for example dichloromethane) or directly in Z'(OH)x in excess depending on its boiling point under reduced pressure as described in Tetrahedron Letters (1986), 27 (41), pages 4975-4978 and in Tetrahedron (1988), 44 (17), 5495-506 (1988).

When Z'(XH)x represents Z'(NHR')x, the synthesis of the aminoamides during step i) may be carried out in an organic solvent, for example chosen from ethers (for example ethyl ether or tetrahydrofuran) or chlorinated solvents (for example dichloromethane) as described in Journal of Organic Chemistry (2006), 71(4), 1750-1753 from the corresponding amino esters.

Step ii) of deprotection of the —NH$_2$ functions in —NH-Boc form may be carried out by any conventional method known to those skilled in the art. It may for example be an acid hydrolysis step. For example, it is possible to carry out step ii) in the presence of trifluoroacetic acid or hydrochloric acid.

Step ii) of deprotection of the —XH and -Ph-XH functions in —X-TBDMS form may be carried out by any conventional method known to those skilled in the art. It may for example be a cleavage step. For example, it is possible to carry out step ii) in the presence of tetra-n-butylammonium fluoride (TBAF).

The compounds of formula (VI) may for example be chosen from monools, diols, triols, monoamines, diamines, triamines, amino alcohols.

As compounds of formula (VI), mention may for example be made of:

linear or branched, cyclic or acyclic, saturated or unsaturated monools, such as methanol (CAS: 67-56-1), ethanol (CAS: 64-17-5), propanol (CAS: 71-23-8), isopropanol (CAS: 67-63-0), allyl alcohol (CAS: 107-18-6), 1-butanol (CAS: 71-36-3), isobutanol (CAS: 78-83-1), 1-pentanol or amyl alcohol (CAS: 71-41-0), 3-methyl-1-butanol or isoamyl alcohol (CAS: 123-51-3), 2-pentanol (CAS: 6032-29-7), 3-pentanol (CAS: 584-02-1), 4-methyl-2-pentanol (CAS: 108-11-2), 5-phenyl-1-pentanol (CAS: 10521-91-2), cyclopentanol (CAS: 96-41-3), 1-hexanol (CAS: 111-27-3), cyclohexanol (CAS: 108-93-0), 2-butoxyethanol (CAS: 111-76-2), 1-heptanol (CAS: 111-70-6), 2-heptanol (CAS: 543-49-7), 3-heptanol (CAS: 589-82-2), 4-methyl-3-heptanol (CAS: 14979-39-6), 3-methyl-4-heptanol (CAS: 1838-73-9), 6-methyl-2-heptanol (CAS: 4730-22-7), 6-methyl-3-heptanol (CAS: 18720-66-6), 2-(2-(2-methoxyethoxy)ethoxy)ethanol (CAS: 112-35-6), benzyl alcohol (CAS: 100-51-6), 1-octanol (CAS: 111-87-5), 2-octanol (CAS: 123-96-6), 3-octanol (CAS: 589-98-0), 4-octanol (CAS: 589-62-8), 2-ethyl-1-hexanol (CAS: 104-76-7), 2-hexyloxyethanol (CAS: 112-25-4), 2-(2-butoxyethoxy)ethanol (CAS: 112-34-5), 1-nonanol (CAS: 143-08-8), 2-nonanol (CAS: 628-99-9), 3-nonanol (CAS: 624-51-1), 4-nonanol (CAS: 5932-79-6), 5-nonanol (CAS: 623-93-8), isononanol (CAS: 27458-94-2), 2,6-dimethyl-2-heptanol (CAS: 13254-34-7), 1-octanol (CAS: 111-87-5), 2-octanol (CAS: 123-96-6), 3-octanol (CAS: 589-98-0), 4-octanol (CAS: 589-62-8), 2-methyl-3-octanol (CAS: 26533-34-6), 2,2-dimethyl-3-octanol (CAS: 19841-72-6), 3,5-dimethyl-4-octanol (CAS: 19781-12-5), 3,6-dimethyl-3-octanol (CAS: 151-19-9), 3-methyl-4-octanol (CAS: 26533-35-7), 6-ethyl-3-octanol (CAS: 19781-27-2), 3,7-dimethyl-1-octanol (CAS: 106-21-8), 3,7-dimethyl-3-octanol or tetrahydrolinalool (CAS: 78-69-3), 2-butyl-1-octanol (CAS: 3913-02-8), 8-phenyl-1-octanol (CAS: 10472-97-6), 3-methyl-3-octanol (CAS: 5340-36-3), 3,6-dimethyl-2-heptanol (CAS: 1247790-47-1), 3,6,9,12-tetraoxotridecanol (CAS: 23783-42-8), 1-nonanol (CAS: 143-08-8), 2-nonanol (CAS: 628-99-9), 3-nonanol (CAS: 624-51-1), 4-nonanol (CAS: 5932-79-6), 5-nonanol (CAS: 623-93-8), 2-methyl-3-nonanol (CAS: 26533-33-5), 2-methyl-4-nonanol (CAS: 26533-31-3), 2-pentyl-1-nonanol (CAS: 5333-48-2), 3-methyl-4-nonanol (CAS: 26533-32-4), 4-methyl-4-nonanol (CAS: 23418-38-4), 5-ethyl-2-nonanol (CAS: 103-08-2), 8-methyl-1-nonanol (CAS: 55505-26-5), 4,8-dimethyl-1-nonanol (CAS: 33933-80-1), 1-decanol (CAS: 112-30-1), 2-decanol (CAS: 1120-06-5), 3-decanol (CAS: 1565-81-7), 2-hexyl-1-decanol (CAS: 2425-77-6), 6-ethyl-3-decanol (CAS: 19780-31-5), isodecanol (CAS: 25339-17-7), 2-propyl-1-heptanol (CAS: 10042-59-8), cyclodecanol (CAS: 1502-05-2), 1-undecanol (CAS: 112-42-5), 2-undecanol (CAS: 1653-30-1), 7-ethyl-2-methyl-4-undecanol (CAS: 103-20-8), 10-undecenol (CAS: 112-43-6), 2-undecenol (CAS: 75039-84-8), isoundecanol (CAS: 55505-28-7), 1-dodecanol (CAS: 112-53-8), 2-dodecanol (CAS: 10203-28-8), 2-octyl-1-dodecanol (CAS: 5333-42-6), isododecanol (CAS: 25428-98-2), 2,6,8-trimethyl-4-nonanol (CAS: 123-17-1), 1-tridecanol (CAS: 112-70-9), 7-tridecanol (CAS: 927-45-7), 3,9-diethyl-6-tridecanol (CAS: 123-24-0), isotridecanol (CAS: 27458-92-0), 1-tetradecanol (CAS: 112-72-1), 2-tetradecanol (CAS: 4706-81-4), 2-decyl-1-tetradecanol (CAS: 58670-89-6), 1-pentadecanol (CAS: 629-76-5), 2-benzyl-1-heptanol (CAS: 92368-90-6), 1-hexadecanol (CAS: 36653-82-4), 2-hexadecanol (CAS: 14852-31-4), 1-heptadecanol (CAS: 1454-85-9), 1-octadecanol (CAS: 112-92-5), 9-octadecanol (CAS: 1454-85-9), 1-isooctadecanol (CAS: 27458-93-1), 1-eicosanol or arachidyl alcohol (CAS: 629-96-9), 1-docosanol or behenyl alcohol (CAS: 661-19-8), 2-dodecyl-1-hexadecanol (C28), 2-tetradecyl-1-octadecanol (CAS: 32582-32-4), abietinol (CAS: 666-84-2), linear oligomeric alcohols ranging from C14 to C60 (CAS: 71750-71-5) such as the UNILIN® alcohols sold by Baker Hughes, alkoxylated monools, alkoxylated fatty acids, and mixtures thereof;

linear or branched, cyclic or non-cyclic, saturated or unsaturated diols, such as ethylene glycol (CAS: 107-21-1), diethylene glycol (CAS: 111-46-6), triethylene glycol (CAS: 112-27-6), tetraethylene glycol (CAS: 112-60-7), pentaethylene glycol (CAS: 4792-15-8), hexaethylene glycol (CAS: 2615-15-8), propylene glycol (CAS: 57-55-6), dipropylene glycol (CAS: 25265-71-8), tripropylene glycol (CAS: 24800-44-0), tetrapropylene glycol (CAS: 24800-25-7), pentapropylene glycol (CAS: 21482-12-2), hexapropylene glycol (CAS: 52794-80-6), propane-1,3-diol (CAS: 504-63-2), 2,2-dibenzylpropane-1,3-diol (CAS: 31952-16-6), butane-1,2-diol (CAS: 584-03-2), butane-1,3-diol (CAS: 107-88-0), butane-1,4-diol (CAS: 110-63-4), but-2-ene-1,4-diol (CAS: 6117-80-2), pentane-1,2-diol (CAS: 5343-92-0), pentane-1,3-diol (CAS: 3174-67-2), pentane-1,4-diol (CAS: 626-95-9), pentane-1,5-diol (CAS: 111-29-5), hexane-1,2-diol (CAS: 6920-22-5), hexane-1,3-diol (CAS: 21531-91-9), hexane-1,4-diol (CAS: 16432-53-4), hexane-1,5-diol (CAS: 928-40-5), hexane-1,6-diol (CAS: 629-11-8), cyclohexane-1,4-dimethanol (CAS: 105-08-8), 3-ethyl- 2-methylpentane-1,5-diol, 2-ethyl-3-propylpentane-1,5-diol, 2,4-dimethyl-3-ethylpentane-1,5-diol, 2-ethyl-4-methyl-3-propylpentane-1,5-diol, 2,3-diethyl-4-methylpentane-1,5-diol, 3-ethyl-2,2,4-trimethylpentane-1,5-diol, 2,2-dimethyl-4-ethyl-3-propylpentane-1,5-diol, 2-methyl-2-propylpentane-1,5-diol, 2,4-dimethyl-3-ethyl-2-propylpentane-1,5-diol, 2,3-dipropyl-4-ethyl-2-methylpentane-1,5-diol, 2-butyl-2-ethylpentane-1,5-diol, 2-butyl-2,3-diethyl-4-methylpentane-1,5-diol, benzene-1,4-dimethanol (CAS: 589-29-7), 2-butyl-2,4-diethyl-3-propylpentane-1,5-diol, 3-butyl-2-propylpentane-1,5-diol, 2-methylpentane-1,5-diol (CAS: 42856-62-2), 3-methylpentane-1,5-diol (CAS: 4457-71-0), 2,2-dimethylpentane-1,3-diol (CAS: 2157-31-5), 2,2-dimethylpentane-1,5-diol (CAS: 3121-82-2), 3,3-dimethylpentane-1,5-diol (CAS: 53120-74-4), 2,3-dimethylpentane-1,5-diol (CAS: 81554-20-3), neopentyl glycol (CAS: 126-30-7), 2,2-diethylpropane-1,3-diol (CAS: 115-76-4), 2-methyl-2-propylpropane-1,3-diol (CAS: 78-26-2), 2-butyl-2-ethylpropane-1,3-diol (CAS: 115-84-4), 2-methylpropane-1,3-diol (CAS: 2163-42-0), 2-benzyloxypropane-1,3-diol (CAS: 14690-00-7), 2,2-dibenzylpropane-1,3-diol (CAS: 31952-16-6), 2,2-dibutylpropane-1,3-diol (CAS: 24765-57-9), 2,2-diisobutylpropane-1,3-diol, 2,4-diethylpentane-1,5-diol, 2-ethylhexane-1,6-diol (CAS: 15208-19-2), 2,5-dimethylhexane-1,6-diol (CAS: 49623-11-2), 5-methyl-2-(1-methylethyl)hexane-1,3-diol (CAS: 80220-07-1), 1,4-dimethylbutane-1,4-diol (CAS: ), hexane-1,5-diol (CAS: 928-40-5), 3-methylhexane-1,6-diol (CAS: 4089-71-8), 3-tert-butylhexane-1,6-diol (CAS: 82111-97-5), heptane-1,3-diol (CAS: 23433-04-7), octane-1,2-diol (CAS: 1117-86-8), octane-1,3-diol (CAS: 23433-05-8), 2,2,7,7-tetramethyloctane-1,8-diol (CAS: 27143-31-3), 2-methyloctane-1,8-diol (CAS: 109359-36-6), 2,6-dimethyloctane-1,8-diol (CAS: 75656-41-6), octane-1,7-diol (CAS: 3207-95-2), 4,4,5,5-tetramethyl-3,6-dioxaoctane-1,8-diol (CAS: 76779-60-7), nonane-1,9-diol (CAS: 3937-56-2), 3,7-dioxanonane-1,9-diol (CAS: 67439-82-1), 2,2,8,8-tetramethylnonane-1,9-diol (CAS: 85018-58-2), nonane-1,2-diol (CAS: 42789-13-9), 2,8-dimethylnonane-1,9-diol (CAS: 40326-00-9), nonane-1,5-diol (CAS: 13686-96-9), 2,9-dimethyl-2,9-dipropyldecane-1,10-diol (CAS: 85018-64-0), 2,9-dibutyl-2,9-dimethyldecane-1,10-diol (CAS: 85018-65-1), 2,9-dimethyl-2,9-dipropyldecane-1,10-diol (CAS: 85018-64-0), 2,9-diethyl-2,9-dimethyldecane-1,10-diol (CAS: 85018-63-9), 2,2,9,9-tetramethyldecane-1,10-diol (CAS: 35449-36-6), 2-nonyldecane-1,10-diol (CAS: 48074-20-0), decane-1,9-diol (CAS: 128705-94-2), 2,2,6,6,10,10-hexamethyl-4,8-dioxaundecane-1,11-diol (CAS: 112548-49-9), 1-phenylundecane-1,11-diol (CAS: 109217-58-5), 2-octylundecane-1,11-diol (CAS: 48074-21-1), 2,10-diethyl-2,10-dimethylundecane-1,11-diol (CAS: 85018-66-2), 2,2,10,10-tetramethylundecane-1,11-diol (CAS: 35449-37-7), 1-phenylundecane-1,11-diol (CAS: 109217-58-5), undecane-1,2-diol (CAS: 13006-29-6), dodecane-1,2-diol (CAS: 1119-87-5), dodecane-2,11-diol (CAS: 33666-71-6), 2,11-diethyl-2,11-dimethyldodecane-1,12-diol (CAS: 85018-68-4), 2,11-dimethyl-2,11-dipropyidodecane-1,12-diol (CAS: 85018-69-5), 2,11-dibutyl-2,11-dimethyldodecane-1,12-diol (CAS: 85018-70-8), 2,2,11,11-tetramethyldodecane-1,12-diol (CAS: 5658-47-9), dodecane-1,11-diol (CAS: 80158-99-2), 11-methyldodecane-1,7-diol (CAS: 62870-49-9), dodecane-1,4-diol (CAS: 38146-95-1), dodecane-1,3-diol (CAS: 39516-24-0), dodecane-1,10-diol (CAS: 39516-27-3), 2,11-dimethyldodecane-2,11-diol (CAS: 22092-59-7), dodecane-1,5-diol (CAS: 20999-41-1), dodecane-6,7-diol (CAS: 91635-53-9), tridecane-1,13-diol (CAS: 13362-52-2), tridecane-1,2-diol (CAS: 90091-76-2), tetradecane-1,14-diol (CAS: 19812-64-7), tetradecane-1,2-diol (CAS: 21129-09-9), pentadecane-1,15-diol (CAS: 14722-40-8), pentadecane-1,2-diol (CAS: 33968-47-7), hexadecane-1,16-diol (CAS: 7735-42-4), hexadecane-1,2-diol (CAS: 6920-24-7), heptadecane-1,17-diol (CAS: 66577-59-1), heptadecane-1,2-diol (CAS: 34719-63-6), octadecane-1,18-diol (CAS: 3155-43-9), octadecane-1,2-diol (CAS: 20294-76-2), octadecane-1,12-diol (CAS: 2726-73-0), eicosane-1,20-diol (CAS: 7735-43-5), eicosane-1,15-diol (CAS: 20301-18-2), eicosane-1,4-diol (CAS: 16274-31-0), eicosane-1,2-diol (CAS: 39825-93-9), dimer fatty alcohols (CAS: 61788-89-4) such as the Pripol® products available from Croda, polybutadiene diols (CAS: 69102-90-5) such as the Poly bd™ products available from Idemitsu Kosan and Cray Valley, polyisoprene diols (CAS: 308067-82-5) such as the Poly ip™ products available from Idemitsu Kosan, hydrogenated polyisoprene diols (CAS: 1028331-63-6) such as the EPOL™ products available from Idemitsu Kosan, polyethylene glycols (CAS: 25322-68-3), polypropylene glycols (CAS: 25322-69-4) such as for example the Acclaim® polyols available from Covestro, polybutylene glycols (CAS: 24969-07-1), polytetrahydrofuran or PolyTHF (CAS: 25322-69-4), poly(ethylene-propylene) glycols, poly(ethylene-butylene) glycols, poly(ethylene-propylene-butylene) glycols, alkoxylated dimer fatty acids, and mixtures thereof;

heterocyclic diols such as furan-2,5-dimethanol (CAS: 1883-75-6), isosorbide (CAS: 652-67-5) and mixtures thereof;

linear or branched, saturated or unsaturated triols such as glycerol (CAS: 56-81-15), trimethylolmethane (CAS: 4704-94-3), trimethylolethane (CAS: 77-85-0), trimethylolpropane (CAS: 77-99-6), trimer fatty alcohols (C54) and alkoxylated triols such as polyethylene glycols (PEGs), polybutylene glycols (PBGs), polypropylene glycols (PPGs), poly(ethylene-propylene) glycols, poly(ethylene-butylene) glycols, poly(ethylene-propylene-butylene) glycols such as, for example, VORANOL CP3355 available from Dow Chemical, synthetic polyols derived from rapeseed oil with a high content of oleic chains (CAS: 2059146-46-0), polyols of natural origin such as castor oil (CAS: 8001-79-4), alkoxylated natural or synthetic polyols, and mixtures thereof;

heterocyclic triols, such as cyclohexane-1,3,5-triol (CAS: ), cyclohexane-1,3,5-trimethanol (CAS: 5962-82-3) and mixtures thereof;

linear, cyclic or branched monoamines such as methylamine (CAS: 74-89-5), dimethylamine (CAS: 124-40-3), ethylamine (CAS: 75-04-7), diethylamine (CAS: 109-89-7), propylamine (CAS: 107-10-8), dipropylamine (CAS: 142-84-7), diisopropylamine (CAS: 108-18-9), butylamine (CAS: 109-73-9), dibutylamine (CAS: 111-92-2), di-sec-butylamine (CAS: 626-23-3), diisobutylamine (CAS: 110-96-3), 1-pentylamine (CAS: 110-58-7), morpholine (CAS: 110-91-8), cyclohexylamine (CAS: 108-91-8), cyclohexanemethanamine (CAS: 3218-02-8), 1-amino-3-methylbutane (CAS: 107-85-7), 1-aminohexane (CAS: 111-26-2), 2-ethyl-1-hexylamine (CAS: 104-75-6), bis(2-ethylhexyl)amine (CAS: 106-20-7), 1-aminoheptane (CAS: 1-Aminoheptane), 2-aminoheptane (CAS: 123-82-0), 2-amino-6-methylheptane (CAS: 543-82-8), benzylamine (CAS: 100-46-9), furfurylamine (CAS: 617-89-0), dibenzylamine (CAS: 103-49-1), 1-aminooctane (CAS: 111-86-4), 2-aminooctane (CAS: 693-16-3), dioctylamine (CAS: 1120-48-5), 1-aminononane (CAS: 112-20-9), 1-aminodecane (CAS: 2016-57-1), didecylamine (CAS: 1120-49-6), 1-aminoundecane (CAS: 7307-55-3), diundecylamine (CAS: 16165-33-6), 1-aminododecane (CAS: 124-22-1), didodecylamine (CAS: 3007-31-6), 1-aminotridecane (CAS: 2869-34-3), ditridecylamine (CAS: 5910-75-8), 1-aminotetradecane (CAS: 2016-42-4), ditetradecylamine (CAS: 17361-44-3), 1-aminopentadecane (CAS: 2570-26-5), dipentadecylamine (CAS: 35551-81-6), 1-aminohexadecane (CAS: 143-27-1), dihexadecylamine (CAS: 16724-63-3), 1-aminooctadecane (CAS: 124-30-1), dioctadecylamine (CAS: 112-99-2), 1-aminoeicosane (CAS: 10525-37-8), dieicosylamine (CAS: 3071-00-9), coconut oil primary fatty amines (CAS: 61788-46-3) such as for example Noram® C from Arkema, tallow primary fatty amines (CAS: 161544-60-1) such as for example Noram® S from Arkema, oleyl primary fatty amines (CAS: 112-90-3) such as, for example, Noram®0 from Arkema, polyetheramines such as the Jeffamine M products from Huntsman, and mixtures thereof;

heterocyclic monoamines such as furfurylamine (CAS: 617-89-0) and mixtures thereof;

primary or secondary, linear or branched, cyclic or non-cyclic diamines such as ethylenediamine (CAS: 107-15-3), 1,3-diaminopropane (CAS: 109-76-2), 1,2-diaminopropane (CAS: 78-90-0), 1,4-diaminobutane (CAS: 110-60-1), piperazine (CAS: 110-85-0), 1,5-diaminopentane (CAS: 462-94-2), 1,6-diaminohexane (CAS: 124-09-4), 1,7-diaminoheptane (CAS: 646-19-5), 1,8-diaminooctane (CAS: 373-44-4), m-xylylenediamine (CAS: 1477-55-0), 1,9-diaminononane (CAS: 646-24-2), 1,10-diaminodecane (CAS: 646-25-3), 1,11-diaminoundecane (CAS: 822-08-2), 1,12-dodecane (CAS: 2783-17-7), 1,13-diaminotridecane (CAS: 14465-66-8), 1,14-diaminotetradecane (CAS: 7735-02-6), 1,15-diaminopentadecane (CAS: 131459-33-1), 1,16-diaminohexadecane (CAS: 929-94-2), 1,17-diaminoheptadecane (CAS: 929-94-2), 1,18-diaminooctadecane (CAS: 10341-25-0), 1,19-diaminononadecane (CAS: 13439-54-8), 1,20-diaminoeicosane (CAS: 34540-46-0), N-isopropylpropane-1,3-diamine (CAS: 3360-16-5), N-methyl-1,3-diaminopropane (CAS: 6291-84-5), N,N-dimethyl-1,3-diaminopropane (CAS: 109-55-7), N-coco-1,3-diaminopropane (CAS:) such as for example Dinoram@C available from Arkema, N-tallow-1,3-diaminopropane (CAS: 61791-55-7) such as for example Dinoram® S available from Arkema, N-9-octadecen-1-yl-1,3-diaminopropane (CAS: 7173-62-8) such as for example Dinoram® 0 available from Arkema, dimer fatty amines (CAS: 68955-56-6), such as for example the Priamine$^T$M products from Croda and N,N'-dimethylated homologs of these diamines, polyetherdiamines such as the Jeffamine D products from Huntsman and mixtures thereof;

heterocyclic diamines such as 2,5-furandimethanamine (CAS: 2213-51-6), 2,5-bis(aminomethyl)tetrahydrofuran (CAS: 66918-21-6) and mixtures thereof;

triamines such as the trimer fatty amines obtained by reductive ammoniation (NH$_3$/H$_2$/Raney Ni) of the corresponding trimer fatty acids, polyethertriamines such as the Jeffamine T from Huntsman and mixtures thereof;

heterocyclic triamines;

aromatic triamines such as 1,3,5-benzenetrimethanamine (CAS: 77372-56-6) and mixtures thereof; linear, cyclic or branched amino alcohols such as ethanolamine (CAS: 141-43-5), diethanolamine (CAS: 111-42-2), triethanolamine (CAS: 102-71-6), N-methyldiethanolamine (CAS: 105-59-9), isopropanolamine (CAS: 78-96-6), diisopropanolamine (CAS: 110-97-4), N-methyldiisopropanolamine (CAS: 4402-30-6), 3-amino-1-propanol (CAS: 156-87-6), 2-amino-2-methyl-1-propanol (CAS: 124-68-5), 3-dimethylamino-1-propanol (CAS: 3179-63-3), N-butyldiethanolamine (CAS: 102-79-4), N-tert-butyldiethanolamine (CAS: 2160-93-2), dialkoxylated primary fatty amines such as Noramox C, O and SH from Arkema, alkoxylated secondary amines, N-(2-hydroxyethyl)cyclohexylamine (CAS: 2842-38-8), N,N-bis(2-hydroxyethyl)cyclohexylamine (CAS: 4500-29-2), N-(2-hydroxypropyl)cyclohexylamine (CAS: 103-00-4) N,N-bis(2-hydroxypropyl)cyclohexylamine (CAS: 14548-72-2) and mixtures thereof;

heterocyclic amino alcohols such as 1-amino-2,5-anhydro-1,3,4-trideoxyhexitol (CAS: 589-14-0), 5-(aminomethyl)-2-furanmethanol (CAS: 88910-22-9) and mixtures thereof; aromatic amino alcohols such as N-phenyldiethanolamine (CAS: 120-07-0), N-phenyldipropanolamine (CAS: 3077-13-2), N-(p-tolyl)diethanolamine (CAS: 3077-12-1), N-(p-tolyl)dipropanolamine (CAS: 38668-48-3) and mixtures thereof;

linear or branched, cyclic or non-cyclic, saturated or unsaturated alkanolamides derived from the corresponding carboxylic acids mentioned above, such as N-(2-hydroxyethyl)formamide (CAS: 693-06-1), N,N-bis(2-hydroxyethyl)formamide (CAS: 25209-66-9), N-(2-hydroxyethyl)acetamide (CAS: 142-26-7), N,N-bis(2-hydroxyethyl)acetamide (CAS: 7435-67-8), N,N-bis(2-hydroxyethyl)-2-ethylhexanamide (CAS: 114214-77-6), N-(2-hydroxyethyl)octanamide (CAS: 7112-02-9), N,N-bis(2-hydroxyethyl)octanamide (CAS: 3077-30-3), N-(2-hydroxypropyl)octanamide (CAS: 23054-60-6), N,N-bis(2-hydroxypropyl)octanamide (CAS: 106476-15-7), N-(2-hydroxyethyl)octanamide (CAS: 7112-02-9), N,N-bis(2-hydroxyethyl)decanamide (CAS: 136-26-5), N-(2-hydroxypropyl)octanamide (CAS: 23054-60-6), N, N-bis(2-hydroxypropyl)decanamide (CAS: 16516-34-0), N-(2-hydroxyethyl)undecanamide (CAS: 28245-87-6), N,N-bis(2-hydroxyethyl)undecanamide (CAS: 45233-61-2), N-(2-hydroxypropyl)undecanamide (CAS: 45205-25-2), N,N-bis(2-hydroxypropyl)undecanamide (CAS: 54914-38-4), N-(2-hydroxyethyl)-10-undecenamide (CAS: 20545-92-0), N,N-bis(2-hydroxyethyl)undecenamide (CAS: 25377-64-4), N-(2-hydroxypropyl)-10-undecenamide (CAS: 68052-41-5), N-(2-hydroxyethyl)dodecanamide (CAS: 142-78-9), N,N-bis(2-hydroxyethyl)dodecanamide (CAS: 120-40-1), N-(2-hydroxypropyl)dodecanamide (CAS: 142-54-1), (CAS: 45233-61-2), N,N-bis(2-hydroxypropyl)dodecanamide (CAS: 54914-38-4), N-(2-hydroxyethyl)tetradecanamide (CAS: 142-58-5), N,N-bis(2-hydroxyethyl)tetradecanamide (CAS: 7545-23-5), N-(2-hydroxypropyl)tetradecanamide (CAS: 10525-14-1), N,N-bis(2-hydroxypropyl)tetradecanamide (CAS: 16516-36-2), N-(2-hydroxyethyl)hexadecanamide (CAS: 544-31-0), N,N-bis(2-hydroxyethyl)hexadecanamide (CAS: 7545-24-6), N-(2-hydroxypropyl) hexadecanamide (CAS: 18738-25-5), N,N-bis(2-hydroxypropyl)hexadecanamide (CAS: 16516-37-3), N-(2-hydroxyethyl)octadecanamide (CAS: 111-57-9), N,N-bis(2-hydroxyethyl)octadecanamide (CAS: 93-82-3), N-(2-hydroxypropyl)octadecanamide (CAS: 35627-96-4), N,N-bis(2-hydroxypropyl)octadecanamide (CAS: 17097-52-8), N-(2-hydroxyethyl)eicosanamide (CAS: 94421-69-9), N,N-bis(2-hydroxyethyl)eicosanamide (CAS: 117841-46-0), alkanolamides derived from fatty acids such as the AMINON and AMIDET products from Kao, alkoxylated alkanolamides and mixtures thereof;

heterocyclic alkanolamides such as N-(2-hydroxyethyl)-2-furancarboxamide (CAS: 107973-15-9), N,N-bis(2-hydroxyethyl)-2-furancarboxamide (CAS: 1226164-87-9), N-(2-hydroxypropyl)-2-furancarboxamide (CAS: 66671-73-6), N,N-bis(2-hydroxypropyl)-2-furancarboxamide (CAS: 1226036-86-7) and mixtures thereof;

aromatic alkanolamides such as N-(2-hydroxyethyl)benzamide (CAS: 18838-10-3), N,N-bis(2-hydroxyethyl) benzamide (CAS: 58566-44-2), N-(2-hydroxypropyl) benzamide (CAS: 23054-66-2), N,N-bis(2-hydroxypropyl)benzamide (CAS: 422278-61-3) and mixtures thereof.

The compounds of formula (VII) may be those chosen from:

linear or branched, cyclic or non-cyclic, saturated or unsaturated carboxylic acids, such as formic acid (C1), acetic acid (C2), propionic acid (C3), acrylic acid (C3:1), butyric acid (C4), methacrylic acid (C4:1), valeric acid (C5), isovaleric acid (C5), caproic acid (C6), heptanoic acid (C7), cyclohexanoic acid (C7), caprylic acid (C8), ethyl-2-hexanoic acid, pelargonic acid (C9), capric acid (C10), 11-undecylenic acid (C11), lauric acid (C12), lauroleic acid (C12:1), myristic acid (C14), myristoleic acid (C14:1), palmitic acid (C16), isopalmitic acid (C16), palmitoleic acid (C16:1), isomargaric acid (C17), anteisomargaric acid (C17), stearic acid (C18), isostearic acid (C18), anteisostearic acid (C18), oleic acid (C18:1), elaidic acid (C18:1), vaccenic acid (C18:1), linoleic acid (C18:2), linolenic acid (C18:3), eicosanoic or arachidic acid (C20), gadoleic acid (C20:1), gondoic acid (C20:1), arachidonic acid (C20:4), behenic acid (C22), cetoleic acid (C22:1), lignoceric acid (C24), cerotic acid (C24), naphthenic acids and mixtures thereof;

C14 to C60 linear oligomeric carboxylic acids such as Unicid® acid sold by Baker Hughes;

terpene or resin carboxylic acids such as abietic acid, dehydroabietic acid, neoabietic acid, palustric acid, pimaric acid, isopimaric acid, levopimaric acid and mixtures thereof present in tall oil fatty acids;

aromatic carboxylic acids such as benzoic acid (C7), naphthoic acid (C11) and mixtures thereof;

heterocyclic carboxylic acids such as furanoic acid, tetrahydrofuranoic acid and mixtures thereof;

(poly)ether carboxylic acids such as 2-(2-methoxyethoxy) acetic acid, (2-butoxyethoxy)acetic acid, methoxypoly (ethylene glycol)acetic acid, methoxypoly(ethylene glycol)propionic acid available from Sigma-Aldrich and mixtures thereof.

The compounds of formula (III-A) are in particular obtained from a compound of formula (V-A) below:

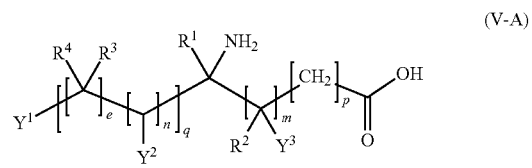

(V-A)

$R^1$, $R^2$, $R^3$, $R^4$, n, m, p, q and e are as defined above in formula (V), $Y^1$ represents $F^1$ as defined above in formula (III) or -Ph-XH or —XH with X representing O or S or Se and Ph representing a phenyl group;

$Y^2$ represents $F^2$ as defined above in formula (III) or -Ph-XH or —XH with X representing O or S or Se and Ph representing a phenyl group;

$Y^3$ represents $F^3$ as defined above in formula (III) or -Ph-XH or —XH with X representing O or S or Se and Ph representing a phenyl group;

provided that at most one of the radicals $Y^1$, $Y^2$ or $Y^3$ represents a radical -Ph-XH or —XH with X representing O or S or Se and Ph representing a phenyl radical.

The compounds of formula (V-A) may be in the form of an L enantiomer, of a D enantiomer or in the form of a racemate.

Among the compounds of formula (V-A), mention may for example be made of arginine, histidine, aspartic acid, glutamic acid, 2-aminoadipic acid (CAS: 542-32-5), 2-aminopimelic acid (CAS: 627-76-9), 2-aminooctanedioic acid (CAS: 3054-07-7), asparagine, glutamine, alanine, threonine, α-amino-β-hydroxy-β-methylbenzenebutanoic acid (CAS: 93505-16-9), 2,12-diaminododecanoic acid, norvaline, isoleucine, leucine, 3-hydroxyisoleucine, 4-hydroxyisoleucine, 5-hydroxyisoleucine, 3-mercaptoisoleucine, methionine, phenylalanine, tryptophan, glycine, 11-aminoundecanoic acid, 12-aminododecanoic acid, serine, valine, 3-hydroxy-4-phenylvaline, norvaline, 3-hydroxyisoleucine, 3-mercaptoisoleucine, methionine, phenylalanine, 2-methylstatin, cysteine, selenocysteine, isoleucine, 2-aminohentriacontanoic acid, tyrosine, 4-amino-3-hydroxybutyric acid, statin, isostatin and phenylstatin.

The compounds of formula (III-B) are in particular obtained from a compound of formula (V-B) below:

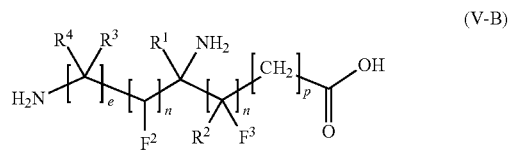

(V-B)

in which $R^1$, $R^2$, $R^3$, $R^4$, $F^2$, $F^3$, n, m, p and e are as defined above in formula (V).

The compounds of formula (V-B) may be in the form of an L enantiomer, of a D enantiomer or in the form of a racemate.

Among the compounds of formula (V-B), mention may for example be made of lysine and homolysine.

The compounds of formula (III-C) are in particular obtained from a compound of formula (V-C) below:

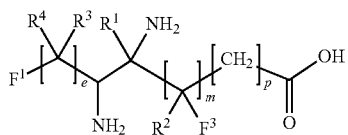

(V-C)

in which $R^1$, $R^2$, $R^3$, $R^4$, $F^1$, $F^3$, m, p and e are as defined above in formula (V).

The compounds of formula (V-C) may be in the form of an L enantiomer, of a D enantiomer or in the form of a racemate.

Among the compounds of formula (V-C), mention may for example be made of 3-aminonorvaline (CAS: 80573-35-9), α,β-diaminobenzenebutanoic acid (CAS: 70984-76-8) and 2,3-diaminobutanoic acid (CAS: 2643-66-5).

The compounds of formula (III-D) are in particular obtained from a compound of formula (V-D) below:

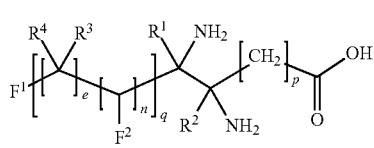

(V-D)

in which $R^1$, $R^2$, $R^3$, $R^4$, $F^1$, $F^2$, n, p, q and e are as defined above in formula (V).

The compounds of formula (V-D) may be in the form of an L enantiomer, of a D enantiomer or in the form of a racemate.

Among the compounds of formula (V-D), mention may for example be made of 2,3-diaminopropionic acid (CAS: 515-94-6), 3,4-diaminobutanoic acid (CAS: 131530-16-0) and R-aminophenylalanine (CAS: 64765-83-9).

B.2. Aldimine precursors of formula (III')

The compounds of abovementioned formula (II) can be obtained by reaction between:

a compound of formula (III') below:

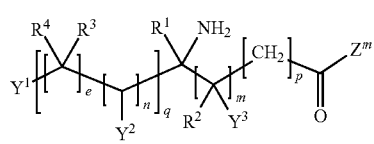

(III')

in which:
Y$^1$ represents $F^1$ or -Ph-XH or —XH with X representing O or S or Se and Ph representing a phenyl group;
Y$^2$ represents $F^2$ or -Ph-XH or —XH with X representing O or S or Se and Ph representing a phenyl group;
Y$^3$ represents $F^3$ or -Ph-XH or —XH with X representing O or S or Se and Ph representing a phenyl group;
provided that at most just one radical from among the radicals $Y^1$, $Y^2$ and $Y^3$ represents -Ph-XH or —XH;
provided that when $Y^1$=—XH or -Ph-XH, then $Y^2$=$F^2$ and $Y^3$=$F^3$;
provided that when $Y^2$=—XH or -Ph-XH, then $Y^1$=$F^1$ and $Y^3$=$F^3$;
provided that when $Y^3$=—XH or -Ph-XH, then $Y^1$=$F^1$ and $Y^2$=$F^2$;

$F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$, $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$, $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$, $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 5 to 12 carbon atoms;

n is an integer ranging from 0 to 28;
p is an integer ranging from 0 to 10;
m represents 0 or 1;
q represents 0 or 1;
e is an integer ranging from 1 to 3;
$Z^m$ represents a monovalent organic radical having a number-average molecular mass (Mn) ranging from 16 to 22 000 g/mol;

and a compound of formula (VIII) below:

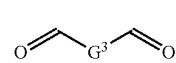

(VIII)

in which G$^3$ is as defined above in formula (II).

The reaction between a compound of abovementioned formula (III') and a compound of abovementioned formula (VIII) can be carried out according to a procedure similar to that used (example 15) in U.S. Pat. No. 5,087,661, that is to say by azeotropic entrainment of the water formed at approximately 90° C. in the presence of toluene as reaction solvent.

The compound of formula (III') may be used in excess relative to the compound of formula (VIII).

Preferably, the compounds of formula (III') are those in which:
m represents 0 or 1;
p represents 0 or 1;
n represents 0, 1, 2, 3 or 4;
q represents 0 or 1;
$F^1$ represents a radical chosen from a hydrogen atom, a (hetero)aryl group comprising from to 12 carbon atoms, a —COOZ$^m$ group, a —C(O)NH$_2$ group, an —SMe group, or a guanidyl group of formula —NH—C(=NH)—NH$_2$, F$^2$ represents a radical chosen from a hydrogen atom or a linear or branched alkyl group comprising from 1 to 10 carbon atoms, F$^3$ represents a hydrogen atom;

R$^1$, R$^2$, R$^3$ and R$^4$ each represent, independently of one another, a hydrogen atom, or a linear or branched alkyl group comprising from 1 to 10 carbon atoms, even more preferentially from to 5 carbon atoms, or a benzyl group, or a phenyl group.

The compounds of formula (III') may have one of the following formulae (III'-1), (III'-2) or (III'-3):

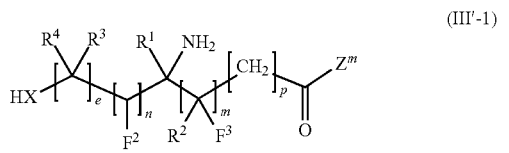
(III'-1)

in which X, R$^1$, R$^2$, R$^3$, R$^4$, X, F$^2$, F$^3$, n, m, p, e and Z$^m$ are as defined above in formula (III');

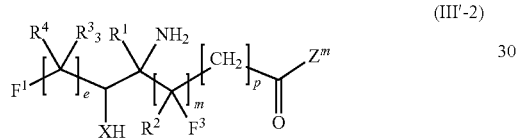
(III'-2)

in which X, R$^1$, R$^2$, R$^3$, R$^4$, X, F$^1$, F$^3$, m, p, e and Z$^m$ are as defined above in formula (III'),

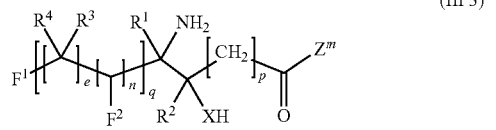
(III'3)

in which X, R$^1$, R$^2$, R$^3$, R$^4$, X, F$^1$, F$^2$, n, p, q, e and Z$^m$ are as defined above in formula (III').

Compounds of Formula (VIII)

The compounds of formula (VIII) may have one of the following formulae (VIII-A) or (VIII-B):

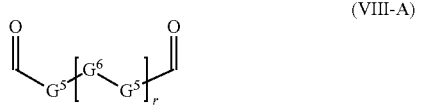
(VIII-A)

in which:
G$^5$ represents an optionally substituted hetero(arylene) radical;
r represents 0 or 1;
provided that when r=0, then G$^5$ represents an optionally substituted heteroarylene radical;
G$^6$ represents an oxygen atom, a sulfur atom or a radical chosen from one of the following radicals:
—O—R$^{27}$—O—, —CH$_2$—O—R$^{28}$—O—CH$_2$—,
—CH$_2$—O—C(=O)—R$^{29}$—C(=O)—O—CH$_2$—,
—CH$_2$—O—C(=O)—NH—R$^{30}$—NH—C(=O)—O—CH$_2$—, —O—C(=O)—NH—R$^{31}$—NH—C(=O)—O—, —O—C(=O)—R$^{32}$—C(=O)—O—, —C(=O)—O-G$^9$-O—C(=O)—, and —C(=O)—NR$^{16}$-G$^7$-NR$^{16}$—C(=O)—, with R$^{27}$, R$^{28}$, R$^{29}$, R$^{30}$, R$^{31}$ and R$^{32}$ each representing, independently of one another, a hydrocarbon radical optionally comprising at least one heteroatom; and G$^9$ representing a divalent hydrocarbon radical comprising from to 15 carbon atoms, optionally comprising at least one heteroatom;
the radical G$^5$-[G$^6$-G$^5$]r having a molar mass or a number-average molecular mass (Mn) ranging from 14 to 4000 g/mol, preferably ranging from 60 to 2000 g/mol, preferentially ranging from 60 to 1000 g/mol and even more preferentially ranging from 60 to 500 g/mol,

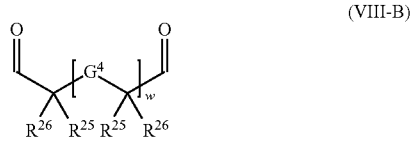
(VIII-B)

in which:
R$^{25}$ and R$^{26}$ each represent, independently of one another, a monovalent hydrocarbon radical comprising from 1 to 12 carbon atoms, said radical being optionally substituted by an —OH group;
or R$^{25}$ and R$^{26}$ together form an aliphatic ring comprising from 4 to 12 carbon atoms, said ring being optionally substituted;
G$^4$ represents a carbon-carbon bond or a divalent hydrocarbon radical, said radical optionally comprising at least one heteroatom; and
w represents an integer equal to 0 or 1.

The compounds of formula (VIII-A) may have one of the following formulae (VIII-A-1), (VIII-A-2), (VIII-A-3), (VIII-A-4), (VIII-A-5),(VIII-A-6), (VIII-A-7) and (VIII-A-8):

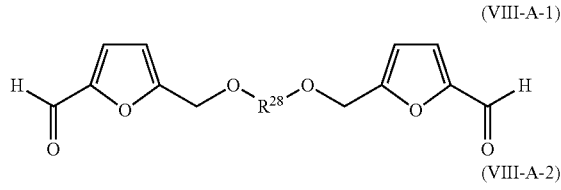
(VIII-A-1)

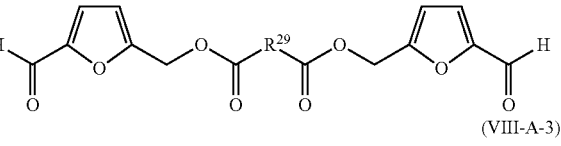
(VIII-A-2)

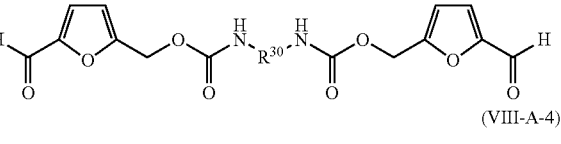
(VIII-A-3)

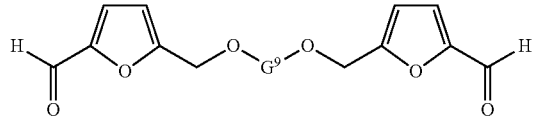
(VIII-A-4)

(VIII-A-5)

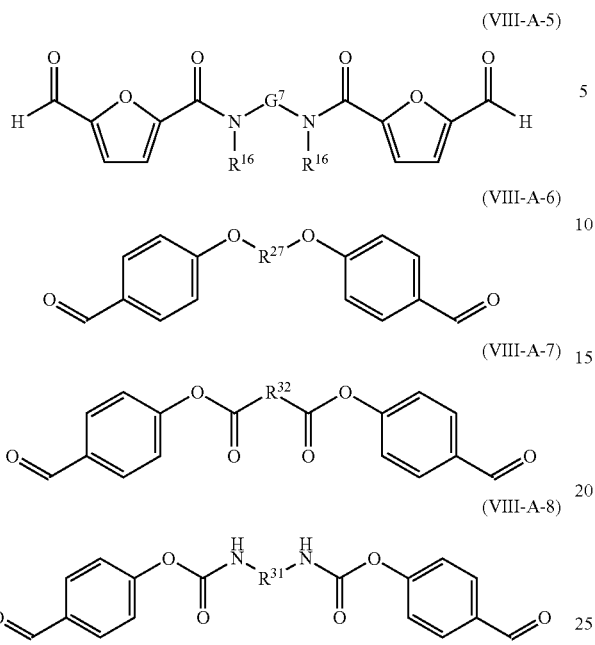

(VIII-A-6)

(VIII-A-7)

(VIII-A-8)

in which $R^{27}$, $R^{28}$, $R^{29}$, $R^{30}$, $R^{31}$ and $R^{32}$ are as defined above.

Among the compounds of formula (VIII-A), mention may for example be made of phthalaldehyde, isophthalaldehyde, terephthalaldehyde, 9,10-anthracenedicarbaldehyde, 2,3-naphthalenedicarboxaldehyde, butanedioic acid 1,4-bis(4-formylphenyl) ester (CAS: 163463-91-0), 4,4'-[1,2-ethanediylbis(oxy)]bisbenzaldehyde (CAS: 34074-28-7), carbamic acid, 1,6-hexanediylbis-, bis(4-formylphenyl) ester (CAS: 99562-92-2) and isomers thereof.

The compounds of formula (VIII-B) preferably have one of the following formulae (VIII-B-1), (VIII-B-2), (VIII-B-3), (VIII-B-4), (VIII-B-5), (VIII-B-6), (VIII-B-7):

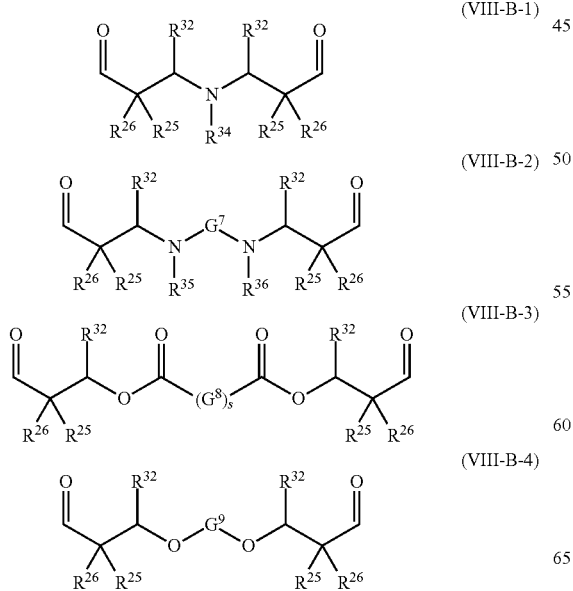

(VIII-B-1)
(VIII-B-2)
(VIII-B-3)
(VIII-B-4)

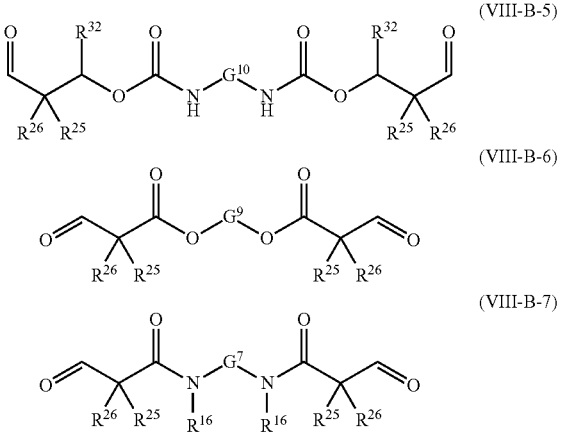

(VIII-B-5)
(VIII-B-6)
(VIII-B-7)

in which:
$R^{26}$ and $R^{25}$ each represent, independently of one another, a monovalent hydrocarbon radical comprising from 1 to 12 carbon atoms, said radical being optionally substituted by an —OH group;
or $R^{26}$ and $R^{25}$ together form an aliphatic ring comprising from 4 to 12 carbon atoms, said ring being optionally substituted;
$R^{32}$ represents a hydrogen, a linear or branched alkyl radical, a cycloalkyl radical, an arylalkyl radical or an alkoxycarbonyl radical comprising from 1 to 12 carbon atoms;
$R^{34}$ represents a hydrogen atom, a linear or branched alkyl radical, a cycloalkyl radical or an arylalkyl radical;
$R^{35}$ represents a hydrogen atom, a linear or branched alkyl radical, a cycloalkyl radical or an arylalkyl radical;
$R^{36}$ represents a hydrogen atom, a linear or branched alkyl radical, a cycloalkyl radical or an arylalkyl radical;
$R^{37}$ represents a hydrogen atom, a linear or branched alkyl radical, a cycloalkyl radical or an arylalkyl radical;
$G^7$ represents a carbonyl group or a linear or branched alkylene group comprising from 2 to carbon atoms, optionally comprising an oxygen atom;
$G^B$ represents a divalent hydrocarbon radical comprising from 1 to 15 carbon atoms, optionally comprising at least one heteroatom;
$G^9$ represents a divalent hydrocarbon radical comprising from 1 to 15 carbon atoms, optionally comprising at least one heteroatom;
$G^{10}$ represents a divalent hydrocarbon radical comprising from 1 to 15 carbon atoms, optionally comprising at least one heteroatom;
s represents 0 or 1.

The compounds of formulae (VIII-B-1), (VIII-B-2), (VIII-B-3), (VIII-B-4), (VIII-B-5), (VIII-B-6), (VIII-B-7) can be prepared according to the processes described in US 2011/0214810.

Among the compounds of formula (VIII-B-1), mention may for example be made of 3,3'-(methylimino)bis[2,2-dimethyl]propanal (CAS: 41348-50-9).

Among the compounds of formula (VIII-B-2), mention may for example be made of 4,4'-[1,2-ethanediylbis(methylimino)bis[3,3-dimethyl]-2-butanone (CAS: 89685-94-9), or α,α,α,α-tetramethyl-1,4-piperazinedipropanal (CAS: 92370-25-7).

Compounds of Formula (III')

The compounds of formula (III') can be obtained via a process comprising the following steps:

i) step of reaction between:
   a compound of formula (V') below, or one of its derivatives:

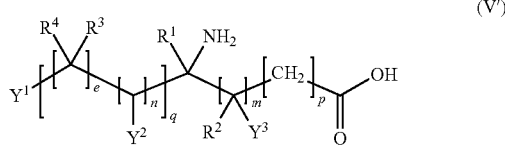

in which:
   $Y^1$ represents $F^1$ or -Ph-XH or —XH with X representing O or S or Se and Ph representing a phenyl group;
   $Y^2$ represents $F^2$ or -Ph-XH or —XH with X representing O or S or Se and Ph representing a phenyl group;
   $Y^3$ represents $F^3$ or -Ph-XH or —XH with X representing O or S or Se and Ph representing a phenyl group;
   provided that at most just one radical from among the radicals $Y^1$, $Y^2$ and $Y^3$ represents -Ph-XH or —XH;
   provided that when $Y^1$=-Ph-XH or —XH, then $Y^2$=$F^2$ and $Y^3$=$F^3$;
   provided that when $Y^2$=-Ph-XH or —XH, then $Y^1$=$F^1$ and $Y_3$=$F^3$;
   provided that when $Y^3$=-Ph-XH or —XH, then $Y^2$=$F^2$ and $Y^1$=$F^1$;
   $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)NH$_2$ group, an —SMe group, or a guanidyl group of formula —NH—C(=NH)—NH$_2$,
   $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)NH$_2$ group, an —SMe group, or a guanidyl group of formula —NH—C(=NH)—NH$_2$,
   $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOH group, a —C(O)NH$_2$ group, an —SMe group, or a guanidyl group of formula —NH—C(=NH)—NH$_2$,
   $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 5 to 12 carbon atoms;
   n is an integer ranging from 0 to 28;
   m represents 0 or 1;
   p is an integer ranging from 0 to 10;
   q represents 0 or 1;
   e is an integer ranging from 1 to 3;

and a compound of formula (VI') below:

$$Z'—(X^1H)_x \quad (VI')$$

in which:
   Z' represents a hydrogen atom or a monovalent organic radical $Z'^m$ having a molar mass or a number-average molecular mass (Mn) ranging from 1 to 20 000 g/mol;
   $X^1$ represents O or NR' with R' representing a hydrogen atom or a linear or branched alkyl group comprising from 1 to 20 carbon atoms which may optionally comprise one or more heteroatoms, an arylalkyl group comprising from 1 to 20 carbon atoms, a (hetero)aryl group comprising from 4 to 12 carbon atoms, or a (hetero)cycloalkyl group comprising from 3 to 20 carbon atoms;
   x represents 1;
ii) an optional deprotection step when step i) is carried out in the presence of a derivative of a compound of formula (V').

A derivative of a compound of abovementioned formula (V') is understood to mean a compound of formula (V') in which the —NH$_2$ group is protected by a protecting group, forming an —NHP group. A derivative of a compound of formula (V') may for example be a compound of formula (V') in which the —NH$_2$ group(s) is/are protected in —NH-Boc form (Boc being tert-butyloxycarbonyl).

A derivative of a compound of formula (V') may for example be prepared by reaction of a compound of formula (V') with di-tert-butyl dicarbonate to protect the —NH$_2$ group(s) in —NHBoc form.

A derivative of a compound of formula (V') may for example be prepared by reaction of a compound of formula (V') with tert-butyldimethylsilyl chloride in dimethylformamide in the presence of imidazole to protect the —XH and -Ph-XH group(s) in —X-TBDMS form.

Step i) may take place in molar amounts such that the —$X^1$H/—C(=O)OH molar ratio can range from 10:1 to 1:1.

When Z'(XH)x represents Z'(OH)x, the synthesis of the amino esters during step i) may be carried out in an organic solvent, for example chosen from ethers (for example ethyl ether or tetrahydrofuran), chlorinated solvents (for example dichloromethane) or directly in Z'(OH)x in excess depending on its boiling point under reduced pressure as described in Tetrahedron Letters (1986), 27 (41), pages 4975-4978 and in Tetrahedron (1988), 44 (17), 5495-506 (1988).

When Z'(XH)x represents Z'(NHR')x, the synthesis of the aminoamides during step i) may be carried out in an organic solvent, for example chosen from ethers (for example ethyl ether or tetrahydrofuran) or chlorinated solvents (for example dichloromethane) as described in Journal of Organic Chemistry (2006), 71(4), 1750-1753 from the corresponding amino esters.

Step ii) of deprotection of the —NH$_2$ functions in —NH-Boc form may be carried out by any conventional method known to those skilled in the art. It may for example be an acid hydrolysis step. For example, it is possible to carry out step ii) in the presence of trifluoroacetic acid or hydrochloric acid.

Step ii) of deprotection of the —XH and -Ph-XH functions in —X-TBDMS form may be carried out by any conventional method known to those skilled in the art. It may for example be a cleavage step. For example, it is possible to carry out step ii) in the presence of tetra-n-butylammonium fluoride (TBAF).

As compounds of formula (VI'), mention may for example be made of:

linear or branched, cyclic or non-cyclic, saturated or unsaturated monools, such as methanol (CAS: 67-56-1), ethanol (CAS: 64-17-5), propanol (CAS: 71-23-8), isopropanol (CAS: 67-63-0), allyl alcohol (CAS: 107-18-6), 1-butanol (CAS: 71-36-3), isobutanol (CAS: 78-83-1), 1-pentanol or amyl alcohol (CAS: 71-41-0), 3-methyl-1-butanol or isoamyl alcohol (CAS: 123-51-3), 2-pentanol (CAS: 6032-29-7), 3-pentanol (CAS: 584-02-1), 4-methyl-2-pentanol (CAS: 108-11-2), 5-phenyl-1-pentanol (CAS: 10521-91-2), cyclopentanol (CAS: 96-41-3), 1-hexanol (CAS: ), cyclohexanol (CAS: 108-93-0), 2-butoxyethanol (CAS: 111-76-2), 1-heptanol (CAS: 111-70-6), 2-heptanol (CAS: 543-49-7), 3-heptanol (CAS: 589-82-2), 4-methyl-3-heptanol (CAS: 14979-39-6), 3-methyl-4-heptanol (CAS: 1838-73-9), 6-methyl-2-heptanol (CAS: 4730-22-7), 6-methyl-3-heptanol (CAS: 18720-66-6), 2-(2-(2-methoxyethoxy)ethoxy)ethanol (CAS: 112-35-6), benzyl alcohol (CAS: 100-51-6), 1-octanol (CAS: 111-87-5), 2-octanol (CAS: 123-96-6), 3-octanol (CAS: 589-98-0), 4-octanol (CAS: 589-62-8), 2-ethyl-1-hexanol (CAS: 104-76-7), 2-hexyloxyethanol (CAS: 112-25-4), 2-(2-butoxyethoxy)ethanol (CAS: 112-34-5), 1-nonanol (CAS: 143-08-8), 2-nonanol (CAS: 628-99-9), 3-nonanol (CAS: 624-51-1), 4-nonanol (CAS: 5932-79-6), 5-nonanol (CAS: 623-93-8), isononanol (CAS: 27458-94-2), 2,6-dimethyl-2-heptanol (CAS: 13254-34-7), 1-octanol (CAS: 111-87-5), 2-octanol (CAS: 123-96-6), 3-octanol (CAS: 589-98-0), 4-octanol (CAS: 589-62-8), 2-methyl-3-octanol (CAS: 26533-34-6), 2,2-dimethyl-3-octanol (CAS: 19841-72-6), 3,5-dimethyl-4-octanol (CAS: 19781-12-5), 3,6-dimethyl-3-octanol (CAS: 151-19-9), 3-methyl-4-octanol (CAS: 26533-35-7), 6-ethyl-3-octanol (CAS: 19781-27-2), 3,7-dimethyl-1-octanol (CAS: 106-21-8), 3,7-dimethyl-3-octanol or tetrahydrolinalool (CAS: 78-69-3), 2-butyl-1-octanol (CAS: 3913-02-8), 8-phenyl-1-octanol (CAS: 10472-97-6), 3-methyl-3-octanol (CAS: 5340-36-3), 3,6-dimethyl-2-heptanol (CAS: 1247790-47-1), 3,6,9,12-tetraoxotridecanol (CAS: 23783-42-8), 1-nonanol (CAS: 143-08-8), 2-nonanol (CAS: 628-99-9), 3-nonanol (CAS: 624-51-1), 4-nonanol (CAS: 5932-79-6), 5-nonanol (CAS: 623-93-8), 2-methyl-3-nonanol (CAS: 26533-33-5), 2-methyl-4-nonanol (CAS: 26533-31-3), 2-pentyl-1-nonanol (CAS: 5333-48-2), 3-methyl-4-nonanol (CAS: 26533-32-4), 4-methyl-4-nonanol (CAS: 23418-38-4), 5-ethyl-2-nonanol (CAS: 103-08-2), 8-methyl-1-nonanol (CAS: 55505-26-5), 4,8-dimethyl-1-nonanol (CAS: 33933-80-1), 1-decanol (CAS: 112-30-1), 2-decanol (CAS: 1120-06-5), 3-decanol (CAS: 1565-81-7), 2-hexyl-1-decanol (CAS: 2425-77-6), 6-ethyl-3-decanol (CAS: 19780-31-5), isodecanol (CAS: 25339-17-7), 2-propyl-1-heptanol (CAS: 10042-59-8), cyclodecanol (CAS: 1502-05-2), 1-undecanol (CAS: 112-42-5), 2-undecanol (CAS: 1653-30-1), 7-ethyl-2-methyl-4-undecanol (CAS: 103-20-8), 10-undecenol (CAS: 112-43-6), 2-undecenol (CAS: 75039-84-8), isoundecanol (CAS: 55505-28-7), 1-dodecanol (CAS: 112-53-8), 2-dodecanol (CAS: 10203-28-8), 2-octyl-1-dodecanol (CAS: 5333-42-6), isododecanol (CAS: 25428-98-2), 2,6,8-trimethyl-4-nonanol (CAS: 123-17-1), 1-tridecanol (CAS: 112-70-9), 7-tridecanol (CAS: 927-45-7), 3,9-diethyl-6-tridecanol (CAS: 123-24-0), isotridecanol (CAS: 27458-92-0), 1-tetradecanol (CAS: 112-72-1), 2-tetradecanol (CAS: 4706-81-4), 2-decyl-1-tetradecanol (CAS: 58670-89-6), 1-pentadecanol (CAS: 629-76-5), 2-benzyl-1-heptanol (CAS: 92368-90-6), 1-hexadecanol (CAS: 36653-82-4), 2-hexadecanol (CAS: 14852-31-4), 1-heptadecanol, (CAS: 1454-85-9), 1-octadecanol (CAS: 112-92-5), 9-octadecanol (CAS: 1454-85-9), 1-isooctadecanol (CAS: 27458-93-1), 1-eicosanol or arachidyl alcohol (CAS: 629-96-9), 1-docosanol or behenyl alcohol (CAS: 661-19-8), 2-dodecyl-1-hexadecanol (C28), 2-tetradecyl-1-octadecanol (CAS: 32582-32-4), abietinol (CAS: 666-84-2), linear oligomeric alcohols ranging from C14 to C60 (CAS: 71750-71-5) such as the UNILIN® alcohols sold by Baker Hughes, alkoxylated monools, alkoxylated fatty acids, and mixtures thereof;

linear or branched, cyclic or non-cyclic monoamines such as methylamine (CAS: 74-89-5), dimethylamine (CAS: 124-40-3), ethylamine (CAS: 75-04-7), diethylamine (CAS: 109-89-7), propylamine (CAS: 107-10-8), dipropylamine (CAS: 142-84-7), diisopropylamine (CAS: 108-18-9), butylamine (CAS: 109-73-9), dibutylamine (CAS: 111-92-2), di-sec-butylamine (CAS: 626-23-3), diisobutylamine (CAS: 110-96-3), 1-pentylamine (CAS: 110-58-7), morpholine (CAS: 110-91-8), 1-amino-3-methylbutane (CAS: 107-85-7), 1-aminohexane (CAS: 111-26-2), cyclohexylamine (CAS: 108-91-8), cyclohexanemethanamine (CAS: 3218-02-8), 2-ethyl-1-hexylamine (CAS: 104-75-6), bis(2-ethylhexyl)amine (CAS: 106-20-7), 1-aminoheptane (CAS: 1-Aminoheptane), 2-aminoheptane (CAS: 123-82-0), 2-amino-6-methylheptane (CAS: 543-82-8), benzylamine (CAS: 100-46-9), furfurylamine (CAS: 617-89-0), dibenzylamine (CAS: 103-49-1), 1-aminooctane (CAS: 111-86-4), 2-aminooctane (CAS: 693-16-3), dioctylamine (CAS: 1120-48-5), 1-aminononane (CAS: 112-20-9), 1-aminodecane (CAS: 2016-57-1), didecylamine (CAS: 1120-49-6), 1-aminoundecane (CAS: 7307-55-3), diundecylamine (CAS: 16165-33-6), 1-aminododecane (CAS: 124-22-1), didodecylamine (CAS: 3007-31-6), 1-aminotridecane (CAS: 2869-34-3), ditridecylamine (CAS: 5910-75-8), 1-aminotetradecane (CAS: 2016-42-4), ditetradecylamine (CAS: 17361-44-3), 1-aminopentadecane (CAS: 2570-26-5), dipentadecylamine (CAS: 35551-81-6), 1-aminohexadecane (CAS: 143-27-1), dihexadecylamine (CAS: 16724-63-3), 1-aminooctadecane (CAS: 124-30-1), dioctadecylamine (CAS: 112-99-2), 1-aminoeicosane (CAS: 10525-37-8), dieicosylamine (CAS: 3071-00-9), coconut oil primary fatty amines (CAS: 61788-46-3) such as for example Noram® C from Arkema, tallow primary fatty amines (CAS: 161544-60-1) such as for example Noram® S from Arkema, oleyl primary fatty amines (CAS: 112-90-3) such as, for example, Noram® O from Arkema, polyetheramines such as the Jeffamine M products from Huntsman, and mixtures thereof;

heterocyclic monoamines such as furfurylamine and mixtures thereof.

The compounds of formula (V') may be in the form of an L enantiomer, of a D enantiomer or in the form of a racemate.

Among the compounds of formula (V'), mention may for example be made of arginine, histidine, aspartic acid, glutamic acid, 2-aminoadipic acid (CAS: 542-32-5), 2-aminopimelic acid (CAS: 627-76-9), 2-aminooctanedioic acid (CAS: 3054-07-7), asparagine, glutamine, alanine, threonine, α-amino-β-hydroxy-β-methylbenzenebutanoic acid (CAS: 93505-16-9), 2,12-diaminododecanoic acid, norvaline, isoleucine, leucine, 3-hydroxyisoleucine, 4-hydroxyisoleucine, 5-hydroxyisoleucine, 3-mercaptoisoleucine, methionine, phenylalanine, tryptophan, glycine, 11-aminoundecanoic acid, 12-aminododecanoic acid, serine, valine, 3-hydroxy-4-phenylvaline, norvaline, 3-hydroxyisoleucine, 3-mercaptoisoleucine, methionine, phenylalanine, 2-methylstatin, cysteine, selenocysteine, isoleucine, 2-aminohentriacontanoic acid, tyrosine, 4-amino-3-hydroxybutyric acid, statin, isostatin and phenylstatin.

C. Uses of the Aldimines of Formula (I) or (II)

The present invention also relates to the use of compounds of formula (X) or (XI) below as moisture absorber (water scavenger), in particular in a polyurethane-based composition, or as curing agent in an epoxy resin-based composition:

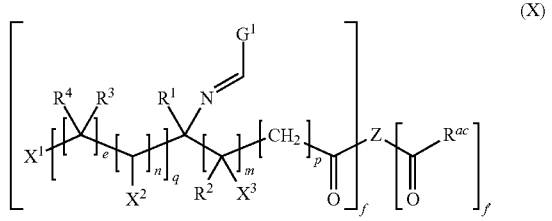

in which:
- $X^1$ represents $F^1$ or —N=C(H)-$G^1$ or -Ph-XH, or —XH, with X representing O or S or Se and Ph representing a phenyl group;
- $X^2$ represents $F^2$ or —N=C(H)-$G^1$ or -Ph-XH, or —XH, with X representing 0 or S or Se and Ph representing a phenyl group;
- $X^3$ represents $F^3$ or —N=C(H)-$G^1$ or -Ph-XH, or —XH, with X representing 0 or S or Se and Ph representing a phenyl group;
- provided that at most just one radical from among the radicals $X^1$, $X^2$ and $X^3$ represents —N=C(H)-$G^1$;
- provided that at most just one radical from among the radicals $X^1$, $X^2$ and $X^3$ represents —XH or -Ph-XH;
- provided that when $X^1$=—N=C(H)-$G^1$, then q=1;
- provided that when $X^1$=—N=C(H)-$G^1$ or -Ph-XH or —XH, then $X^2$=$F^2$ and $X^3$=$F^3$; provided that when $X^2$=—N=C(H)-$G^1$ or -Ph-XH or —XH, then $X^1$=$F^1$ and $X^3$=$F^3$; provided that when $X^3$=—N=C(H)-$G^1$ or -Ph-XH or —XH, then $X^2$=$F^2$ and $X^1$=F;
- $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)NH$_2$ group, an —SMe group, or a guanidyl group of formula —NH—C(=NH)—NH$_2$,
- $F^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)NH$_2$ group, an —SMe group, or a guanidyl group of formula —NH—C(=NH)—NH$_2$,
- $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ group, a —C(O)NH$_2$ group, an —SMe group, or a guanidyl group of formula —NH—C(=NH)—NH$_2$,
- $R^1$, $R^2$, $R^3$ and $R^4$ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms or a (hetero)aryl group comprising from 4 to 12 carbon atoms;
- n is an integer ranging from 0 to 28;
- p is an integer ranging from 0 to 10;
- m represents 0 or 1;
- q represents 0 or 1;
- e is an integer ranging from 1 to 3;
- f is an integer or non-integer ranging from 1 to 3, f preferably being an integer equal to 1, 2 or 3;
- f' is an integer or non-integer ranging from 0 to 2, f' preferably being an integer equal to 0, 1 or 2;
- the sum f+f' represents an integer ranging from 1 to 3;
- Z represents a monovalent organic radical $Z^m$, divalent organic radical $Z^d$ or trivalent organic radical $Z^t$, having a molar mass or a number-average molecular mass (Mn) ranging from 16 to 22 000 g/mol, preferably from 16 to 12 000 g/mol, more preferably from 16 to 8000 g/mol, even more preferentially from 16 to 4000 g/mol;
- $R^a$ represents a hydrogen atom or a monovalent hydrocarbon radical comprising from 1 to carbon atoms, it being possible for said radical to optionally comprise one or more heteroatoms;
- $G^1$ represents a monovalent hydrocarbon radical of molar mass or of number-average molecular mass (Mn) ranging from 15 to 4000 g/mol, preferably from 60 to 2000 g/mol, preferentially from 60 to 1000 g/mol, and even more preferentially from 60 to 500 g/mol, it being possible for said radical to optionally comprise one or more heteroatoms;

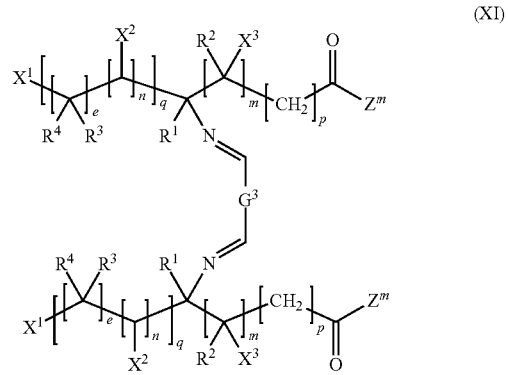

in which:
- $X^1$ represents $F^1$ or -Ph-XH, or —XH;
- $X^2$ represents $F^2$ or -Ph-XH, or —XH;
- $X^3$ represents $F^3$ or -Ph-XH, or —XH;
- $F^1$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ$^m$ group, a —C(O)NH$_2$ group, an —SMe group, or a guanidyl group of formula —NH—C(=NH)—NH$_2$, F$^2$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ''' group, a —C(O)NH$_2$ group, an —SMe group, or a guanidyl group of formula —NH—C(=NH)—NH$_2$, F$^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, or a (hetero)cycloalkyl group comprising from 3 to 20 carbon atoms, a —COOZ''' group, a —C(O)NH$_2$ group, an —SMe group, or a guanidyl group of formula —NH—C(=NH)—NH$_2$, X, R$^1$, R$^2$, R$^3$, R$^4$, n, q, m, p, e and Z''' being as defined for formula (I) above;

G$^3$ represents a monovalent hydrocarbon radical of molar mass or of number-average molecular mass (Mn) ranging from 14 to 4000 g/mol, preferably from 42 to 2000 g/mol, preferentially from 42 to 1000 g/mol, and even more preferentially from 42 to 500 g/mol, it being possible for said radical to optionally comprise one or more heteroatoms; provided that at most just one radical from among the radicals X$^1$, X$^2$ and X$^3$ represents —XH or -Ph-XH;

provided that when X$^1$=-Ph-XH or —XH, then X$^2$=F$^2$ and X$^3$=F$^3$;

provided that when X$^2$=-Ph-XH or —XH, then X$^1$=F$^1$ and X$^3$=F$^3$;

provided that when X$^3$=-Ph-XH or —XH, then X$^2$=F$^2$ and X$^1$=F$^1$.

The embodiments and preferred modes for the various radicals of formulae (I) and (II) apply to the formulae (X) and (XI), respectively.

According to one embodiment, the compounds of formula (X) are the compounds of formula (I) as described above.

According to one embodiment, the compounds of formula (XI) are the compounds of formula (II) as described above.

The present invention relates to a moisture-crosslinkable composition comprising at least one compound of formula (X) (preferably of formula (I)) or formula (XI) (preferably of formula (II)) as described above.

The present invention in particular relates to a moisture-crosslinkable composition C1 comprising:
at least one compound of formula (X) (preferably of formula (I)) or formula (XI) (preferably of formula (II)) as described above; and
at least one polymer P comprising at least two NCO end functions or at least one epoxy resin.

Polymer P

The polymer P may be obtained by any conventional method known to those skilled in the art. The polymer P is in particular obtained by polyaddition reaction between a composition of polyol(s) and a composition of polyisocyanate(s), optionally in the presence of a catalyst.

Polvol(s)

The abovementioned composition of polyol(s) can consist of a polyol or of a mixture of polyols.

The polyol(s) that can be used may be chosen from those having a molar mass or a number-average molecular mass (Mn) ranging from 60 g/mol to 22 000 g/mol, preferably from 600 g/mol to 18 000 g/mol, preferably 1000 g/mol to 12 000 g/mol, preferably from 1000 to 8000 g/mol and even more preferentially from 1000 g/mol to 4000 g/mol.

The number-average molecular mass of the polyols can be calculated from the hydroxyl number (OHN), expressed in mg KOH/g, and from the functionality of the polyol or determined by methods well known to those skilled in the art, for example by size exclusion chromatography (or SEC) with PEG (polyethylene glycol) standard.

The polyols may have a hydroxyl functionality ranging from 2 to 6, preferably 2 to 3. In the context of the invention, and unless otherwise mentioned, the hydroxyl functionality of a polyol is the mean number of hydroxyl functions per mole of polyol.

The polyol(s) which can be used may be chosen from polyester polyols, polyether polyols, polydiene polyols, polycarbonate polyols, poly(ether-carbonate) polyols, OH-terminated prepolymers, and mixtures thereof.

The polyol(s) which can be used may be chosen from aliphatic polyols, arylaliphatic polyols, aromatic polyols, carbonate polyols and the mixtures of these compounds.

According to the invention, the polyester polyol(s) may have a number-average molecular mass ranging from 500 g/mol to 22 000 g/mol, preferably from 700 g/mol to 10 000 g/mol and even more preferentially from 900 to 6000 g/mol.

Among the polyester polyols, mention may for example be made of:
polyester polyols of natural origin, such as castor oil;
polyester polyols resulting from the condensation:
of one or more aliphatic (linear, branched or cyclic) or aromatic polyols, such as, for example, ethanediol, propane-1,2-diol, propane-1,3-diol, glycerol, trimethylolpropane, hexane-1,6-diol, hexane-1,2,6-triol, butenediol, cyclohexanedimethanol, sucrose, glucose, sorbitol, glycerol, trimethylolpropane, pentaerythritol, mannitol, triethanolamine, N-methyldiethanolamine and mixtures thereof, with
one or more polycarboxylic acids or an ester or anhydride derivative thereof, such as 1,6-hexanedioic acid, dodecanedioic acid, azelaic acid, sebacic acid, adipic acid, 1,18-octadecanedioic acid, phthalic acid, succinic acid and the mixtures of these acids, an unsaturated anhydride, such as, for example, maleic or phthalic anhydride, or a lactone, such as, for example, caprolactone.

The abovementioned polyester polyols may be prepared conventionally and are for the most part commercially available.

Among the polyester polyols, mention may for example be made of the following products with a hydroxyl functionality equal to 2:
Tone® 0240 (sold by Union Carbide), which is a polycaprolactone with a number-average molecular mass of approximately 2000 g/mol and a melting point of approximately 50° C.,
Dynacoll® 7381 (sold by Evonik) with a number-average molecular mass of approximately 3500 g/mol and having a melting point of approximately 65° C.,
Dynacoll® 7360 (sold by Evonik), which results from the condensation of adipic acid with hexanediol and has a number-average molecular mass of approximately 3500 g/mol and a melting point of approximately 55° C.,
Dynacoll® 7330 (sold by Evonik) with a number-average molecular mass of approximately 3500 g/mol and having a melting point of approximately 85° C.,
Dynacoll® 7363 (sold by Evonik), which also results from the condensation of adipic acid with hexanediol and has a number-average molecular mass of approximately 5500 g/mol and a melting point of approximately 57° C., Dynacoll® 7250 (sold by Evonik): polyester polyol having a viscosity of 180 Pa·s at 23° C., a number-average molecular mass Mn equal to 5500 g/mol and a $T_g$ equal to −50° C., Kuraray® P-6010 (sold by Kuraray): polyester polyol having a viscosity of 68 Pa·s at 23° C., a number-average molecular mass equal to 6000 g/mol and a $T_g$ equal to −64° C., Kuraray® P-10010 (sold by Kuraray): polyester polyol having a viscosity of 687 Pa·s at 23° C. and a number-average molecular mass equal to 10 000 g/mol.

According to a preferred embodiment, the polyester polyol is chosen from: a polycaprolactone; castor oil; a polyester polyol resulting from the condensation of ethylene glycol, propylene glycol, propane-1,3-diol and/or hexane-1,6-diol with adipic acid and/or the various isomers of phthalic acid; and mixtures thereof.

According to the invention, the polyether polyol(s) may have a number-average molecular mass ranging from 200 g/mol to 22 000 g/mol, preferably from 600 g/mol to 18 000 g/mol, preferably from 1000 g/mol to 12 000 g/mol, preferably 1000 to 4000 g/mol and even more preferentially from 1000 g/mol to 8000 g/mol.

Preferably, the polyether polyol(s) has/have a hydroxyl functionality ranging from 2 to 3.

The polyether polyol(s) which can be used according to the invention is/are preferably chosen from polyoxyalkylene polyols, the linear or branched alkylene part of which comprises from 1 to 4 carbon atoms, preferably from 2 to 3 carbon atoms.

More preferentially, the polyether polyol(s) which can be used according to the invention is/are preferably chosen from polyoxyalkylene diols or polyoxyalkylene triols and better still polyoxyalkylene diols, the linear or branched alkylene part of which comprises from to 4 carbon atoms, preferably from 2 to 3 carbon atoms.

As examples of polyoxyalkylene diols or triols which can be used according to the invention, mention may for example be made of:

polyoxypropylene diols or triols (also denoted by polypropylene glycol (PPG) diols or triols) having a number-average molecular mass ranging from 400 g/mol to 22 000 g/mol and preferably ranging from 400 g/mol to 12 000 g/mol, polyoxyethylene diols or triols (also denoted by polyethylene glycol (PEG) diols or triols) having a number-average molecular mass ranging from 400 g/mol to 22 000 g/mol and preferably ranging from 400 g/mol to 12 000 g/mol, polyoxybutylene glycols (also denoted by polybutylene glycol (PBG) diols or triols) having a number-average molecular mass ranging from 200 g/mol to 12 000 g/mol, PPG/PEG/PBG copolymer or terpolymer diols or triols having a number-average molecular mass ranging from 400 g/mol to 22 000 g/mol and preferably ranging from 400 g/mol to 12 000 g/mol, polytetrahydrofuran (PolyTHF) diols or triols having a number-average molecular mass ranging from 250 g/mol to 12 000 g/mol, polytetramethylene glycols (PTMG) having a number-average molecular mass ranging from 200 g/mol to 12 000 g/mol, and mixtures thereof.

Preferably, the polyether polyol(s) which can be used is/are chosen from polyoxypropylene diols or triols. The polyether polyols mentioned above can be prepared conventionally and are widely available commercially. They can, for example, be obtained by polymerization of the corresponding alkylene oxide in the presence of a catalyst based on a double metal/cyanide complex.

As examples of polyether diols, mention may be made of the polyoxypropylene diols sold under the name Acclaim® by Covestro, such as Acclaim® 18200, with a number-average molecular mass in the vicinity of 18 700 g/mol, Acclaim® 12200, with a number-average molecular mass in the vicinity of 11 335 g/mol, Acclaim® 8200, with a number-average molecular mass in the vicinity of 8057 g/mol, and Acclaim® 4200, with a number-average molecular mass in the vicinity of 4020 g/mol, or else of the polyoxypropylene diol sold under the name Voranol P2000 by Dow, with a number-average molecular mass in the vicinity of 2004 g/mol.

As example of polyether triols, mention may be made of the polyoxypropylene triol sold under the name Voranol CP3355 by Dow, with a number-average molecular mass in the vicinity of 3554 g/mol.

The polydiene polyol(s) which can be used according to the invention may preferably be chosen from polydienes comprising hydroxyl end groups, and the corresponding hydrogenated or epoxidized derivatives thereof.

Preferably, the polydiene polyol(s) which can be used according to the invention is/are chosen from polybutadienes comprising hydroxyl end groups, which are optionally hydrogenated or epoxidized. Preferentially, the polydiene polyol(s) which can be used according to the invention is/are chosen from butadiene homopolymers and copolymers comprising hydroxyl end groups, which are optionally hydrogenated or epoxidized.

In the context of the invention, and unless otherwise indicated, the "hydroxyl end groups" of a polydiene polyol are understood to mean the hydroxyl groups located at the ends of the main chain of the polydiene polyol.

The abovementioned hydrogenated derivatives may be obtained by complete or partial hydrogenation of the double bonds of a polydiene comprising hydroxyl end groups, and are thus saturated or unsaturated.

The abovementioned epoxidized derivatives may be obtained by chemoselective epoxidation of the double bonds of the main chain of a polydiene comprising hydroxyl end groups, and thus comprise at least one epoxy group in their main chain.

As examples of polybutadiene polyols, mention may be made of saturated or unsaturated butadiene homopolymers comprising hydroxyl end groups which are optionally epoxidized, such as, for example, those sold under the name Poly bd® or Krasol® by Cray Valley.

As examples of polycarbonate diol, mention may be made of Converge Polyol 212-10 and Converge Polyol 212-20 sold by Novomer, respectively with number-average molecular masses (Mn) equal to 1000 and 2000 g/mol, the hydroxyl numbers of which are respectively and 56 mg KOH/g, Desmophen® C XP 2716 sold by Covestro, with a number-average molecular mass (Mn) equal to 326 g/mol, the hydroxyl number of which is 344 mg KOH/g, and Polyol C-590, C-1090, C-2090 and C-3090 sold by Kuraray, having a number-average molecular mass (Mn) ranging from 500 to 3000 g/mol and a hydroxyl number ranging from 224 to 37 mg KOH/g.

Polyisocyanate(s)

In the context of the invention, the term "polyisocyanate" is understood to mean a compound comprising at least two isocyanate (NCO) groups.

The abovementioned composition of polyisocyanate(s) can consist of a polyisocyanate or of a mixture of polyisocyanates.

The polyisocyanate(s) which can be used may be chosen from those typically used in the synthesis of an NCO-terminated polyurethane.

The polyisocyanate(s) which can be used can be aliphatic (linear or branched) or aromatic, and optionally substituted.

Preferably, the polyisocyanate(s) is/are chosen from diisocyanates, triisocyanates and mixtures thereof.

According to a preferred embodiment, the polyisocyanate(s) is/are chosen from the group consisting of pentamethylene diisocyanate (PDI), hexamethylene diisocyanate (HDI), heptane diisocyanate, octane diisocyanate, nonane diisocyanate, decane diisocyanate, undecane diisocyanate, dodecane diisocyanate, isophorone diisocyanate (IPDI), norbornane diisocyanate, norbornene diisocyanate, cyclohexane 1,4-diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyloctane 1,8-diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), toluene diisocyanate (TDI), diphenylmethylene diisocyanate (MDI), dicyclohexylmethylene diisocyanate (H12-MDI), xylylene diisocyanate (XDI) (in particular meta-xylylene diisocyanate (m-XDI)), and mixtures thereof.

The MDI can be in the form of an isomer or of a mixture of isomers, such as 4,4'-MDI and/or 2,4'-MDI.

The TDI can be in the form of an isomer or of a mixture of isomers, such as 2,4-TDI and/or 2,6-TDI.

The polyisocyanate(s) which can be used to prepare the polyurethane used according to the invention are typically widely available commercially. Mention may be made, by way of examples, of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, or else Isonate® M125 sold by Dow, corresponding to an MDI containing at least 97% by weight of the 4,4'-MDI isomer.

In the context of the invention, the expressions "polyaddition reaction" and "polyaddition" are equivalently understood.

The polyaddition step may be carried out at a temperature below 95° C., preferably ranging from 60° C. to 90° C., more preferentially ranging from 65° C. to 80° C.

The polyaddition step may be carried out under anhydrous conditions, for example under a nitrogen atmosphere.

The polyaddition step may be carried out in amounts of polyisocyanate(s) and of polyol(s) such that the NCO/OH molar ratio is strictly greater than 1, for example of between 1.1 and 2.5, preferably between 1.1 and 2.2, preferentially between 1.2 and 2.0, for example between 1.20 and 1.80, advantageously between 1.20 and 1.50, in particular between 1.30 and 1.40, so as to advantageously obtain an NCO-terminated polyurethane.

In the context of the invention, and unless otherwise mentioned, the NCO/OH molar ratio corresponds to the molar ratio of the number of isocyanate (NCO) groups to the number of hydroxyl (OH) groups respectively borne by the polyisocyanates and the polyols used.

The NCO-terminated polymer may have a number-average molecular mass ranging from 1000 g/mol to 50 000 g/mol, preferably from 1000 g/mol to 30 000 g/mol, preferentially from 5000 g/mol to 22 000 g/mol.

The number-average molecular mass of the NCO-terminated polyurethanes can be measured by methods well known to those skilled in the art, for example by size exclusion chromatography (or SEC) using standards of polyethylene glycol type.

The NCO-terminated polymer may have a polydispersity index ranging from 1.5 to 3.5, preferably from 2.0 to 3.3.

In the context of the invention, the polydispersity index is defined as the $M_w$ (weight-average molecular mass)/$M_n$ (number-average molecular mass) ratio of the polyurethane.

The NCO-terminated polymer may have a weight content of NCO groups ranging from 0.1% to 5% by weight, relative to the total weight of the polyurethane.

The polyurethane comprising at least two NCO end functions may have a weight content of NCO groups ranging from 0.1% to 6.0%, preferably from 0.5% to 5.0%, more preferably from 1.0% to 4.0%, even more preferentially from 1.5% to 3.0% and in particular from 1.8% to 2.5%.

Epoxy Resin

The epoxy resin may be aliphatic, cycloaliphatic, heterocyclic or aromatic and may comprise at least one heteroatom.

The epoxy resin may be monomeric or polymeric.

Preferably, the epoxy resin has a viscosity, measured at 25° C., ranging from 7 to 000 mPa·s, preferentially from 400 to 5000 mPa·s.

According to one embodiment, the epoxy resins are chosen from polyglycidyl ethers of polyphenolic compounds, preferably comprising from 2 to 6 glycidyl ether functions per mole of resin.

A phenolic compound is a compound having at least two aromatic hydroxyl groups.

The phenolic compounds can be chosen from the group consisting of resorcinol, catechol, hydroquinone, bisphenol A (2,2-bis(4-hydroxyphenyl)propane), bisphenol AP (1,1-bis(4-hydroxyphenyl)-1-phenylethane), bisphenol AF (2,2-bis(4-hydroxyphenyl)hexafluoropropane), bisphenol B ((2,2-bis(4-hydroxyphenyl)butane), bisphenol BP (bis(4-hydroxyphenyl)diphenylmethane), bisphenol C (2,2-bis(3-methyl-4-hydroxyphenyl)propane), bisphenol CII (bis(4-hydroxyphenyl)-2,2-dichloroethylene), bisphenol E (1,1-bis(4-hydroxyphenyl)ethane), bisphenol F (bis(4-hydroxyphenyl)-2,2-dichloroethylene), bisphenol FL (4,4'-(9H-fluoren-9-ylidene)bisphenol, bisphenol G (2,2-bis(4-hydroxy-3-isopropylphenyl)propane), bisphenol M (1,3-bis(2-(4-hydroxyphenyl)-2-propyl)benzene), bisphenol P (1,4-bis(2-(4-hydroxyphenyl)-2-propyl)benzene), bisphenol PH (5,5'-(1-methylethylidene)-bis[1,1'-(bisphenyl)-2-ol]propane), bisphenol S (bis(4-hydroxyphenyl)sulfone), bisphenol TMC (1,1-bis(4-hydroxyphenyl)-3,3,5-trimethylcyclohexane); bisphenol Z (1,1-bis(4-hydroxyphenyl)cyclohexane), bisphenol K, tetraethylbiphenol, and mixtures thereof.

The epoxy resin may have an epoxy function content ranging from 0.2 to 10.8 eq per 100 g of resin.

The epoxy functionality of the epoxy resin can range from 1 to 6.

The epoxy functionality of the epoxy resin is the mean number of epoxy functions per mole of epoxy resin.

The resins may be chosen from the following resins:
the resins having formula (A) below:

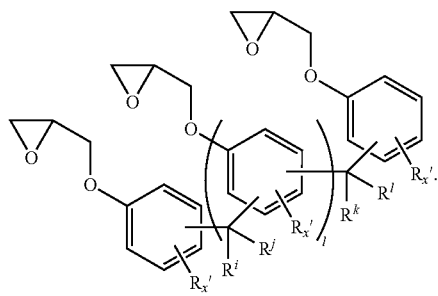

in which:
- I represents a number ranging from 0 to 8, preferably from 0 to 4;
- each R' represents, independently of one another, an alkyl radical comprising from 1 to 20 carbon atoms, preferably a methyl;
- each of $R^i$, $R^j$, $R^k$ and $R^l$, independently of one another, represents one of the following radicals: H; a linear or branched, cyclic or aliphatic alkyl radical comprising from 1 to carbon atoms; an aryl radical comprising from 6 to 12 carbon atoms; or a radical —$CF_3$;
- each x represents an integer ranging from 0 to 4, x preferably being 0 or 1;

N,N-diglycidyl-4-glycidyloxyaniline (TGAP):

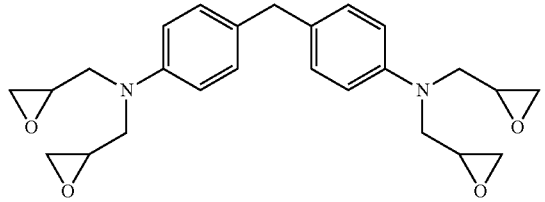 [SMILES: c1cc(N(CC2CO2)CC2CO2)ccc1Cc1ccc(N(CC2CO2)CC2CO2)cc1]

the resins of formula (B) below:

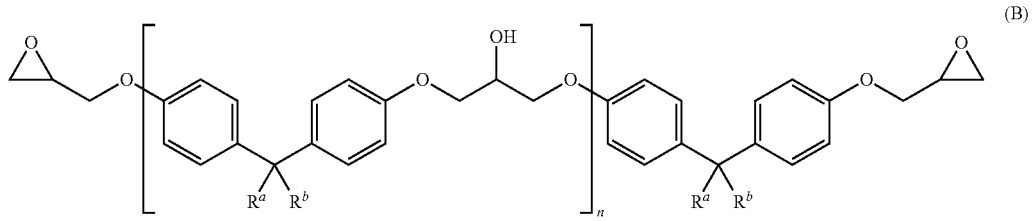

in which:
- n is an integer ranging from 1 to 25, preferably from 1 to 5;
- each of $R^a$ and Rb is, independently of one another, one of the following radicals: H; a linear or branched, cyclic or aliphatic alkyl radical comprising from 1 to 10 carbon atoms; an aryl radical comprising from 6 to 12 carbon atoms; or a radical —$CF_3$;

and mixtures thereof.

The term "mixture" is intended to mean a mixture of several resins mentioned above. It may for example be a mixture of different resins of formula (A), or else a mixture of a resin of formula (A) with a resin of formula (B), or else any other possible mixture.

Numerous epoxy resins are typically commercially available. Mention may for example be made of the D.E.R.™ 331 and D.E.R.™ 383 resins sold by Dow Chemicals, the Epon 862 resin sold by Hexion Speciality Chemicals, the Eposir® resins based on bisphenol A sold by SIR Industrial (for example Eposir® 7120), and the Eposir® resins based on bisphenol Albisphenol F (for example Eposir® F556), the Grilonit® resins from EMS-GRILTECH such as for example GRILONIT@EV1802, GRILONIT@RV1806, GRILONIT@EPOXIDE 8, GRILONIT@V 51-31.

Composition C1

Composition C1 can comprise an aldimine of abovementioned formula (I) or (II) or a mixture of aldimines of formula (I) (or (II)), respectively.

In composition C1, the N=C-$G^1$ aldimine function/NCO function molar ratio may range from 0.50 to 2.0, preferably 0.50 to 1.5 and preferentially from 0.7 to 1.2.

In composition C1, the N=C-$G^3$-C=N aldimine function/NCO function molar ratio may range from 0.25 to 1.0, preferably 0.25 to 0.75 and preferentially from 0.35 to 0.60.

According to one embodiment, composition C1 further comprises at least one additive chosen from plasticizers, solvents, pigments, adhesion promoters, moisture absorbers, UV stabilizers (or antioxidants), molecular sieves, glitter, fluorescent materials, rheological additives, fillers, and mixtures thereof.

The filler may be chosen from organic fillers, inorganic fillers and mixtures thereof.

Use may be made, as organic filler(s), of any organic filler(s) and in particular polymeric filler(s) typically used in the field of sealant compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may notably be made of hollow microspheres made of vinylidene chloride/acrylonitrile.

The mean particle size of the filler(s) which can be used is preferably less than or equal to 10 microns, more preferentially less than or equal to 3 microns, in order to prevent them from settling in the composition according to the invention during its storage.

The mean particle size is measured for a volume particle size distribution corresponding to 50% by volume of the sample of particles which is analyzed. When the particles are spherical, the mean particle size corresponds to the median diameter (D50 or Dv50), which corresponds to the diameter such that 50% of the particles by volume have a size which is smaller than said diameter. In the present application, this value is expressed in micrometers and determined according to the standard NF ISO 13320-1 (1999) by laser diffraction on an appliance of Malvern type.

Use may be made, as examples of inorganic filler(s), of any inorganic filler(s) typically used in the field of surface coating, adhesive or sealant compositions. The inorganic fillers may be provided in the form of particles of diverse geometry. They may, for example, be spherical or fibrous or exhibit an irregular shape.

According to one embodiment, the filler is chosen from sand, glass beads, glass, quartz, barite, alumina, mica, talc, carbonate fillers and mixtures thereof.

The sand which can be used in the present invention preferably has a particle size ranging from 0.1 to 400 µm, preferentially from 1 to 400 µm, more preferably from 10 to 350 µm, more preferably from 50 to 300 µm.

The glass beads which can be used in the present invention preferably have a particle size ranging from 0.1 to 400 µm, preferentially from 1 to 400 µm, more preferably from 10 to 350 µm, more preferably from 50 to 300 µm.

Preferably, the filler is a carbonate filler chosen from alkali metal or alkaline earth metal carbonates, such as, for example, calcium carbonate.

These fillers can be natural or treated, for example using an organic acid, such as stearic acid, or a mixture of organic acids consisting predominantly of stearic acid.

The total amount of filler can vary from 0.01% to 70% by weight, preferably from 20% to 65%, preferentially from 20% to 50%, advantageously from 25% to 40%, by weight, relative to the total weight of the composition.

Composition C1 can comprise at least one plasticizing agent in a proportion of 5% to 30% by weight, preferably of 10% to 30% by weight, preferentially of 15% to 25% by weight, relative to the total weight of said composition.

As examples of plasticizing agent which can be used, mention may be made of any plasticizing agent customarily used in the field of adhesives, sealants and/or surface coatings, such as, for example, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes, and mixtures thereof.

Among the phthalates, mention may for example be made of diisononyl phthalate, diisobutyl phthalate, dioctyl phthalate, dicyclohexyl phthalate, diisooctyl phthalate, diisododecyl phthalate, dibenzyl phthalate, diisodecyl phthalate (for example sold by BASF under the name Palatinol$^T$M DIDP) or benzyl butyl phthalate.

Among the benzoates, mention may for example be made of: neopentyl glycol dibenzoate (available, for example, under the name Uniplex® 512 from Lanxess), dipropylene glycol dibenzoate (available, for example, under the name Benzoflex®9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex®2088 from Eastman).

Among the pentaerythritol esters, mention may for example be made of pentaerythritol tetravalerate (available, for example, under the name Pevalen™, from Perstorp).

Among the cyclohexanedicarboxylates, mention may for example be made of diisononyl 1,2-cyclohexanedicarboxylate (available, for example, under the name Hexamoll Dinch® from BASF).

As examples of rheological agent(s) that may be used, mention may be made of any rheology agent customarily used in the field of adhesive, sealant and/or surface coating compositions.

Preferably, use is made of one or more rheological agents chosen from thixotropic agents, and more preferentially from:

PVC plastisols, corresponding to a suspension of PVC in a plasticizing agent which is miscible with PVC, obtained in situ by heating to temperatures ranging from 60° C. to 80° C. These plastisols can be those described in particular in the publication Polyurethane Sealants, Robert M. Evans, ISBN 087762-998-6, fumed silica,
urea derivatives resulting from the reaction of an aromatic diisocyanate monomer, such as 4,4'-MDI, with an aliphatic amine, such as butylamine, for instance Gelpaste Urea (EC: 416-600-4). The preparation of such urea derivatives is described in particular in the application FR 1 591 172.

The total content of rheological agent(s) which can be used may vary from 1% to 40% by weight, preferably from 5% to 30% by weight, more preferentially from 10% to 25% by weight, relative to the total weight of composition C1.

The solvent is preferably a solvent which is volatile at a temperature of 23° C. The volatile solvent may, for example, be chosen from alcohols which are volatile at 23° C., such as ethanol or isopropanol. The volatile solvent makes it possible, for example, to reduce the viscosity of the composition and make the composition easier to apply. The volatile character of the solvent makes it possible in particular for the joint, obtained after curing the composition, to no longer contain solvent. Thus, the solvent has, for example, no negative influence on the hardness of the joint.

When a solvent, in particular a volatile solvent, is present in composition C1, its content is preferably less than or equal to 5% by weight, more preferably less than or equal to 3% by weight, relative to the total weight of the composition.

Preferably, the content of solvent(s) in composition C1 is between 0% and 5% by weight.

The pigments can be organic or inorganic pigments. For example, the pigment is $TiO_2$, in particular Kronos® 2059 sold by Kronos.

Composition C1 may comprise an amount of from 0.1% to 3%, preferably from 0.1% to 3%, even more preferentially from 0.1% to 1% by weight, of at least one UV stabilizer or antioxidant. These compounds are typically introduced in order to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers.

Mention may be made, for example, of Irganox® 1010, Irganox® B561, Irganox® 245, Irgafos®168, Tinuvin® 328 or Tinuvin™ 770, which are sold by BASF.

Preferably, composition C1 is an adhesive, sealant or coating composition.

In the context of the invention, the term "between x and y" or "ranging from x to y" is understood to mean a range in which the limits x and y are included. For example, the range "between 0% and 25%" includes in particular the values 0% and 25%.

The invention is now described in the following exemplary embodiments, which are given purely by way of illustration and should not be interpreted in order to limit the scope thereof.

EXAMPLES

The following ingredients were used:

Methanol available from Sigma-Aldrich

2-Ethyl-1-hexanol available from Sigma-Aldrich

Dipropylene glycol n-butyl ether available from Dow

Difunctional polypropylene glycol (PPG) of Mn=400 g/mol available from Sigma-Aldrich Trifunctional polypropylene glycol (PPG) (propoxylated TMP) of Mn=308 g/mol available from Sigma-Aldrich Lauric acid available from Sigma-Aldrich (±)-Alanine (CAS: 302-72-7) available from Acrotein ChemBio

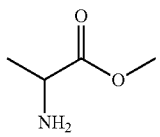

(±)-2-Aminoisobutyric acid (CAS: 62-57-7) available from Acrotein ChemBio

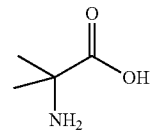

(±)-Serine (CAS: 302-84-1) available from Acrotein ChemBio

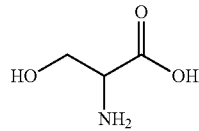

(±)-Statin (CAS: 27512-69-2) available from Aurora Building Blocks 5

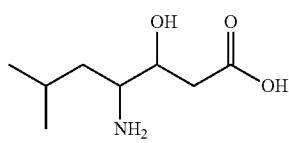

(±)-4-Amino-3-hydroxy-3-methylbutanoic acid (CAS: 63278-07-9) available from Enamine Building Blocks

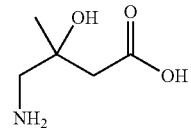

(±)-Glutamic acid (CAS: 617-65-2) available from Acrotein ChemBio

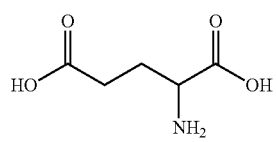

(±)-Lysine (CAS: 70-54-2) available from Acrotein ChemBio

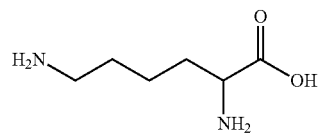

N-Boc-(±)-methylalanine available from Acrotein ChemBio

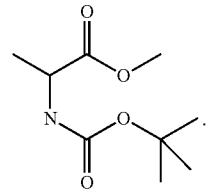

Example 1—Synthesis of N-Boc-Amino Acids 1.00 mol of amino acid is dissolved in a minimum of 800 ml of water maintained at 0° C. A solution of di-tert-butyl dicarbonate (BOC) in 400 ml of THF is added slowly to the aqueous solution previously prepared while stirring in an amount such that the BOC/—NH2 molar ratio is 1.05. The pH of the solution is adjusted to between 10-12 with successive additions of potassium carbonate (K2CO3). After stirring at 0° C. for 30 minutes, the reaction mixture is allowed to return to ambient temperature (approx. 23° C.). After 8 hours at ambient temperature and with stirring, the THF is removed under reduced pressure on a rotary evaporator, the aqueous phase is washed with diethyl ether and is acidified with citric acid, and then the reaction product is extracted 3 times with 100 ml of ethyl acetate. The organic phase is dried over anhydrous sodium sulfate (Na$_2$SO$_4$) and concentrated under reduced pressure on a rotary evaporator. The N-Boc amino acid is isolated with a yield of greater than 98%.

Example 2—Synthesis of X-TBDMS Amino Acids 1.00 mol 285.5 mmol of amino acid is dissolved in 1000 ml of acetonitrile, tert-butyldimethylchlorosilane (TBDMSCl) in the presence of DBU is added at ambient temperature (approx. 23° C.) in amounts such that the TBSCl/OH molar ratio is 1.05 and the DBU/TBDMSCl molar ratio is stoichiometric, and then the mixture is maintained at ambient temperature for 12 hours with stirring. The insoluble product is filtered off, washed with acetonitrile and dried under reduced pressure. The X-TBDMS amino acid is isolated with a yield of greater than 92%.

Example 3—Synthesis of N-Boc/X-TBDMS Amino Acids

Procedure 1 and then procedure 2 are applied successively. The N-Boc/X-TBDMS amino acid is isolated with yields ranging from 92% to more than 98%.

Example 4—Synthesis of Amino Esters (a to L)

Depending on the nature of the alcohol (monool, diol or triol) used for the esterification of the amino acid and depending on whether it is more or less easy to remove them under reduced pressure, preference is given to using procedure 4a for alcohols of boiling point ≤160° C. at atmospheric pressure and procedure 4b for alcohols of boiling point >160° C. at atmospheric pressure.

Procedure 4a 2 mol of amino acid are dispersed in 500 ml of anhydrous alcohol (monool) and then an amount of thionyl chloride (SOCl$_2$) is added, with stirring and at −15° C., such that the —COOH/SOCl$_2$ molar ratio is between 0.98 and 1.00. Depending on the amino acid, the reaction mixture is then brought to 40° C. or is left at ambient temperature (approx. 23° C.) for approximately 12 hours. After having removed the excess alcohol under reduced pressure on a rotary evaporator, 2000 ml of anhydrous ethyl ether are added. The mixture is stirred between 0 and 5° C. for 1 hour. The solid is isolated by filtration and washed with anhydrous ether cooled to 0° C. and then dried over P$_2$O$_5$. The amino ester hydrochloride is isolated with a yield of greater than 98%.

The 2 mol of amino ester hydrochloride obtained previously are suspended in 2000 ml of anhydrous ethyl ether in the presence of 2.2 mol of triethylamine (Et$_3$N). The mixture is stirred at ambient temperature (approx. 23° C.) for 1 hour and then the solution is filtered and the organic phase is concentrated under reduced pressure on a rotary evaporator. The amino ester is isolated with a yield of greater than 98%.

Procedure 4b 52 mmol of N-Boc amino acid or of N-Boc/X-TBDMS amino acid, anhydrous alcohol (monool, diol or triol) and 4-dimethylaminopyridine (DMAP) are dissolved in 500 ml of dichloromethane (CH2Cl2) in amounts such that the —COOH/—OH and —COOH/DMAP molar ratios are 1.02 and 1.7, respectively. 1-Ethyl-3-[3-(dimethylamino)propyl]carbodiimide chloride (EDCl) is added in an amount such that the —COOH/EDCl molar ratio is 0.92, the mixture is kept stirring for 1 hour and then maintained at ambient temperature (23° C.) for approximately 12 hours. After having removed the dichloromethane (CH2Cl2) under reduced pressure on a rotary evaporator, the residue is diluted in 1500 ml of ethyl acetate; this is then washed with 750 ml of water and the organic phase is isolated. The organic phase is then extracted with 3 times 500 ml of a saturated sodium bicarbonate (NaHCO$_3$) solution, and washed with 3 times 500 ml of water. After drying the organic phase over anhydrous sodium sulfate (Na2SO4), the ethyl acetate is removed under reduced pressure on a rotary evaporator and the residue is left to dry under reduced pressure. The N-Boc amino ester or the N-Boc/X-TBDMS amino ester is isolated with a yield of 97%.

The 50 mmol of N-Boc amino ester or of N-Boc/X-TBDMS amino ester obtained previously are dissolved in 750 ml of CH2Cl2. 250 ml of TFA are added and then the mixture is maintained at ambient temperature for approximately 12 hours with stirring and the amino ester trifluoroacetate is neutralized with addition of sodium bicarbonate. The sodium trifluoroacetate is removed by filtration, the organic phase is recovered and the dichloromethane is removed under reduced pressure on a rotary evaporator. The amino ester is isolated with a yield of 96%.

The following amino esters A to L were synthesized:

| Amino ester | Procedure | Reactants |
|---|---|---|
| Methyl (±)-alaninate | A 4a | (±)-Alanine methanol |
| Methyl (±)-2-aminoisobutyrate | B 4a | (±)-2-Aminoisobutyric acid methanol |
| Methyl (±)-serinate | C 4a | (±)-Serine methanol |

-continued

| Amino ester | Procedure | Reactants |
|---|---|---|
| Methyl statinate | D 4a | statin<br>methanol |
| Methyl (±)-4-amino-3-hydroxy-3-methylbutanoate acid | E 4a | (±)-4-amino-3-hydroxy-3-methylbutanoic acid<br>methanol |
| Methyl (±)-glutamate | F 4a | (±)-Glutamic acid<br>methanol |
| Methyl (±)-lysinate | G 4a | (±)-Lysine<br>methanol |
| 2-Ethylhexyl (±)-alaninate | H 4a | (±)-Alanine<br>2-ethyl-1-hexanol |
| 1-Methyl-2-[1-methyl-2-(butyloxy)ethoxy]ethyl (±)-alaninate | I 4b | N-Boc (±)-alanine<br>dipropylene glycol n-butyl ether |
| Difunctional PPG di-(±)-alaninate | J 4b | N-Boc (±)-alanine<br>polypropylene glycol of Mn = 400 g/mol |

| Amino ester | | Procedure | Reactants |
|---|---|---|---|
| Trifunctional PPG tri-(±)-alaninate | 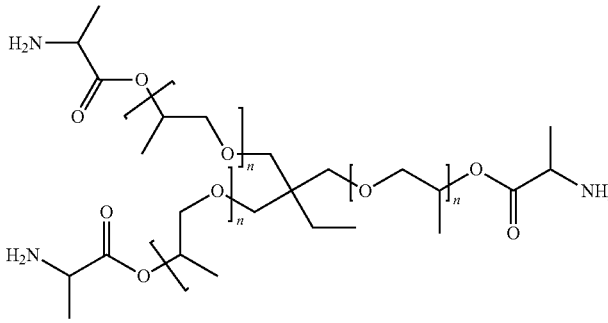 | K | 4b | N-Boc (±)-alanine propoxylated trimethylolpropane of Mn = 308 g/mol |
| Trifunctional PPG di-(±)-alaninate/monolaurate | 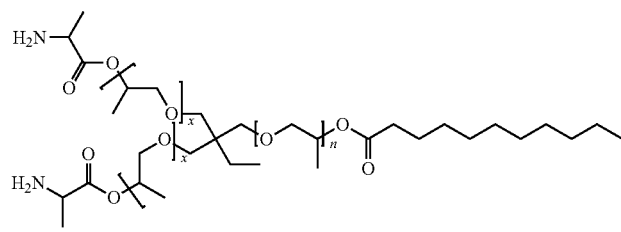 | L | 4b | N-Boc (±)-alanine propoxylated trimethylolpropane of Mn = 308 g/mol |

Example 5—Synthesis of Aminoamides (M, N and O)

60 mmol of N-Boc amino acid or of N-Boc/X-TBDMS amino acid, primary or secondary amine and 1-ethyl-3-(3-dimethylaminopropyl)carbodiimide chloride (EDCl) are dissolved in 500 ml of methyl chloride under inert atmosphere in amounts such that the COOH/NH and COOH/EDCl molar ratios are 1.2 and 0.80, respectively. The mixture is maintained at ambient temperature for at least 5 hours with stirring. After having removed the dichloromethane (CH2Cl2) under reduced pressure on a rotary evaporator, the residue is diluted in 500 ml of ethyl acetate; this is then washed with 250 ml of water and the organic phase is isolated. The organic phase is then extracted with 3 times 150 ml of a saturated sodium bicarbonate (NaHCO$_3$) solution, and washed with 3 times 150 ml of water. After drying the organic phase over anhydrous magnesium sulfate (Mg2SO4), the ethyl acetate is removed under reduced pressure on a rotary evaporator and the residue is left to dry under reduced pressure. The N-Boc amino ester or the N-Boc/X-TBDMS amino ester is isolated with a yield of 98%.

The 50 mmol of N-Boc aminoamide or of N-Boc/X-TBDMS aminoamide obtained previously are dissolved in 500 ml of CH$_2$Cl$_2$. 250 ml of TFA are added and then the mixture is maintained at ambient temperature for approximately 12 hours with stirring and the amino ester trifluoroacetate is neutralized with addition of sodium bicarbonate. The sodium trifluoroacetate is removed by filtration, the organic phase is recovered and the dichloromethane is removed under reduced pressure on a rotary evaporator. The aminoamide is isolated with a yield of 96% minimum.

The following aminoamides were synthesized:

| Aminoamide | | No | Route | Reactants |
|---|---|---|---|---|
| (±)-N-(2-ethylhexyl)alaninamide | 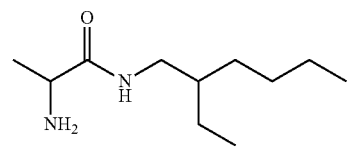 | M | 5a | N-Boc(±)-alanine 2-ethyl-1-hexylamine |
| (±)-N-(2-ethylhexyl)alaninamide | 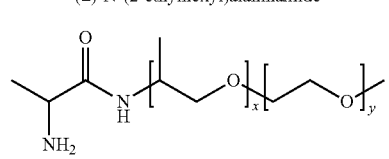 | N | 5a | N-Boc(±)-alanine Jeffamine M 600 having a number-average molecular mass (Mn) of 600 g/mol (x/y = 9/1) |

-continued

| Aminoamide | No | Route | Reactants |
|---|---|---|---|
| (±)-N-(2-ethylhexyl)alaninamide 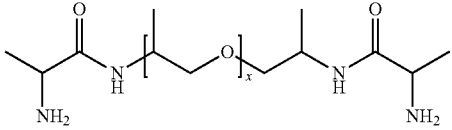 | O | 5a | N-Boc(±)-alanine Jeffamine D 400 having a number-average molecular mass (Mn) of 430 g/mol (x = 6.1) |

Example 6—Synthesis of Aldehydes P to Z5

The following aldehydes P to Z were synthesized according to the procedures mentioned or purchased:

| Aldehyde | No | synthesis |
|---|---|---|
| 2,2-dimethyl-3-(morpholin-4-yl)propanal (CAS Number: 23588-51-4, b.p.: 199° C. at atmospheric pressure) 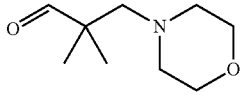 | P | Available from BOC Sciences |
| 2,2-dimethyl-3-oxopropyl acetate (CAS Number: 16184-79-5, b.p.: 124°C at atmospheric pressure) 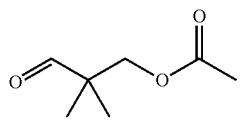 | Q | Available from Chemieliva Pharmaceutical |
| 2,2-dimethyl-3-oxopropyl laurate (CAS Number: 102985-93-3, b.p. > 160° C. at atmospheric pressure) 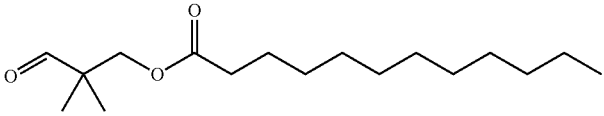 [SMILES: CCCCCCCCCCCC(=O)OCC(C)(C)C=O] | R | Synthesized according to the procedures described in Macromolecular Chemistry and Physics (2004), 205(7), 973-978 |
| (5-formyl-2-furanyl)methyl acetate (CAS Number: 10551-58-3, b.p. > 160° C. at atmospheric pressure) 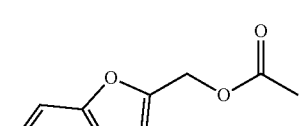 | S | Synthesized from 5-(hydroxymethyl)furfural (CAS Number: 67-47-0) available from Sigma-Aldrich, according to the procedure described in WO 2013/141523 |
| (5-formyl-2-furanyl)methyl laurate (CAS Number: 1428770-85-7, b.p. > 160° C. at atmospheric pressure) 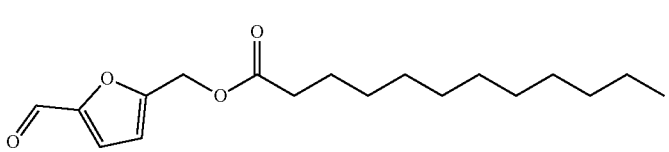 [SMILES: CCCCCCCCCCCC(=O)OCc1ccc(C=O)o1] | T | Synthesized from 5-(hydroxymethyl)furfural (CAS Number: 67-47-0) available from Purac Bioquimica; according to the procedure described in US 10,259,797 |

-continued

| Aldehyde | No | synthesis |
|---|---|---|
| 2,2-dimethyl-3-phenylpropanal or normajantal (CAS Number: 1009-62-7, b.p.: 228° C. at atmospheric pressure)<br/>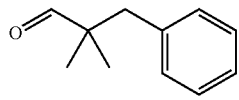 | U | Available from Symrise |
| dimethylcyclohex-3-ene-1-carbaldehyde (CAS Number: 27939-60-2, b.p.: 178° C. at atmospheric pressure)<br/>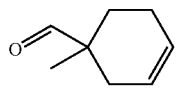 | V | Available from Sigma-Aldrich |
| Propanoic acid, dodecyl 2,2-dimethyl-3-oxopropanoate (CAS Number: 14002-70-1, b.p.: 140° C. at atmospheric pressure)<br/>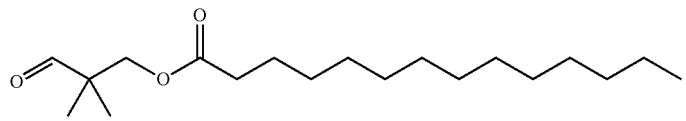 [SMILES: CCCCCCCCCCCCCC(=O)OCC(C)(C)C=O] | W | Synthesized according to the procedure described in patent application WO 00/02890 from Neste Chemicals Oy |
| dodecyl 5-formyl-2-furancarboxylate (b.p. > 160° C. at atmospheric pressure)<br/>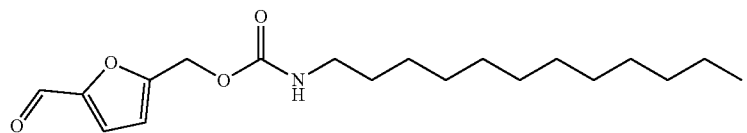 [SMILES: CCCCCCCCCCCCNC(=O)OCc1ccc(C=O)o1] | X | Synthesized according to the procedure described in *Synlett* 1993 (2), 117-118 |
| (5-Formylfuran-2-yl)methyl N-dodecylcarbamate<br/>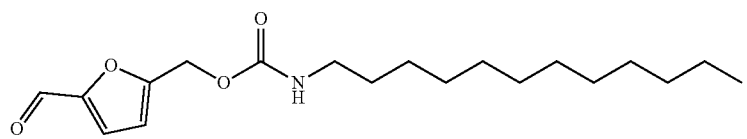 [SMILES: CCCCCCCCCCCCNC(=O)OCc1ccc(C=O)o1] | Y | Synthesized from 5-(hydroxymethyl) furfural available from Purac Bioquimica and from dodecyl isocyanate available from CreaChem BVBA, according to the procedure described in WO 2004/037804 |
| 2,2-dimethyl-3-[(dodecylamino)carbonyl]oxy]propanal<br/>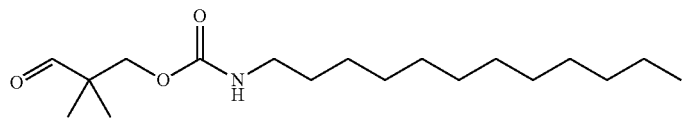 [SMILES: CCCCCCCCCCCCNC(=O)OCC(C)(C)C=O] | Z1 | Synthesized from 3-hydroxy-2,2-dimethylpropanal available from Alfa Chemistry and from dodecyl isocyanate (available from CreaChem BVBA), according to the procedure described in EP 0,375,318 |

| Aldehyde | No | synthesis |
|---|---|---|
| 3-[2,2-dimethyl-3-[(dodecylamino)carbonyl]oxy]]-2-[2,2-dimethyl-3-[(dodecylamino)carbonyl]oxy]methyl]-2-methylpropionaldehyde | Z2 | Synthesized from dimethylolpropanal (CAS Number: 18516-18-2) available from Cromogenia and from dodecyl isocyanate (CAS Number: 4202-38-4) available from CreaChem BVBA, according to the procedure described in EP 0,375,318 |
| 1,12-bis[2,2-dimethyl-3-oxopropyl] dodecanedioate | Z3 | Procedures described in WO 2004/013088 |
| N-[2,2-dimethyl-3-[(6-aminohexyl) carbonyl]oxy]propanal]-N-[[2,2-dimethyl-3-[(6-aminohexyl) carbonyl]oxy]propanal]amino]carbonyl]dodecyl carbamate | Z4 | Procedure described in EP 3,015,486 |
| N-[[[(5-formylfuran-2-yl)methyl]-1-[[(6-aminohexyl)carbonyl]oxy]]-N-[(5-formylfuran-2-yl)methyl]-1-[[[(6-aminohexyl)carbonyl]oxy]amino]carbonyl] dodecyl carbamate | Z5 | Synthesized from 5-(hydroxymethyl) furfural available from Purac Bioquimica and from N-(6-isocyanatohexyl)-N-[[(6-isocyanatohexyl)amino]carbonyl] dodecyl carbamate (CAS Number: 1027000-30-1) according to the procedure described in EP 3,015,486 |

Example 7: Synthesis of Aldimines of Formulae (I) or (II)

Aldimines of Formula (I)

Depending on the nature of the amino esters or of the aminoamides of formula (III) or (III'), of the monoaldehydes of formula (IV) used for the synthesis of the aldimines of formula (I) and on their respective solubilities in toluene, in absolute methanol or in anhydrous ethyl ether, preference is given to using procedure 6a for the aldehydes of boiling point ≤160° C. at atmospheric pressure or procedures 6b or 6c for the aldehydes of boiling point >160° C. at atmospheric pressure.

Procedure 6a

In a reactor equipped with a stirrer and a Dean-Stark apparatus, 1 mol of one of the (di)amino esters (A to L) or one of the (di)aminoamides (M and N) of formula (III) or (III'), 1 mmol of formic acid are dissolved in 500 ml of toluene under an inert (nitrogen) atmosphere, and then a monoaldehyde having a boiling point ≤160° C. at atmospheric pressure is added in an amount such that the —CHO/—NH$_2$ molar ratio is equal to 1.25. The mixture is heated and maintained at reflux for around 6 hours until no more water is removed by azeotropic distillation. The toluene and the excess aldehyde are then removed by distillation under reduced pressure (1 mmHg). The aldimine of formula (I) is obtained with a quantitative yield.

Procedure 6b

In a reactor equipped with a stirrer, 1 mol of one of the (di)amino esters (A to L) or one of the (di)aminoamides (M and N) of formula (III) or (III') is dissolved in 500 ml of absolute methanol under an inert (nitrogen) atmosphere, followed by addition of a monoaldehyde having a boiling point >160° C. at atmospheric pressure in an amount such that the —CHO/—NH$_2$ molar ratio is in the vicinity of 1 and of 150 g of sieve 3 A. The medium is left at ambient temperature until the aldehyde signal in $^1$H/$^{13}$C NMR disappears (15 minutes to 3 hours depending on the quality of the molecular sieve). The solution is filtered and the methanol is removed by distillation under reduced pressure (1 mmHg). The aldimine of formula (I) is obtained with a quantitative yield.

Procedure 6c

In a reactor equipped with a stirrer, 1 mol of one of the (di)amino esters (A to L) or one of the (di)aminoamides (M and N) of formula (III) or (III') is dissolved in 500 ml of anhydrous ethyl ether under an inert (nitrogen) atmosphere, followed by addition of a monoaldehyde having a boiling point >160° C. at atmospheric pressure in an amount such that the —CHO/—NH$_2$ molar ratio is in the vicinity of 1 and of 150 g of sieve 3 A. The medium is left at ambient temperature until the aldehyde signal in $^1$H/$^{13}$C NMR disappears (12 to 24 hours depending on the quality of the molecular sieve). The solution is filtered and the ethyl ether is removed by distillation under reduced pressure (10 mmHg). The aldimine of formula (I) is obtained with a quantitative yield.

Aldimines of Formula (II)

Depending on the nature of the amino esters or of the aminoamides of formula (III) or (III'), of the dialdehydes of formula (VIII) used for the synthesis of the aldimines of formula (II) and on their respective solubilities in toluene, in absolute methanol or in anhydrous ethyl ether and depending on whether it is more or less easy to remove the aldehydes under reduced pressure, preference is given to using procedure 7a for the aldehydes of boiling point 160° C. at atmospheric pressure or procedures 7b or 7c for the aldehydes of boiling point >160° C. at atmospheric pressure.

Procedure 7a

In a reactor equipped with a stirrer and a Dean-Stark apparatus, 1 mol of one of the amino esters (A to F, H and I) or the aminoamide (O) of formula (III) or (III'), 1 mmol of formic acid, and then a dialdehyde of formula (VIII) having a boiling point: 160° C. at atmospheric pressure in an amount such that the —CHO/—NH$_2$ molar ratio is equal to 1.25 are dissolved in 500 ml of toluene under an inert (nitrogen) atmosphere. The mixture is heated and maintained at reflux for around 6 hours until no more water is removed by azeotropic distillation. The toluene and the excess dialdehyde are then removed by distillation under reduced pressure (1 mmHg). The aldimine of formula (II) is obtained with a quantitative yield.

Procedure 7b

In a reactor equipped with a stirrer, 1 mol of one of the amino esters (A to F, H and I) or the aminoamide (0) of formula (III) or (III) is dissolved in 500 ml of absolute methanol under an inert (nitrogen) atmosphere, followed by addition of a dialdehyde of formula (VIII) having a boiling point >160° C. at atmospheric pressure in an amount such that the —CHO/—NH$_2$ molar ratio is in the vicinity of 1 and of 150 g of sieve 3 A. The medium is left at ambient temperature until the aldehyde signal in $^1$H/$^{13}$C NMR disappears (15 minutes to 3 hours depending on the quality of the molecular sieve). The solution is filtered and the methanol is removed by distillation under reduced pressure (1 mmHg). The aldimine of formula (II) is obtained with a quantitative yield.

Procedure 7c

In a reactor equipped with a stirrer, 1 mol of one of the amino esters (A to F, H and 1) or the aminoamide (O) of formula (III) or (III') is dissolved in 500 ml of anhydrous ethyl ether under an inert (nitrogen) atmosphere, followed by addition of a dialdehyde of formula (VIII) having a boiling point >160° C. at atmospheric pressure in an amount such that the —CHO/—NH2 molar ratio is in the vicinity of 1 and of 150 g of sieve 3 A. The medium is left at ambient temperature until the aldehyde signal in $^1$H/$^{13}$C NMR disappears (12 to 48 hours depending on the quality of the molecular sieve). The solution is filtered and the ethyl ether is removed by distillation under reduced pressure (10 mmHg). The aldimine of formula (II) is obtained with a quantitative yield.

Table of Molecules

The following aldimines were thus synthesized:

| Amino ester/ Aminoamide | Aldehyde | Aldimines of formula (I) or (II) | No |
|---|---|---|---|
| A | P | 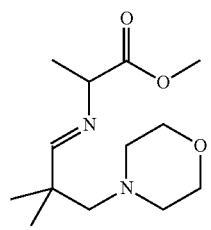 [SMILES: COC(=O)C(C)/N=C/C(C)(C)CN1CCOCC1] | Ald1 |

-continued
| Amino ester/ Aminoamide | Aldehyde | Aldimines of formula (I) or (II) | No |
|---|---|---|---|
| A | Q | 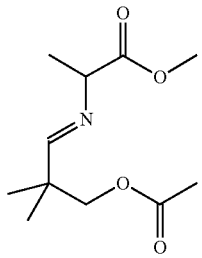 [SMILES: COC(=O)C(C)/N=C/C(C)(C)COC(C)=O] | Ald2 |
| A | R | 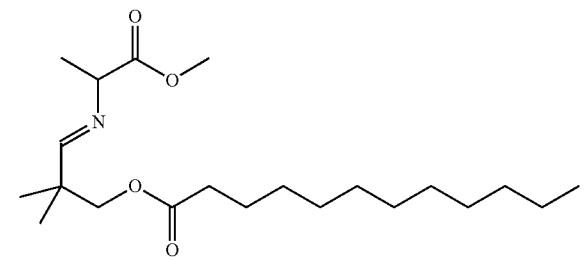 [SMILES: CCCCCCCCCCCC(=O)OCC(C)(C)/C=N/C(C)C(=O)OC] | Ald3 |
| A | T | 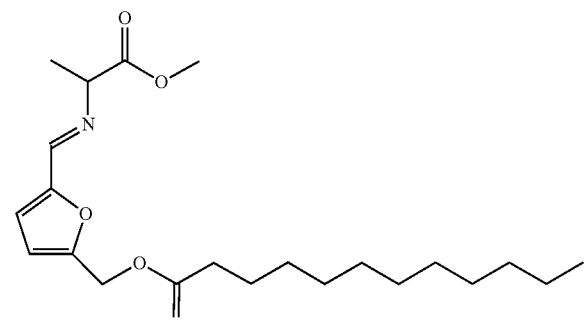 | Ald4 |
| A | U | 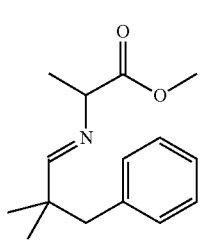 [SMILES: COC(=O)C(C)/N=C/C(C)(C)Cc1ccccc1] | Ald5 |
| A | V | 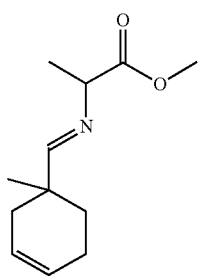 | Ald6 |

-continued
| Amino ester/ Aminoamide | Aldehyde | Aldimines of formula (I) or (II) | No |
|---|---|---|---|
| A | W | 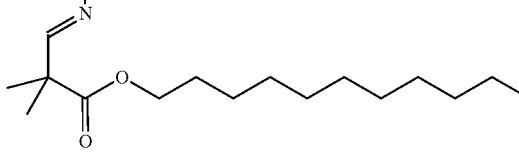 | Ald7 |
| A | X |  | Ald8 |
| A | Y | 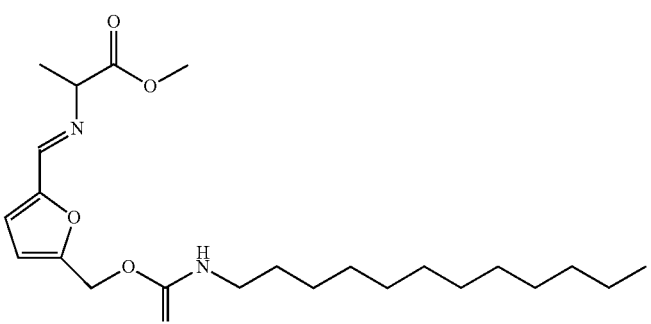 | Ald9 |
| A | Z1 | 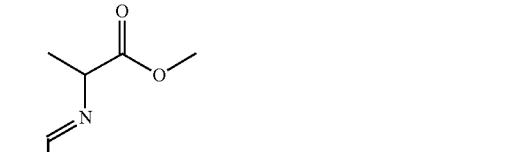 | Ald10 |
| A | Z3 | 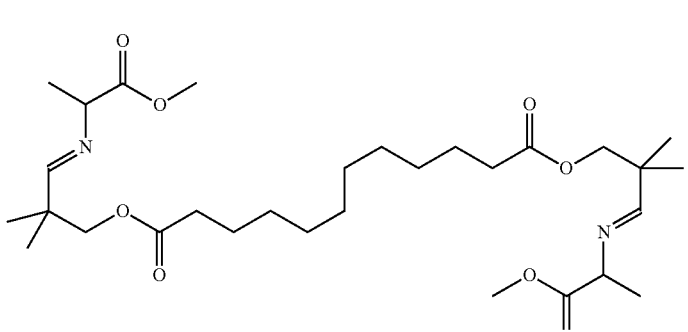 | Ald11 |

-continued
| Amino ester/ Aminoamide | Aldehyde | Aldimines of formula (I) or (II) | No |
|---|---|---|---|
| A | Z4 | 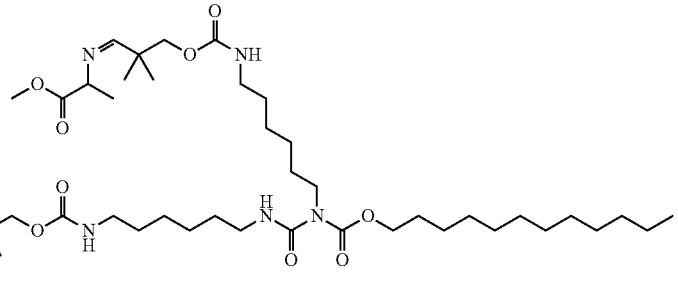 | Ald12 |
| A | Z5 | 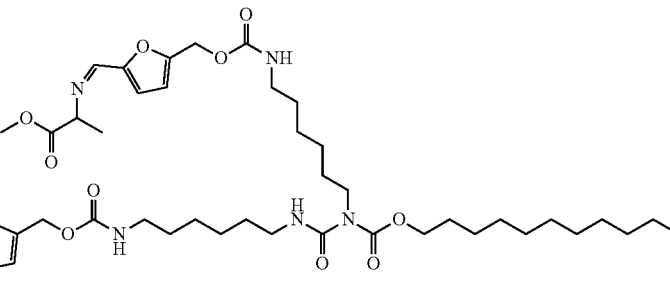 | Ald13 |
| B | R | 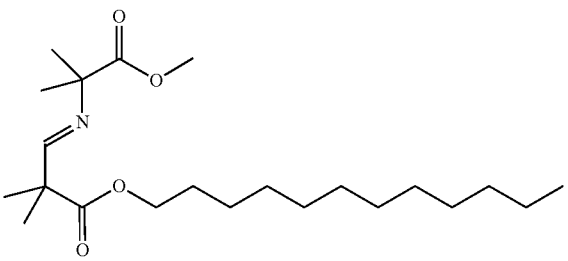 [SMILES: CCCCCCCCCCCCOC(=O)C(C)(C)/C=N/C(C)(C)C(=O)OC] | Ald14 |
| C | R | 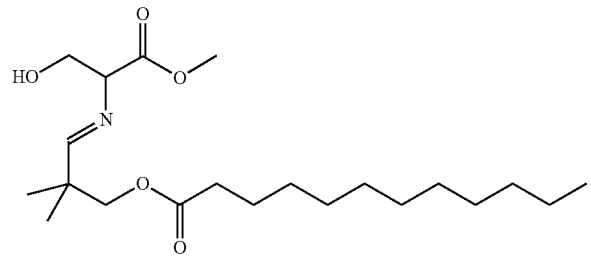 [SMILES: CCCCCCCCCCCC(=O)OCC(C)(C)/C=N/C(CO)C(=O)OC] | Ald15 |
| D | R | 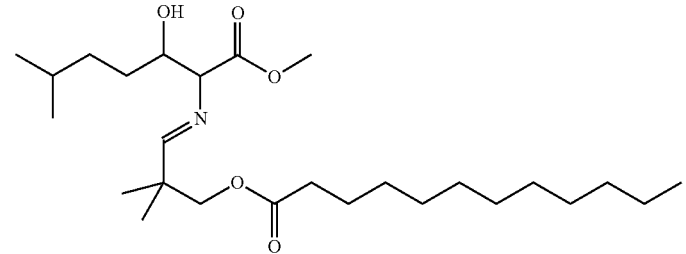 [SMILES: CCCCCCCCCCCC(=O)OCC(C)(C)/C=N/C(C(=O)OC)C(O)CCC(C)C] | Ald16 |

-continued
| Amino ester/ Aminoamide | Aldehyde | Aldimines of formula (I) or (II) | No |
|---|---|---|---|
| E | R | 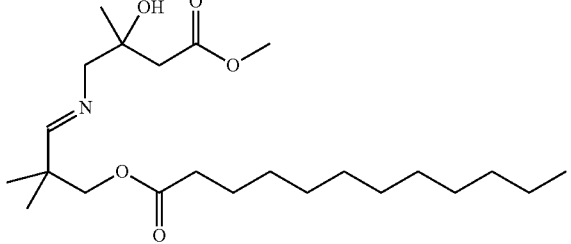 | Ald17 |
| F | R | 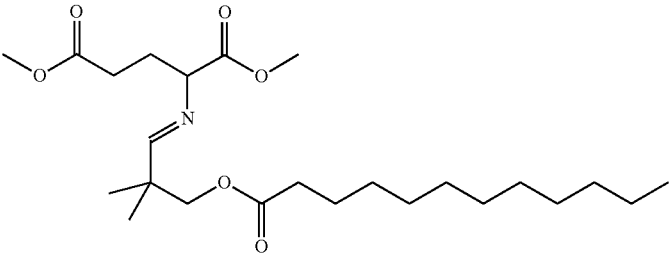 [SMILES: CCCCCCCCCCCC(=O)OCC(C)(C)/C=N/C(CCC(=O)OC)C(=O)OC] | Ald18 |
| H | R | 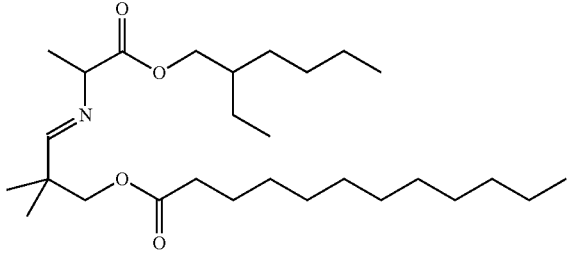 [SMILES: CCCCCCCCCCCC(=O)OCC(C)(C)/C=N/C(C)C(=O)OCC(CC)CCCC] | Ald19 |
| I | R | 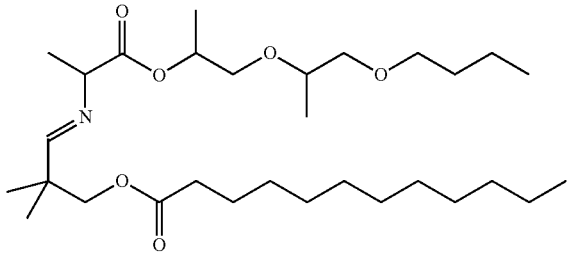 [SMILES: CCCCCCCCCCCC(=O)OCC(C)(C)/C=N/C(C)C(=O)OC(C)COC(C)COCCCC] | Ald20 |
| K | S | 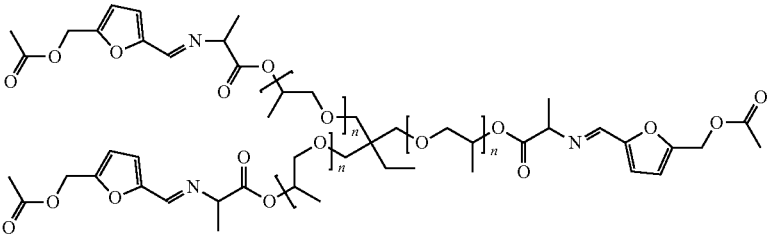 | Ald21 |
| L | P | 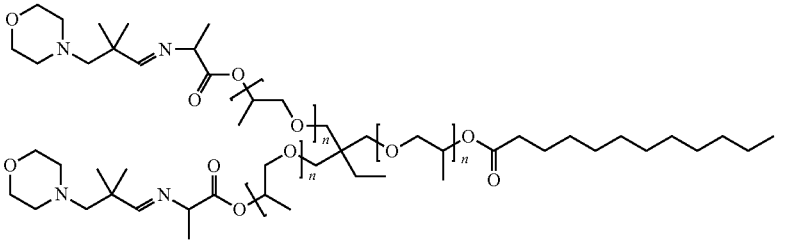 | Ald22 |

-continued

| Amino ester/ Aminoamide | Aldehyde | Aldimines of formula (I) or (II) | No |
|---|---|---|---|
| J | U | 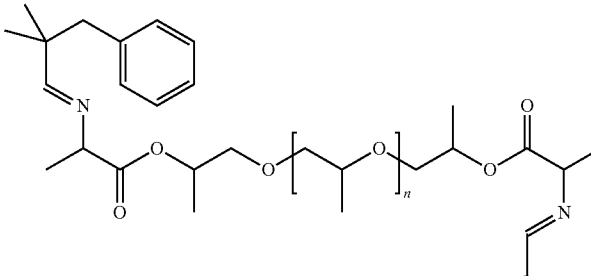 | Ald23 |
| J | Y | 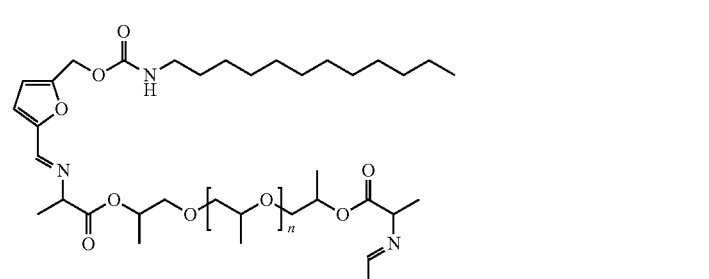 | Ald24 |

Example 9: Application Test

Preparation of the NCO-terminated polyurethane (P1)

The non-limiting example of NCO-terminated polyurethane (P1) used in the reference example outside of the invention (without aldimine) and in examples C1 to C2 according to the invention (with aldimines according to the invention) was prepared by mixing the ingredients indicated in the following table at a temperature of less than or equal to 95° C. under anhydrous conditions. The amounts indicated in the table below are expressed as percentages by weight relative to the total weight of the polyurethane composition of each of the examples.

| Ingredients | P1 |
|---|---|
| PPG triol having a number-average molar mass of 3700 g/mol (OHN = 44.5 mg KOH/g): Desmophen 4042 BT | 38.3 |
| PPG diol having a number-average molar mass of 2000 g/mol: Voranol 2000 L | 36.9 |
| 2,4'-TDI (% NCO ≥ 48.0% by weight): Desmodur T 100 | 9.6 |
| Catalyst (DOTL) | 0.012 |
| Xylene | 15.2 |
| NCO/OH molar ratio | 1.6 |
| Final % by weight of NCO | 1.8 |

In the above table, the final % by weight of NCO corresponds to the amount of NCO functions in the polyurethane solution (P1) at the end of the polyurethane preparation reaction, expressed relative to the total weight of the polyurethane solution.

Preparation of Sealant Compositions

Sealant compositions were then formulated from the NCO-terminated polyurethane prepared in accordance with the process above.

The reference sealant composition outside of the invention (without aldimine) and the sealant compositions C1 to C2 according to the invention (with aldimines according to the invention) have been reported in the following table:

|  | Reference | C1 | C2 |
|---|---|---|---|
| Prepolymer (P1) | 19.40 | 17.31 | 17.11 |
| Mesamoll: CAS 91082-17-6 | 16.90 | 16.91 | 16.91 |
| Gel Paste CAS 77703-56-1 available from Sika (dibutyl-4,4'-methylenedi(phenyl)urea) | 12.33 | 12.34 | 12.34 |
| DIDP: diisodecyl phthalate | 2.10 | 2.10 | 2.10 |
| PTSI: p-toluenesulfonyl isocyanate | 0.40 | 0.40 | 0.40 |
| IPDI | 0.40 | 0.40 | 0.40 |
| XDI | 0.20 | 0.20 | 0.20 |
| Silquest A-187 (Momentive) | 0.17 | 0.17 | 0.17 |
| Tinuvin B 75 (BASF) | 0.14 | 0.14 | 0.14 |
| Xylene | 1.90 | 1.90 | 1.90 |
| PVC (Solvin 373 MC) | 15.60 | 15.61 | 15.61 |
| Omya BSH | 25.00 | 25.01 | 25.01 |
| TiO$_2$ | 4.90 | 4.90 | 4.90 |
| Aerosil R 202 | 0.51 | 0.51 | 0.51 |

-continued

|  | Reference | C1 | C2 |
|---|---|---|---|
| Ald 23 with Mn = 590 g/mol |  | 2.00 |  |
| Ald 21 with Mn = 890 g/mol |  |  | 2.10 |
| Salicylic acid |  | 0.10 | 0.20 |
| Tin catalyst | 0.05 | — | — |

The above sealant compositions formulated from the NCO-terminated polyurethane (P11) and aldimines according to the invention compared to the reference sealant composition were characterized and the results reported in the table below:

|  | Reference | C1 | C2 |
|---|---|---|---|
| Skinning time (min) | 7 h | 64 min | 25 min |
| Extrusion (g/min) at t° | 250 | 350 | 200 |
| Boeing test | 0 | 0 | 0 |
| Elongation at break-Dumbbell (%) | 500 | 500 | 400 |
| 100% Modulus-Dumbbell (MPa) | 0.55 | 0.58 | 0.54 |
| Max. modulus (MPa) | 0.80 | 1.30 | 1.00 |
| 7-day stability | OK | OK | OK |
| Extrusion at t° + 3 weeks at 40° C. (g/min) | 210 | 300 | 180 |
| Bubbling | Yes | No | No |

Characterization:
- the skinning time was measured according to the standard ISO 291 at 23° C. and 50% relative humidity,
- the extrusion corresponds to the amount, in grams, of sealant which was able to be extruded per minute, under a pressure of the piston of 3 bar at 23° C.,
- the 100% modulus—dumbbell was measured according to the standard NF ISO 37 (March 2012) with dumbbell test specimens,
- the max. modulus was measured according to the standard ISO 8339,
- the elongation at break—dumbbell was measured according to the standard NF ISO (March 2012) with dumbbell test specimens,
- the creep resistance has been checked according to the standard ASTM D2202 known as the "Boeing Test",
- the extrusion of the sealant compositions is carried out through a 4-mm diameter extrusion nozzle under a pressure of 3 bar at 23° C. and constant humidity at the end of mixing (t°) and 3 weeks at 40° C. after the end of mixing (t°+3 weeks) to assess their viscosity.

The invention claimed is:
1. A compound having one of the following formulae (I) and (II):

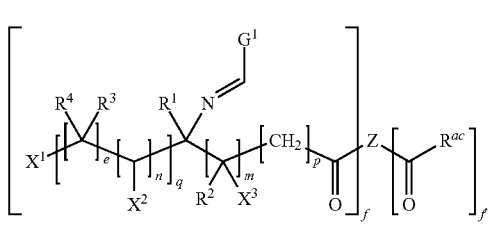

(I)

in which:
- $X^1$ represents $F^1$ or —N=C(H)-$G^1$ or -Ph-XH, or —XH, with X representing O or S or Se and Ph representing a phenyl group;
- $X^2$ represents $F^2$ or —N=C(H)-$G^1$ or -Ph-XH, or —XH, with X representing O or S or Se and Ph representing a phenyl group;
- $X^3$ represents $F^3$ or —N=C(H)-$G^1$ or -Ph-XH, or —XH, with X representing O or S or Se and Ph representing a phenyl group;
- provided that at most just one radical from among the radicals $X^1$, $X^2$ and $X^3$ represents —N=C(H)-$G^1$;
- provided that at most just one radical from among the radicals $X^1$, $X^2$ and $X^3$ represents —XH or -Ph-XH;
- provided that when $X^1$=—N=C(H)-$G^1$, then q=1;
- provided that when $X^1$=—N=C(H)-$G^1$ or -Ph-XH or —XH, then $X^2$=$F^2$ and $X^3$=$F^3$;
- provided that when $X^2$=—N=C(H)-$G^1$ or -Ph-XH or —XH, then $X^1$=$F^1$ and $X^3$=$F^3$;
- provided that when $X^3$=—N=C(H)-$G^1$ or -Ph-XH or —XH, then $X^2$=$F^2$ and $X^1$=$F^1$;
- $F^1$ represents a radical selected from the group consisting of a hydrogen atom, a linear or branched alkyl group comprising from 1 to 20 carbon atoms, an arylalkyl group comprising from 7 to 20 carbon atoms, a (hetero) aryl group comprising from 4 to 12 carbon atoms, and a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $F^2$ represents a radical selected from the group consisting of a hydrogen atom, a linear or branched alkyl group comprising from 1 to 20 carbon atoms, an arylalkyl group comprising from 7 to 20 carbon atoms, a (hetero) aryl group comprising from 4 to 12 carbon atoms, and a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $F^3$ represents a radical selected from the group consisting of a hydrogen atom, a linear or branched alkyl group comprising from 1 to 20 carbon atoms, an arylalkyl group comprising from 7 to 20 carbon atoms, a (hetero) aryl group comprising from 4 to 12 carbon atoms, and a (hetero)cycloalkyl group comprising from 3 to 20 carbon atoms, a —COOZ group, a —C(O)$NH_2$ group, an —SMe group, or a guanidyl group of formula —NH—C(=NH)—$NH_2$,
- $R^1$, $R^2$, $R^3$ and $R^4$ each represent, independently of one another, a radical selected from the group consisting of a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms and a (hetero)aryl group comprising from 4 to 12 carbon atoms;
- n is an integer ranging from 0 to 28;
- p is an integer ranging from 0 to 10;
- m represents 0 or 1;
- q represents 0 or 1;
- e is an integer ranging from 1 to 3;
- f is an integer or non-integer ranging from 1 to 3;
- f is an integer or non-integer ranging from 0 to 2;
- the sum f+f represents an integer ranging from 1 to 3;
- Z represents a monovalent organic radical Z', divalent organic radical $Z^d$ or trivalent organic radical $Z^t$, having a molar mass or a number-average molecular mass (Mn) ranging from 16 to 22 000 g/mol, $R^{ac}$ represents a hydrogen atom or a monovalent hydrocarbon radical comprising from 1 to 60 carbon atoms, wherein said radical optionally comprises one or more heteroatoms;

$G^1$ represents a monovalent hydrocarbon radical of molar mass or of number-average molecular mass (Mn) ranging from 15 to 4000 g/mol, wherein said radical optionally comprises one or more heteroatoms, provided that $G^1$ does not represent a substituted or unsubstituted aryl radical;

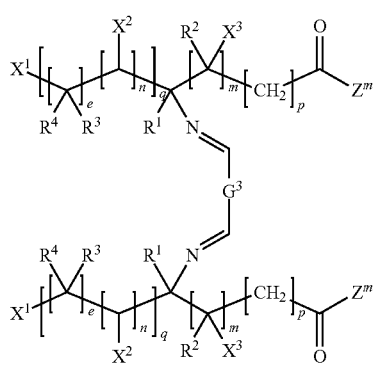

(II)

in which:
- $X^1$ represents $F^1$ or -Ph-XH, or —XH;
- $X^2$ represents $F^2$ or -Ph-XH, or —XH;
- $X^3$ represents $F^3$ or -Ph-XH, or —XH;
- $F^1$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ' group, a —C(O)NH$_2$ group, an —SMe group, or a guanidyl group of formula —NH—C(=NH)—NH$_2$,
- $F^2$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ' group, a —C(O)NH$_2$ group, an —SMe group, or a guanidyl group of formula —NH—C(=NH)—NH$_2$,
- $F^3$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ' group, a —C(O)NH$_2$ group, an —SMe group, or a guanidyl group of formula —NH—C(=NH)—NH$_2$,
- X, $R^1$, $R^2$, $R^3$, $R^4$, n, q, m, p, e and Z' being as defined for formula (I) above;
- $G^3$ represents a monovalent hydrocarbon radical of molar mass or of number-average molecular mass (Mn) ranging from 14 to 4000 g/mol, it being possible fer wherein said radical optionally comprises one or more heteroatoms, provided that $G^3$ does not represent a substituted or unsubstituted arylene radical;

provided that at most just one radical from among the radicals $X^1$, $X^2$ and $X^3$ represents —XH or -Ph-XH;

provided that when $X^1$=-Ph-XH or —XH, then $X^2$=$F^2$ and $X^3$=$F^3$;

provided that when $X^2$=-Ph-XH or —XH, then $X^1$=$F^1$ and $X^3$=$F^3$;

provided that when $X^3$=-Ph-XH or —XH, then $X^2$=$F^2$ and $X^1$=$F^1$.

2. The compound as claimed in claim 1, wherein $Z^m$ represents a radical selected from the group consisting of —OR$^5$, —NH$_2$, —NH—R' and —N(R')(R"), in which:
- $R^5$ represents a linear or branched alkyl group comprising from 1 to 60 carbon atoms which may optionally comprise one or more heteroatoms, a (hetero)cycloalkyl group comprising from 3 to 20 carbon atoms, an arylalkyl group comprising from 7 to 20 carbon atoms, or a (hetero)aryl group comprising from 4 to 12 carbon atoms;
- R' represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms;
- R" represents a linear or branched alkyl group comprising from 1 to 60 carbon atoms which may optionally comprise one or more heteroatoms, an arylalkyl group comprising from 7 to 20 carbon atoms, a (hetero)aryl group comprising from 4 to 12 carbon atoms, or a (hetero)cycloalkyl group comprising from 3 to 20 carbon atoms.

3. The compound as claimed in claim 1, wherein the radical -$G^1$ represents a radical —C($R^6$)($R^7$)(R') or a radical -$G^2$ with:
- $R^6$ and $R^7$ each representing, independently of one another, a monovalent hydrocarbon radical comprising from 1 to 12 carbon atoms, said radical being optionally substituted by an —OH group; or
- $R^6$ and $R^7$ together form an aliphatic ring comprising from 4 to 12 carbon atoms, said ring being optionally substituted;
- $R^8$ represents a monovalent hydrocarbon radical comprising from 1 to 60 carbon atoms, said radical optionally comprising a heteroatom;
- $G^2$ represents an optionally substituted heteroaryl radical, or a radical —C(O)—$R^{12}$ with $R^{12}$ representing an alkoxy radical, an alkenyl radical, or an arylalkenyl radical comprising at least 6 carbon atoms, said radical $G^2$ having a molar mass or a number-average molecular mass (Mn) ranging from 15 to 4000 g/mol.

4. The compound as claimed in claim 1, wherein, in formula (II), the radical -$G^3$ represents:
- a linear or branched, cyclic or non-cyclic, saturated or unsaturated alkylene radical, or
- a radical -$G^5$-($G^6$-$G^5$)-, of molar mass or of number-average molecular mass (Mn) ranging from 14 to 4000 g/mol, in which:
  - $G^5$ represents an optionally substituted hetero(arylene) radical;
  - $G^6$ represents an oxygen atom, a sulfur atom or a radical selected from the group consisting of one of the following radicals: —O—$R^{27}$—O—, —CH$_2$—O—$R^{28}$—O—CH$_2$—, —CH$_2$—O—C(=O)—$R^{29}$—C(=O)—O—CH$_2$—, —CH$_2$—O—C (=O)—NH—R$^{30}$—NH—C(=O)—O—CH$_2$—,
—O—C(=O)—NH—R$^{31}$—NH—C(=O)—O—,
and —O—C(=O)—R$^{32}$—C(=O)—O—, with R$^{27}$, R$^{28}$, R$^{29}$, R$^{30}$, R$^{31}$ and R$^{32}$ each representing, independently of one another, a hydrocarbon radical optionally comprising at least one heteroatom;

r represents 0 or 1;

provided that when r=0, then G$^5$ represents an optionally substituted heteroarylene;

a radical —CH(R$^{25}$)(R$^{26}$)-[G$^4$-CH(R$^{25}$)(R$^{26}$)]W—, of molar mass or of number-average molecular mass (Mn) ranging from 42 to 4000 g/mol, in which:

R$^{25}$ and R$^{26}$ each represent, independently of one another, a monovalent hydrocarbon radical comprising from 1 to 12 carbon atoms, said radical being optionally substituted by an —OH group;

or R$^{25}$ and R$^{26}$ together form an aliphatic ring comprising from 4 to 12 carbon atoms, said ring being optionally substituted;

G$^4$ represents a carbon-carbon bond or a divalent hydrocarbon radical, said radical optionally comprising at least one heteroatom; and w represents an integer equal to 0 or 1.

5. The compound as claimed in claim 1, wherein, in formulae (I) and (II):

n represents 0, 1, 2, 3, 4, 9 or 28;
m represents 0 or 1;
p represents 0 or 1 or 9 or 10;
q represents 0 or 1;

F$^1$ represents a radical selected from the group consisting of a hydrogen atom, a (hetero)aryl group comprising from 4 to 12 carbon atoms, a —COOZ group (formula (I) with Z being as defined above in formula (I), or, respectively, a —COOZ group with Z' being as defined in formula (II)), a —C(O)NH$_2$ group, an —SMe group, and a guanidyl group of formula —NH—C(=NH)—NH$_2$, F$^2$ represents a radical selected from the group consisting of a hydrogen atom and a linear or branched alkyl group comprising from 1 to 10 carbon atoms, F$^3$ represents a radical selected from the group consisting of a hydrogen atom and a linear or branched alkyl group comprising from 1 to 10 carbon atoms;

R$^1$, R$^2$, R$^3$ and R$^4$ each represent, independently of one another, a hydrogen atom, or a linear or branched alkyl group comprising from 1 to 10 carbon atoms, or an arylalkyl group comprising from 7 to 20 carbon atoms, or an aryl group comprising from 6 to 12 carbon atoms.

6. The compound as claimed in claim 1, wherein, in formulae (I) and (II):

n represents 0, 1, 2, 3 or 4;
m represents 0 or 1;
p represents 0 or 1;
q represents 0 or 1;

F$^1$ represents a radical selected from the group consisting of a hydrogen atom, a heteroaryl group comprising from 4 to 12 carbon atoms, a —COOZ group (Z being as defined above in formula (I)), a —C(O)NH$_2$ group, an —SMe group, and a guanidyl group of formula —NH—C(=NH)—NH$_2$, F$^2$ represents a radical selected from the group consisting of a hydrogen atom and a linear or branched alkyl group comprising from 1 to 5 carbon atoms, F$^3$ represents a radical selected from the group consisting of a hydrogen atom;

R$^1$, R$^2$, R$^3$ and R$^4$ each represent, independently of one another, a hydrogen atom, or a linear or branched alkyl group comprising from 1 to 5 carbon atoms, or a benzyl group, or a phenyl group.

7. The compound as claimed in claim 1, wherein it is selected from the group consisting of the compounds of the following formulae (I-A), (I-B), (I-C) and (I-D):

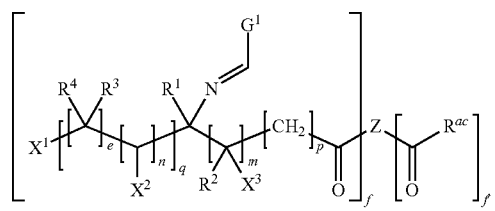
(I-A)

in which:
R$^1$, R$^2$, R$^3$, R$^4$, n, m, p, q, e, f, f, Z, G$^1$ and R$^{ac}$ are as defined in formula (I) in claim 1, X$^1$ represents F$^1$ as defined in formula (I) in claim 1, or -Ph-XH, or —XH with X representing O or S or Se and Ph representing a phenyl group;

X$^2$ represents F$^2$ as defined in formula (I) in claim 1, or -Ph-XH, or —XH with X representing O or S or Se and Ph representing a phenyl group;

X$^3$ represents F$^3$ as defined in formula (I) in claim 1, or -Ph-XH, or —XH with X representing O or S or Se and Ph representing a phenyl group;

provided that at most one of the radicals X$^1$, X$^2$ or X$^3$ represents a radical -Ph-XH or —XH with X representing O or S or Se and Ph representing a phenyl radical;

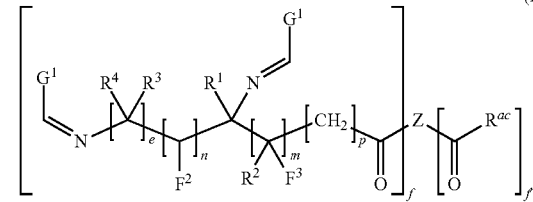
(I-B)

in which F$^2$, F$^3$, R$^1$, R$^2$, R$^3$, R$^4$, n, m, p, e, f, f, Z, G$^1$ and R$^{ac}$ are as defined in formula (I) in claim 1;

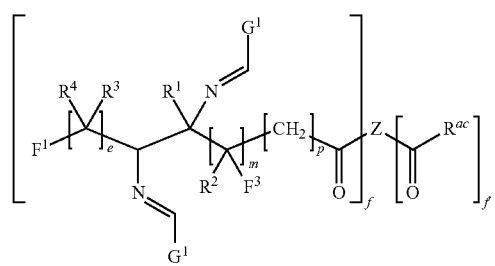
(I-C)

in which F$^1$, F$^3$, R$^1$, R$^2$ R$^3$, R$^4$, F$^2$, m, p, q, e, f, f, G$^1$, Z and R$^a$ are as defined in formula (I) in claim 1;

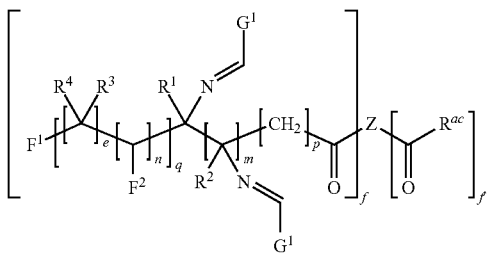
(I-D)

in which $F^1$, $F^2$, $R^1$, $R^2$, $R^3$, $R^4$, $F^2$, m p, q, e f, f, $G^1$, Z and $R^{ac}$ are as defined in formula (I) in claim 1.

8. The compound as claimed in claim 7, wherein the compounds of formula (I-A) have one of the following formulae (I-A-1), (I-A-2) or (I-A-3):

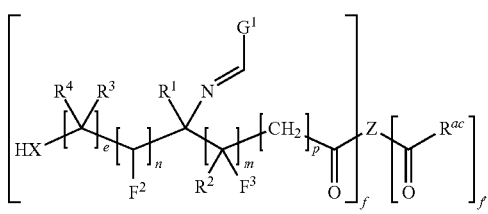
(I-A-1)

in which X, $R^1$, $R^2$, $R^3$, $R^4$, n, m, p, e, f, f, Z, $F^2$, $F^3$, $G^1$ and $R^{ac}$ are as defined in formula (I-A) in claim 7,

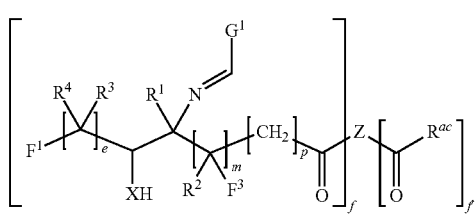
(I-A-2)

in which $R^1$, $R^2$, $R^3$, $R^4$ m, p, e, f, f, Z, X, $G^1$, $F^1$, $F^3$, $G^1$ and $R^a$ are as defined in formula (I-A) in claim 7,

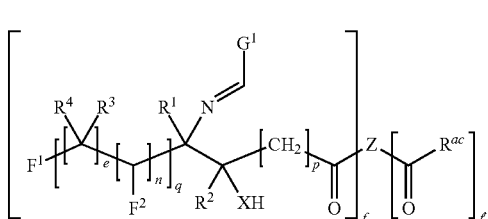
(I-A-3)

in which $R^1$, $R^2$, $R^3$, $R^4$, n, p, q, e, f f, Z, X, $G^1$, $F^1$, $F^2$, R are as defined in formula (I-A) in claim 7.

9. The compound as claimed in claim 7, wherein the compounds of formula (I-B) have one of the following formulae (I-B-1), (I-B-2) or (I-B-3):

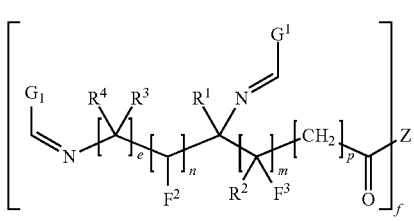
(I-B-1)

in which $F^2$, $F^3$, $R^1$, $R^2$, $R^3$, $R^4$, n, m, p, e, f, $G^1$ and Z are as defined in formula (I-B) in claim 7,

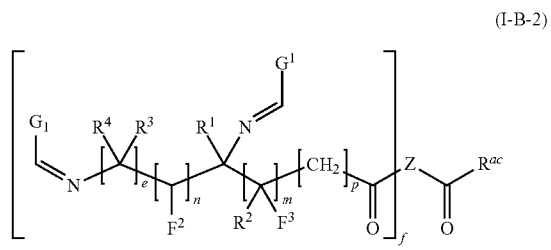
(I-B-2)

in which $F^2$, $F^3$, $R^2$, $R^3$, $R^4$, n, m, p, e, f, $G^1$, Z and $R^{ac}$ are as defined in formula (I-B) in claim 7,

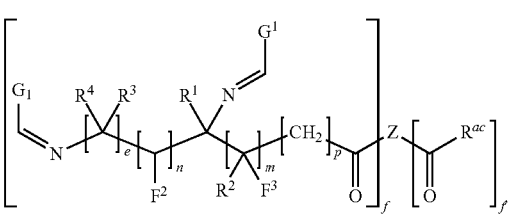
(I-B-3)

in which $F^2$, $F^3$, $R^1$, $R^2$, $R^3$, $R^4$, n, m, p, e, f, $G^1$, Z and $R^{ac}$ are as defined in formula (I-B) in claim 7.

10. The compound as claimed in claim 7, wherein the compounds of formula (I-C) have one of the following formulae (I-C-1), (I-C-2) or (I-C-3):

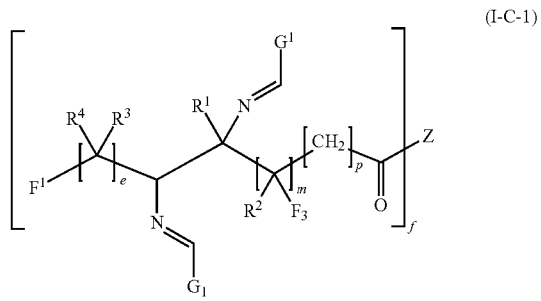
(I-C-1)

in which $F^1$, $F^3$, $R^1$, $R^2$, $R^3$, $R^4$, $F^2$, m, p, q, e, f, $G^1$ and Z are as defined in formula (I-C) in claim 7, (I-C-2)

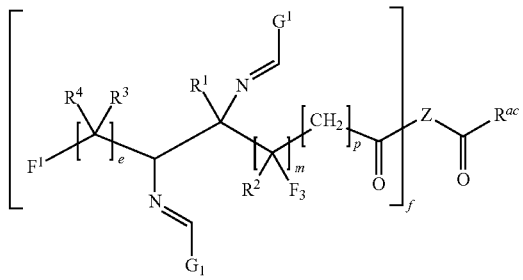

in which $F^1$, $F^3$, $R^1$, $R^2$, $R^3$ $R^4$, $F^2$, m, p, q, e, f, $G^1$, Z and $R^{ac}$ are as defined in formula (I-C) in claim 7, (I-C-3)

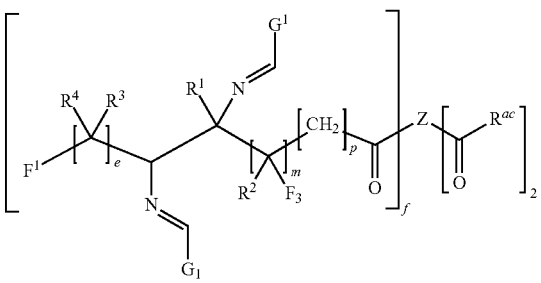

in which $F^1$, $F^3$, $R^1$, $R^2$, $R^3$, $R^4$, $F^2$, m, p, q, e, f, $G^1$, Z and $R^a$ are as defined in formula (I-C) in claim 7.

11. The compound as claimed in claim 7, wherein the compounds of formula (I-D) have one of the following formulae (I-D-1), (I-D-2) or (I-D-3):

(I-D-1)

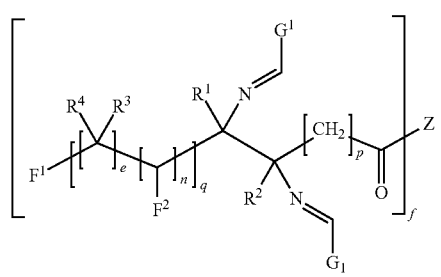

in which $F^1$, $F^2$, $R^1$, $R^2$, $R^3$, $R^4$, $F^2$, n, m, p, q, e, f, $G^1$ and Z are as defined in formula (I-D) in claim 7, (I-D-2)

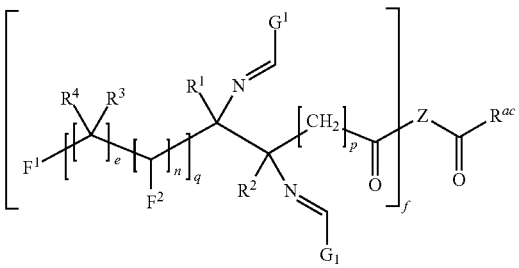

in which $F^1$, $F^2$, $R^1$, $R^2$, $R^3$, $R^4$, $F^2$, n, m, p, q, e, f, $G^1$, Z and $R^a$ are as defined in formula (I-D) in claim 7, (I-D-3)

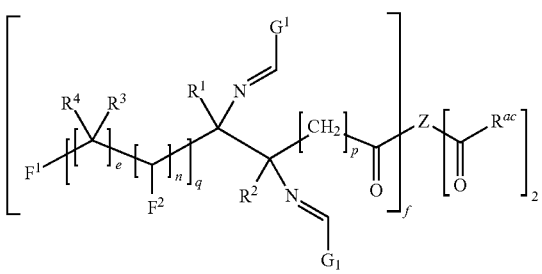

in which $F^1$, $F^2$, $R^1$, $R^2$, $R^3$, $R^4$, $F^2$, n, m, p, q, e, f, $G^1$, Z and $R^{ac}$ are as defined in formula (I-D) in claim 7.

12. The compound of formula (I) as claimed claim 1, wherein it is obtained by reaction between:

a compound of formula (III) below:

(III)

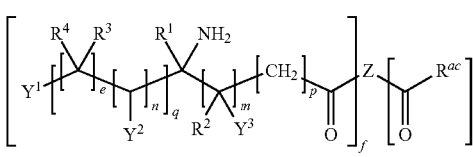

in which:
- $Y^1$ represents $F^1$ or —$NH_2$ or -Ph-XH or —XH with X representing O or S or Se and Ph representing a phenyl group;
- $Y^2$ represents $F^2$ or —$NH_2$ or -Ph-XH or —XH with X representing O or S or Se and Ph representing a phenyl group;
- $Y^3$ represents $F^3$ or —$NH_2$ or -Ph-XH or —XH with X representing O or S or Se and Ph representing a phenyl group;
- provided that at most just one radical from among the radicals $Y^1$, $Y^2$ and $Y^3$ represents —$NH_2$,
- provided that at most just one radical from among the radicals $Y^1$, $Y^2$ and $Y^3$ represents -Ph-XH or —XH;
- provided that when $Y^1$=—$NH_2$, then q=1;
- provided that when $Y^1$=—$NH_2$ or —XH or -Ph-XH, then $Y^2$=$F^2$ and $Y^3$=$F^3$;
- provided that when $Y^2$=—$NH_2$ or —XH or -Ph-XH, then $Y^1$=$F^1$ and $Y^3$=$F^3$;
- provided that when $Y^3$=—$NH_2$ or —XH or -Ph-XH, then $Y^2$=$F^2$ and $Y^1$=$F^1$;

F¹ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH₂ group, an —SMe group, or a guanidyl group of formula —NH—C(=NH)—NH₂, F² represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH₂ group, an —SMe group, or a guanidyl group of formula —NH—C(=NH)—NH₂, F³ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH₂ group, an —SMe group, or a guanidyl group of formula —NH—C(=NH)—NH₂, R¹, R², R³ and R⁴ each represent, independently of one another, a radical selected from the group consisting of a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms and a (hetero)aryl group comprising from 4 to 12 carbon atoms;

n is an integer ranging from 0 to 28;
p is an integer ranging from 0 to 10;
m represents 0 or 1;
q represents 0 or 1;
e is an integer ranging from 1 to 3;
f is an integer or non-integer ranging from 1 to 3;
f is an integer or non-integer ranging from 0 to 2;
the sum f+f represents an integer ranging from 1 to 3;
Z represents a monovalent organic radical Z', divalent organic radical $Z^d$ or trivalent organic radical $Z^t$, having a number-average molecular mass (Mn) ranging from 16 to 000 g/mol,
$R^{ac}$ represents a hydrogen atom or a monovalent hydrocarbon radical comprising from to 60 carbon atoms, wherein said radical optionally comprises one or more heteroatoms;

and a compound of formula (IV) below:

(IV)

in which G¹ is as defined in formula (I) in claim 1.

13. The compounds of formula (II) as claimed in claim 1, wherein they are obtained by reaction between:

a compound of formula (III') below:

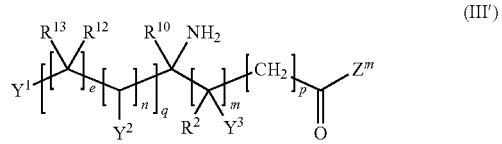

(III')

in which:
Y¹ represents F¹ or -Ph-XH or —XH with X representing O or S or Se and Ph representing a phenyl group;
Y² represents F² or -Ph-XH or —XH with X representing O or S or Se and Ph representing a phenyl group;
Y³ represents F³ or -Ph-XH or —XH with X representing O or S or Se and Ph representing a phenyl group;
provided that at most just one radical from among the radicals Y¹, Y² and Y³ represents -Ph-XH or —XH;
provided that when Y¹=—XH or -Ph-XH, then Y²=F² and Y³=F³;
provided that when Y²=—XH or -Ph-XH, then Y¹=F¹ and Y³=F³;
provided that when Y³=—XH or -Ph-XH, then Y¹=F¹ and Y²=F²;

F¹ represents a radical chosen from a hydrogen atom, a linear or branched alkyl group comprising from 1 to 20 carbon atoms, an arylalkyl group comprising from 7 to 20 carbon atoms, a (hetero)aryl group comprising from to 12 carbon atoms, and a (hetero)cycloalkyl group comprising from 3 to 20 carbon atoms, a —COOZ' group, a —C(O)NH₂ group, an —SMe group, or a guanidyl group of formula —NH—C(=NH)—NH₂, F² represents a radical chosen from a hydrogen atom, a linear or branched alkyl group comprising from 1 to 20 carbon atoms, an arylalkyl group comprising from 7 to 20 carbon atoms, a (hetero)aryl group comprising from to 12 carbon atoms, and a (hetero)cycloalkyl group comprising from 3 to 20 carbon atoms, a —COOZ' group, a —C(O)NH₂ group, an —SMe group, or a guanidyl group of formula —NH—C(=NH)—NH₂, F³ represents a radical chosen from a hydrogen atom, a linear or branched alkyl group comprising from 1 to 20 carbon atoms, an arylalkyl group comprising from 7 to 20 carbon atoms, a (hetero)aryl group comprising from to 12 carbon atoms, and a (hetero)cycloalkyl group comprising from 3 to 20 carbon atoms, a —COOZ' group, a —C(O)NH₂ group, an —SMe group, or a guanidyl group of formula —NH—C(=NH)—NH₂, R¹, R², R³ and R⁴ each represent, independently of one another, a radical chosen from a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms and a (hetero)aryl group comprising from 5 to 12 carbon atoms;

n is an integer ranging from 0 to 28;
p is an integer ranging from 0 to 10;
m represents 0 or 1;
q represents 0 or 1;
e is an integer ranging from 1 to 3;
$Z^m$ represents a monovalent organic radical having a number-average molecular mass (Mn) ranging from 16 to 22 000 g/mol;

and a compound of formula (VIII) below:

(VIII)

in which $G^3$ is as defined in formula (II) above in claim 1.

14. A compound having a formula (X) or (XI), wherein the compound is used as a moisture absorber (water scavenger) in a polyurethane-based composition or as curing agent in an epoxy resin-based composition:

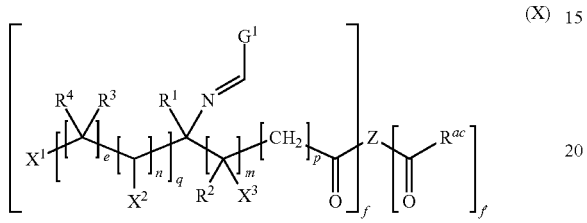

(X)

in which:
X$^1$ represents F$^1$ or —N═C(H)-G$^1$ or -Ph-XH, or —XH, with X representing 0 or S or Se and Ph representing a phenyl group;
X$^2$ represents F$^2$ or —N═C(H)-G$^1$ or -Ph-XH, or —XH, with X representing 0 or S or Se and Ph representing a phenyl group;
X$^3$ represents F$^3$ or —N═C(H)-G$^1$ or -Ph-XH, or —XH, with X representing 0 or S or Se and Ph representing a phenyl group;
provided that at most just one radical from among the radicals X$^1$, X$^2$ and X$^3$ represents —N═C(H)-G$^1$;
provided that at most just one radical from among the radicals X$^1$, X$^2$ and X$^3$ represents —XH or -Ph-XH;
provided that when X$^1$═—N═C(H)-G$^1$, then q=1;
provided that when X$^1$═—N═C(H)-G$^1$ or -Ph-XH or —XH, then X$^2$=F$^2$ and X$^3$=F$^3$;
provided that when X$^2$═—N═C(H)-G$^1$ or -Ph-XH or —XH, then X$^1$=F$^1$ and X$^3$=F$^3$;
provided that when X$^3$═—N═C(H)-G$^1$ or -Ph-XH or —XH, then X$^2$=F$^2$ and X$^1$=F$^1$;
F$^1$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH$_2$ group, an —SMe group, or a guanidyl group of formula —NH—C(═NH)—NH$_2$,
F$^2$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH$_2$ group, an —SMe group, or a guanidyl group of formula —NH—C(═NH)—NH$_2$,
F$^3$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ group, a —C(O)NH$_2$ group, an —SMe group, or a guanidyl group of formula —NH—C(═NH)—NH$_2$,
R$^1$, R$^2$, R$^3$ and R$^4$ each represent, independently of one another, a radical selected from the group consisting of a hydrogen atom, a linear or branched alkyl group comprising from 1 to 20 carbon atoms, said alkyl group optionally comprising one or more heteroatoms, a (hetero)cycloalkyl group comprising from 3 to 20 carbon atoms, an arylalkyl group comprising from 7 to 20 carbon atoms anda (hetero)aryl group comprising from 4 to 12 carbon atoms;
n is an integer ranging from 0 to 28;
p is an integer ranging from 0 to 10;
m represents 0 or 1;
q represents 0 or 1;
e is an integer ranging from 1 to 3;
f is an integer or non-integer ranging from 1 to 3;
f is an integer or non-integer ranging from 0 to 2;
the sum f+f represents an integer ranging from 1 to 3;
Z represents a monovalent organic radical $Z^m$, divalent organic radical $Z^d$ or trivalent organic radical $Z^t$, having a molar mass or a number-average molecular mass (Mn) ranging from 16 to 22 000 g/mol,
R$^{ac}$ represents a hydrogen atom or a monovalent hydrocarbon radical comprising from 1 to 60 carbon atoms, wherein said radical optionally comprises one or more heteroatoms;
G$^1$ represents a monovalent hydrocarbon radical of molar mass or of number-average molecular mass (Mn) ranging from 15 to 4000 g/mol, wherein said radical optionally comprises one or more heteroatoms;

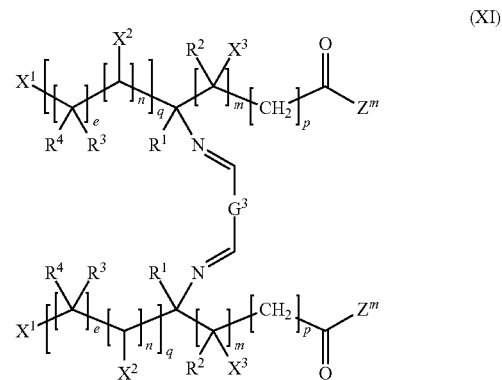

(XI)

in which:
X$^1$ represents F$^1$ or -Ph-XH, or —XH;
X$^2$ represents F$^2$ or -Ph-XH, or —XH;
X$^3$ represents F$^3$ or -Ph-XH, or —XH;
F$^1$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ' group, a —C(O)NH$_2$ group, an —SMe group, or a guanidyl group of formula —NH—C(═NH)—NH$_2$,
F$^2$ represents a radical selected from the group consisting of a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ' group, a —C(O)NH$_2$ group, an —SMe group, or a guanidyl group of formula —NH—C(=NH)—NH$_2$, $F^3$ represents a radical chosen from a hydrogen atom, a linear or branched alkyl group comprising from 1 to 20 carbon atoms, an arylalkyl group comprising from 7 to 20 carbon atoms, a (hetero)aryl group comprising from 4 to 12 carbon atoms, and a (hetero)cycloalkyl group comprising from 3 to 20 carbon atoms, a —COOZ'''  group, a —C(O)NH$_2$ group, an —SMe group, or a guanidyl group of formula —NH—C(=NH)—NH$_2$, X, $R^1$, $R^2$, $R^3$, $R^4$, n, q, m, p, e and Z' being as defined for formula (I) above;

$G^3$ represents a monovalent hydrocarbon radical of molar mass or of number-average molecular mass (Mn) ranging from 14 to 4000 g/mol, wherein said radical optionally comprises one or more heteroatoms;

provided that at most just one radical from among the radicals $X^1$, $X^2$ and $X^3$ represents —XH or -Ph-XH;

provided that when $X^1$=-Ph-XH or —XH, then $X^2$=$F^2$ and $X^3$=$F^3$;

provided that when $X^2$=-Ph-XH or —XH, then $X^1$=$F^1$ and $X^3$=$F^3$;

provided that when $X^3$=-Ph-XH or —XH, then $X^2$=$F^2$ and $X^1$=$F^1$.

15. A moisture-crosslinkable composition C1 comprising:
at least one compound of formula (X) or (XI) as defined in claim 14; and
at least one polymer P comprising at least two NCO end functions or at least one epoxy resin.

16. An adhesive, sealant or coating composition comprising the composition C1 as claimed in claim 15.

* * * * *